United States Patent (10) Patent No.: US 11,201,631 B1
Lee et al. (45) Date of Patent: Dec. 14, 2021

(54) ELECTRONIC DEVICE HAVING ANTENNAS

(71) Applicant: LG ELECTRONICS INC., Seoul (KR)

(72) Inventors: Seokjun Lee, Seoul (KR); Yunhoon Cho, Seoul (KR); Yunmo Kang, Seoul (KR); Youngbae Kwon, Seoul (KR); Byungwoon Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/096,847

(22) Filed: Nov. 12, 2020

(30) Foreign Application Priority Data

Aug. 25, 2020 (WO) ................ PCT/KR2020/011290

(51) Int. Cl.
H04B 1/00 (2006.01)
H01Q 1/24 (2006.01)
H04B 1/40 (2015.01)
H04M 1/02 (2006.01)
H04B 7/0413 (2017.01)

(52) U.S. Cl.
CPC ........... H04B 1/0064 (2013.01); H01Q 1/243 (2013.01); H04B 1/40 (2013.01); H04B 7/0413 (2013.01); H04M 1/0266 (2013.01)

(58) Field of Classification Search
CPC .......... H01Q 1/243; H01Q 1/44; H01Q 5/335; H01Q 9/42; H01Q 13/10; H04M 1/0235; H04M 1/0266; H04B 1/0064; H04B 1/40; H04B 7/0413
USPC .................................. 455/566, 575.1, 575.4
See application file for complete search history.

(56) References Cited

U.S. PATENT DOCUMENTS

2006/0286842 A1* 12/2006 Kuwajima .......... H04M 1/0237
439/260
2009/0284438 A1 11/2009 Matsunaga et al.
2012/0295666 A1 11/2012 Sakurai et al.
(Continued)

FOREIGN PATENT DOCUMENTS

EP 1798939 2/2010
JP 2007306347 11/2007
(Continued)

OTHER PUBLICATIONS

PCT International Application No. PCT/KR2020/011290, International Search Report dated May 24, 2021, 8 pages.
(Continued)

Primary Examiner — Lee Nguyen
(74) Attorney, Agent, or Firm — Lee, Hong, Degerman, Kang & Waimey

(57) ABSTRACT

An electronic device having antennas according to one implementation is provided. The electronic device may include a display configured to display a screen, a supporting frame coupled to the display to support the display, and having a metal rim disposed on at least one side surface thereof, and a main frame rotatably coupled to the supporting frame and having a metal rim disposed on a side surface thereof, wherein the metal rim of the main frame may have a first antenna and a second antenna operating in different bands. The supporting frame may be provided with a first slot and a second slot formed in regions thereof adjacent to regions where the first antenna and the second antenna are disposed, in a swivel state of the supporting frame with respect to the main frame.

20 Claims, 40 Drawing Sheets

(56) References Cited

U.S. PATENT DOCUMENTS

2013/0147333 A1* 6/2013 Takagi ................ H04M 1/0237
                                                                  312/319.2
2020/0266524 A1   8/2020 Yoon et al.

FOREIGN PATENT DOCUMENTS

| KR | 101467196   | 12/2014 |
| KR | 20190086160 | 7/2019  |
| WO | 2019245165  | 12/2019 |

OTHER PUBLICATIONS

European Patent Office Application Serial No. 21152764.3, Search Report dated Jul. 5, 2021, 8 pages.

* cited by examiner

*FIG. 5B*

| SUBCARRIER SPACING: $f_0 \times 2^\mu$, $f_0$ = 15kMz AND SCALING VALUE $2^\mu \in \{-2, 0, 1, 2,..., 5\}$ | | | | | | | |
|---|---|---|---|---|---|---|---|
| m | -2 | 0 | 1 | 2 | 3 | 4 | 5 |
| SUBCARRIER SPACING[kHz] | 3.75 | 15 | 30 | 60 | 120 | 240 | 480 |
| LENGTH OF OFDM SYMBOL [ms] | 266.67 | 66.67 | 33.33 | 16.67 | 8.333 | 4.17 | 2.08 |

15kHz 1 SLOT(14 SYMBOLS)   1ms SUBFRAME

| 0 | 1 | 2 | 3 | 4 | 5 | 6 | 7 | 8 | 9 | 10 | 11 | 12 | 13 |

| 0 | 1 | 2 | 3 | 4 | 5 | 6 | 7 | 8 | 9 | 10 | 11 | 12 | 13 |  30kHz 1 SLOT(14 SYMBOLS)   0.5ms

| 0 | 1 |  15kHz 1 SLOT(2 SYMBOLS) : 0.2ms

| 0 | 1 | 2 | 3 |  30kHz MINI SLOT(4 SYMBOLS) : 0.2ms

| 0 | 1 | 2 | 3 | 4 | 5 | 6 |  60kHz MINI SLOT(7 SYMBOLS)   0.125ms (a)

(b)

(a)

(b)

(a)

(b)

(a)

(b)

(a)

| ANT2 | Efficiency (dB) | |
|---|---|---|
| | Slot | Non slot |
| GPS | -6.7 | -8.4 |
| WIFI 2.4GHz | -4.9 ~ -5.5 | -4.4 ~ -5.2 |

← Non-slot performance degraded (b)

(a)

(b)

(a)

(b)

(a)

(b)

ELECTRONIC DEVICE HAVING ANTENNAS

CROSS-REFERENCE TO RELATED APPLICATIONS

Pursuant to 35 U.S.C. § 119 (a), this application claims the benefit of an earlier filing date and right of priority to International Application No. PCT/KR2020/011290 filed on Aug. 25, 2020, the contents of which are hereby incorporated by reference herein in its entirety.

BACKGROUND

1. Technical Field

The present disclosure relates to an electronic device having antennas. A particular implementation relates to an electronic device having antennas operating in different communication systems.

2. Description of the Related Art

Electronic devices may be divided into mobile/portable terminals and stationary terminals according to mobility. Also, the electronic device may be classified into handheld types and vehicle mount types according to whether or not a user can directly carry.

Functions of electronic devices are diversified. Examples of such functions include data and voice communications, capturing images and video via a camera, recording audio, playing music files via a speaker system, and displaying images and video on a display. Some mobile terminals include additional functionality which supports electronic game playing, while other terminals are configured as multimedia players. Specifically, in recent time, mobile terminals can receive multicast signals to allow viewing of video or television programs.

As it becomes multifunctional, an electronic device can be allowed to capture still images or moving images, play music or video files, play games, and the like, so as to be implemented as an integrated multimedia player.

Efforts are ongoing to support and increase the functionality of electronic devices. Such efforts include software and hardware improvements, as well as changes and improvements in the structural components.

In addition to those attempts, the electronic devices provide various services in recent years by virtue of commercialization of wireless communication systems using an LTE communication technology. In the future, it is expected that a wireless communication system using a 5G communication technology will be commercialized to provide various services. Meanwhile, some of LTE frequency bands may be allocated to provide 5G communication services.

In this regard, the electronic device may be configured to provide 5G communication services in various frequency bands. Recently, attempts have been made to provide 5G communication services using a Sub-6 band below a 6 GHz band. In the future, it is also expected to provide 5G communication services by using a millimeter wave (mm-Wave) band in addition to the Sub-6 band for faster data rate.

Meanwhile, electronic devices that provide 4G and 5G communication services may be provided in various form factors. As an example of the form factors for the electronic devices, a foldable device may be considered. The foldable device may cause deviation in wireless performance in open and closed states.

As one of electronic devices having a plurality of frames, a swivel terminal in which one frame rotates relative to another frame at a predetermined angle may be provided. In a swivel electronic device, when one frame rotates at a predetermined angle with respect to another frame, there is a problem in that wireless performance of antennas disposed on side surfaces of the device is changed.

However, when LTE antennas are already provided in the form of metal rims on side surfaces of the swivel electronic device, a space limitation problem may occur for some of antennas operating in a Sub-6 band.

SUMMARY

The present disclosure is directed to solving the aforementioned problems and other drawbacks. Another aspect of the implementation is to provide an antenna structure capable of minimizing changes in characteristics of antennas disposed on side surfaces of an electronic device when a form factor changes.

Another aspect of the implementation is to provide an antenna structure capable of minimizing changes in antenna characteristics due to frame rotation in a swivel structure.

Another aspect of the implementation is to provide a mechanical structure having slits and slots to minimize changes in antenna characteristics due to frame rotation in a swivel structure.

Another aspect of the implementation is to secure antenna characteristics in a swivel structure while providing a rigid structure capable of supporting a display.

To achieve the above or other aspects, an electronic device having antennas according to one embodiment is provided. The electronic device may include a display configured to display a screen, a supporting frame coupled to the display to support the display, and having a metal rim disposed on at least one side surface thereof, and a main frame rotatably coupled to the supporting frame and having a metal rim disposed on a side surface thereof. The metal rim of the main frame may have a first antenna and a second antenna operating in different bands.

In one implementation, the supporting frame may be provided with a first slot and a second slot formed in regions thereof adjacent to regions where the first antenna and the second antenna are disposed, in a swivel state of the supporting frame with respect to the main frame.

In one implementation, the first and second slots may be formed to have lengths longer than bent lengths of the first and second antennas, parts of metal rims adjacent to end portions of the first and second antennas are accommodated in regions where the first and second slots are formed, respectively, in the swivel state.

In one implementation, at end portions of the first and second slots may be provided a first coupling portion and a second coupling portion disposed in parallel to parts of a first conductive member and a second conductive member corresponding to the first antenna and the second antenna in the swivel state.

In one implementation, the main frame may further include a third antenna and a fourth antenna disposed adjacent to the first antenna and the second antenna, respectively. The supporting frame corresponding to a placement of the third antenna and the fourth antenna may be provided with a third slot and a fourth slot, in a normal state where the supporting frame is disposed to correspond to the main frame.

The fourth slot may be formed to be isolated from the first slot by a first coupling portion. The fourth slot may have a length longer than a length of a frame slot formed by the second antenna.

In one implementation, a metal region may be removed from the supporting frame corresponding to the first antenna and the second antenna in a normal state where the supporting frame is disposed to correspond to the main frame.

In one implementation, a first metal rim and a second metal rim may be formed on the supporting frame corresponding to the first antenna and the second antenna. A shape and placement of the first antenna and the second antenna may correspond to a shape and displacement of the first metal rim and the second metal rim, in a normal state where the supporting frame is disposed to correspond to the main frame.

In one implementation, a first conductive member and a second conductive member corresponding to the first antenna and the second antenna may be segmented from adjacent conductive members by slits. A shape and displacement of slots formed in the supporting frame may correspond to a shape and displacement of slots formed in the main frame, in the normal state where the supporting frame is disposed to correspond to the main frame.

In one implementation, the supporting frame corresponding to the first antenna and the second antenna may have a first region and a second region without a metal. A metal rim supporting the display may be formed on a region adjacent to the first region of one side of the supporting frame, and a first coupling portion separating the second region and the first slot from each other may be formed on a region adjacent to the second region.

In one implementation, the electronic device may further include a fifth antenna formed on a lower end portion and one side of the main frame, and a sixth antenna formed on the lower end portion and another side of the main frame. The supporting frame corresponding to the fifth antenna and the sixth antenna may have a third region without a metal rim, and the third region may be defined by a lower end portion, one side and another side of the supporting frame.

In one implementation, a second coupling portion isolating the third region and the second slot from each other may be formed on a region adjacent to the third region.

In one implementation, the electronic device may further include a transceiver circuit operably coupled to the first antenna and the second antenna and configured to control operating bands of the first antenna and the second antenna, and a processor operably coupled to the transceiver circuit and configured to control the transceiver circuit.

In one implementation, the first antenna may be configured to operate in Fifth-Generation New Radio (5G NR) low band (LB), mid band (MB), and high band (HB). A first conductive member of the first antenna may be connected to a feed line, a ground, and a switch of a circuit board disposed inside the electronic device, and the switch may be controlled to select a different matching circuit according to an assigned low band when the first antenna operates in the low band.

In one implementation, the processor may be configured to determine whether the electronic device is in the swivel state, and control the transceiver circuit so that a configuration of an input matching circuit disposed between the first conductive member and a feeding unit changes, when the electronic device is in the swivel state.

In one implementation, the processor may be configured to determine a band assigned to the electronic device and whether the electronic device is in the swivel state, and control the input matching circuit disposed between the first conductive member and the feeding unit when the electronic device is assigned with the mid band and the high band and is in the swivel state.

The second antenna may be configured to operate in a GPS band and a WiFi band, and a second conductive member of the second antenna may be connected to a feed line, a ground, and a switch of a circuit board disposed inside the electronic device.

In one implementation, the processor may be configured to determine whether the electronic device is in the swivel state, and control the transceiver circuit so that a configuration of an input matching circuit disposed between the second conductive member and a feeding unit and a configuration of a matching circuit disposed between the second conductive member and the ground change, when the electronic device is in the swivel state.

In one implementation, the main frame may further include a third antenna and a fourth antenna disposed adjacent to the first antenna and the second antenna, respectively, and the third antenna and the fourth antenna may operate in a 5G NR HB and a WiFi band, respectively.

In one implementation, the processor may control the transceiver circuit to perform Carrier Aggregation (CA) through the first antenna and the third antenna in the swivel state of the electronic device.

In one implementation, the processor may control the transceiver circuit to perform communication with a second Access Point (AP) in a second band while performing 2×2 Multi-input and Multi-output (MIMO) with a first AP in a first band through the second antenna and the fourth antenna in the swivel state of the electronic device.

In one implementation, the electronic device may further include a fifth antenna formed on a lower end portion and one side of the main frame, and a sixth antenna formed on the lower end portion and another side of the main frame. The processor may control the transceiver circuit to perform CA while performing MIMO in at least one of 5G NR LB, MB, and HB through at least two of the first antenna, the third antenna, the fifth antenna, and the sixth antenna.

According to the present disclosure, in an antenna structure disposed in a side surface of an electronic device, an antenna structure that minimizes changes in antenna characteristics even when the form factor of the electronic device is changed.

According to the present disclosure, by minimizing the changes in antenna characteristics due to frame rotation in a swivel structure, rotation wireless performance can be maintained at a predetermined level even when a display region rotates.

According to the present disclosure, by providing a mechanical structure in which slits and slots are implemented to minimize the changes in antenna characteristics due to the frame rotation in the swivel structure, the rotation wireless performance can be maintained at the predetermined level even when the display region is rotated.

According to the present disclosure, antenna characteristics can be secured in the swivel structure while providing a rigid structure capable of supporting a display in the swivel structure.

Further scope of applicability of the present disclosure will become apparent from the detailed description given hereinafter. It should be understood, however, that the detailed description and specific examples, such as the preferred embodiment of the invention, are given by way of illustration only, since various changes and modifications within the spirit and scope of the invention will be apparent to those skilled in the art.

BRIEF DESCRIPTION OF THE DRAWINGS

FIG. 5B is a view illustrating a change in a slot length in accordance with a change in a subcarrier spacing in the NR.

DETAILED DESCRIPTION OF THE IMPLEMENTATIONS

Figure 1A:
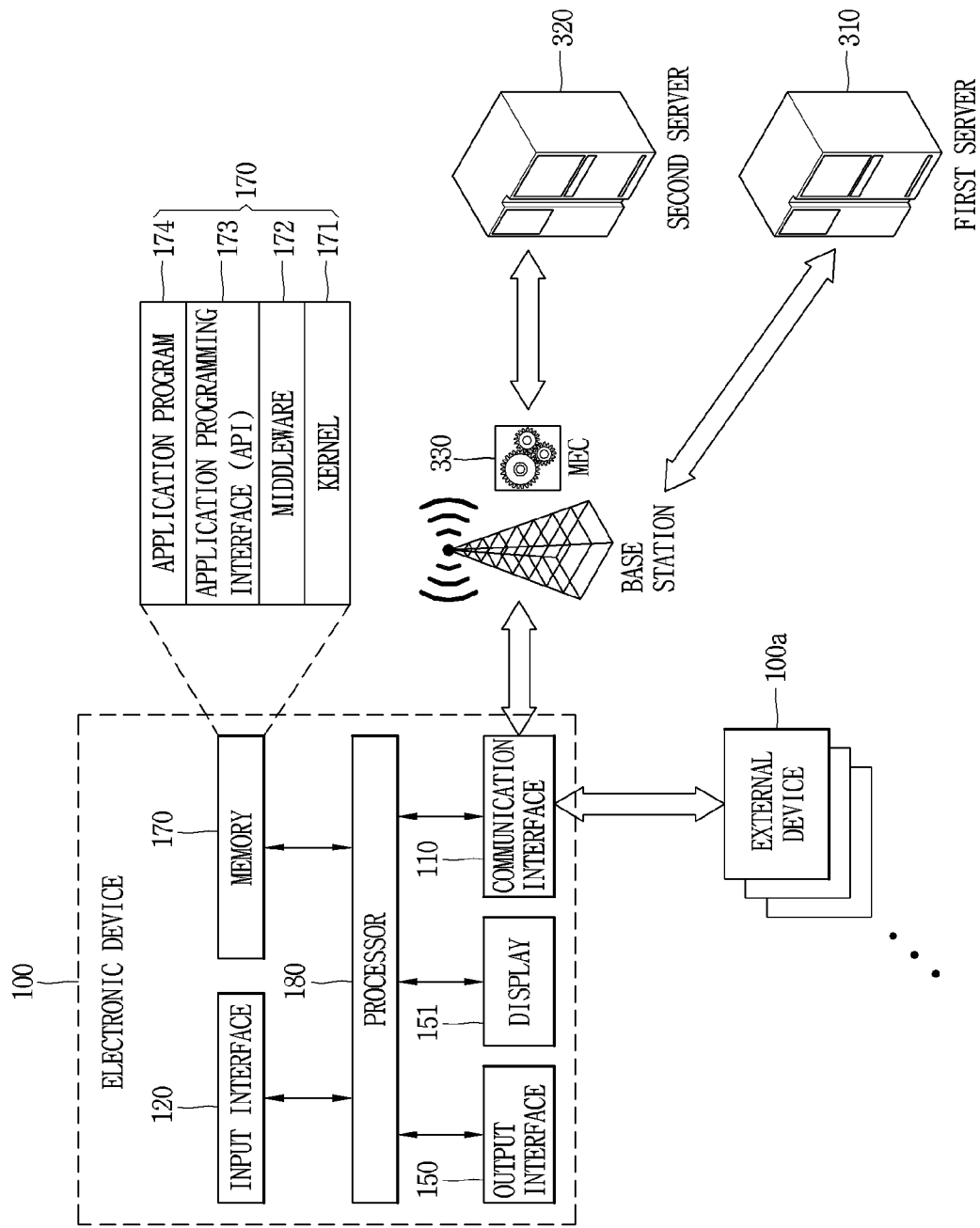
FIG. 1A is a view illustrating a configuration for describing an electronic device in accordance with one embodiment, and an interface between the electronic device and an external device or server.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure may not be limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, laptop computers, personal digital assistants (PDAs), portable multimedia players (PMPs), navigators, slate PCs, tablet PCs, ultra books, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers, digital signages, and the like, excluding a case of being applicable only to the mobile terminals.

Referring to FIGS. 1A to 10, FIG. 1A is a view illustrating a configuration for describing an electronic device in accordance with one embodiment, and an interface between the electronic device and an external device or server. FIG. 1B is a view illustrating a detailed configuration in which the electronic device according to the one embodiment is interfaced with an external device or a server. FIG. 1C is a view illustrating a configuration in which the electronic device according to the one embodiment is interfaced with a plurality of base stations or network entities.

Figure 2A:
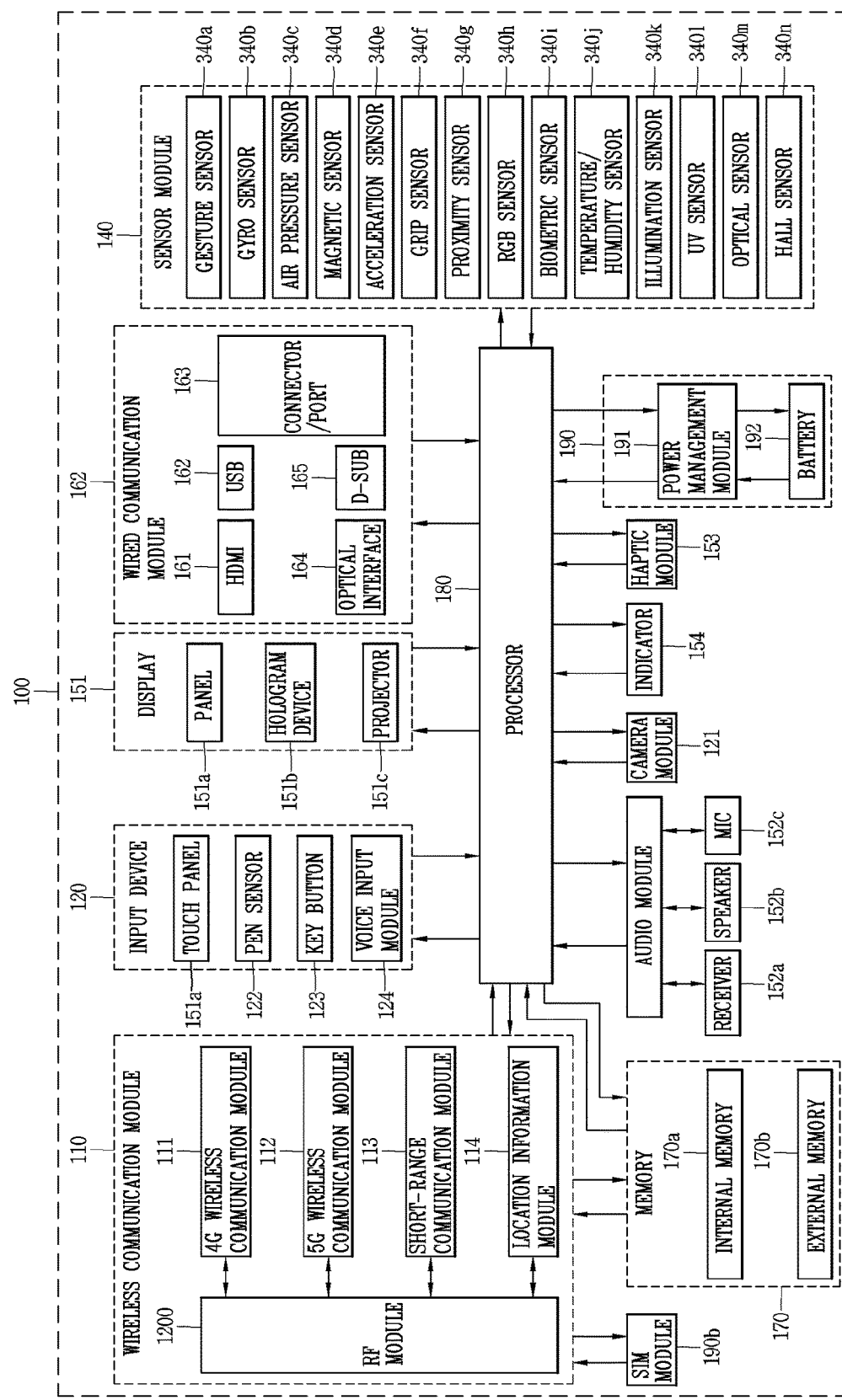
FIG. 2A is a view illustrating a detailed configuration of the electronic device of FIG. 1A.
Figure 2B:
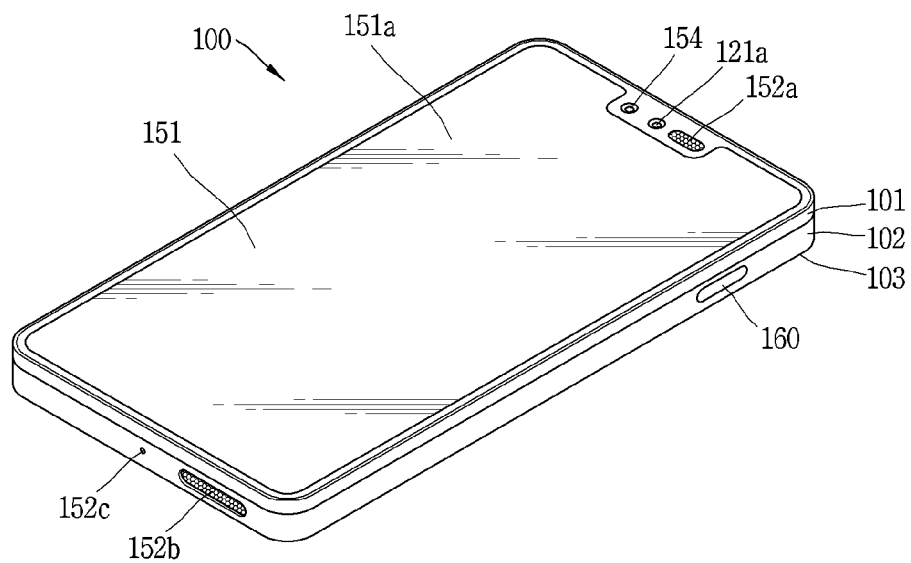
FIGS. 2B and 2C are conceptual views illustrating one example of an electronic device according to the present disclosure, viewed from different directions.
Figure 2C:
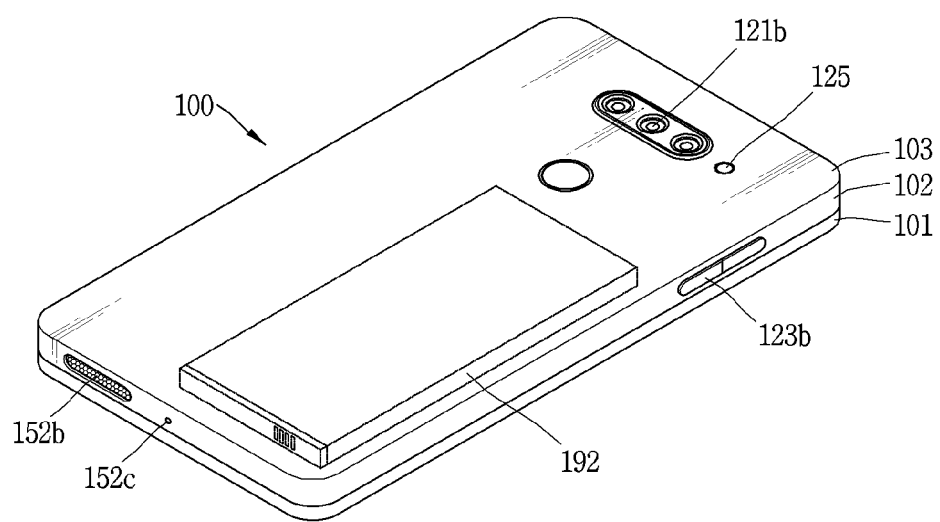

Meanwhile, referring to FIGS. 2A to 2C, FIG. 2A is a view illustrating a detailed configuration of the electronic device of FIG. 1A. FIGS. 2B and 2C are conceptual views illustrating one example of an electronic device according to the present disclosure, viewed from different directions.

Referring to FIG. 1A, the electronic device 100 is configured to include a communication interface 110, an input interface (or input device) 120, an output interface (or output device) 150, and a processor 180. Here, the communication interface 110 may refer to a wireless communication module 110. Also, the electronic device 100 may be configured to further include a display 151 and a memory 170. It is understood that implementing all of the illustrated components is not a requirement. Greater or fewer components may alternatively be implemented.

In more detail, among others, the wireless communication module 110 may typically include one or more modules which permit communications such as wireless communications between the electronic device 100 and a wireless communication system, communications between the electronic device 100 and another electronic device, or communications between the electronic device 100 and an external server. Further, the wireless communication module 110 may typically include one or more modules which connect the electronic device 100 to one or more networks. Here, the one or more networks may be a 4G communication network and a 5G communication network, for example.

Referring to FIGS. 1A and 2A, the wireless communication module 110 may include at least one of a 4G wireless communication module 111, a 5G wireless communication module 112, a short-range communication module 113, and a location information module 114. With regard to this, the 4G wireless communication module 111, the 5G wireless communication module 112, the short-range communication module 113, and the location information module 114 may be implemented as a baseband processor such as a modem. As one example, the 4G wireless communication module 111, the 5G wireless communication module 112, the short-range communication module 113, and the location information module 114 may be implemented as a transceiver circuit operating in an IF frequency band and a base processor. Meanwhile, the RF module 1200 may be implemented as an RF transceiver circuit operating in an RF frequency band of each communication system. However, the present disclosure may not be limited thereto, and the 4G wireless communication module 111, the 5G wireless communication module 112, the short-range communication module 113, and the location information module 114 may be interpreted to include RF modules, respectively.

The 4G wireless communication module 111 may perform transmission and reception of 4G signals with a 4G base station through a 4G mobile communication network. In this case, the 4G wireless communication module 111 may transmit at least one 4G transmission signal to the 4G base station. In addition, the 4G wireless communication module 111 may receive at least one 4G reception signal from the 4G base station. In this regard, Uplink (UL) multi-input multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 112 may perform transmission and reception of 5G signals with a 5G base station through a 5G mobile communication network. Here, the 4G base station and the 5G base station may have a Non-Stand-Alone (NSA) structure. For example, the 4G base station and the 5G base station may be a co-located structure in which the stations are disposed at the same location in a cell. Alternatively, the 5G base station may be disposed in a Stand-Alone (SA) structure at a separate location from the 4G base station.

The 5G wireless communication module 112 may perform transmission and reception of 5G signals with a 5G base station through a 5G mobile communication network. In this case, the 5G wireless communication module 112 may transmit at least one 5G transmission signal to the 5G base station. In addition, the 5G wireless communication module 112 may receive at least one 5G reception signal from the 5G base station.

In this instance, 5G and 4G networks may use the same frequency band, and this may be referred to as LTE refarming. Meanwhile, a Sub-6 frequency band, which is a range of 6 GHz or less, may be used as the 5G frequency band.

On the other hand, a millimeter wave (mmWave) range may be used as the 5G frequency band to perform broadband high-speed communication. When the mmWave band is used, the electronic device 100 may perform beam forming for communication coverage expansion with a base station.

On the other hand, regardless of the 5G frequency band, 5G communication systems can support a larger number of multi-input multi-output (MIMO) to improve a transmission rate. In this instance, UL MIMO may be performed by a plurality of 5G transmission signals transmitted to a 5G base station. In addition, DL MIMO may be performed by a plurality of 5G reception signals received from the 5G base station.

On the other hand, the wireless communication module 110 may be in a Dual Connectivity (DC) state with the 4G base station and the 5G base station through the 4G wireless communication module 111 and the 5G wireless communication module 112. As such, the dual connectivity with the 4G base station and the 5G base station may be referred to as EUTRAN NR DC (EN-DC). Here, EUTRAN is an abbreviated form of "Evolved Universal Telecommunication Radio Access Network", and refers to a 4G wireless communication system. Also, NR is an abbreviated form of "New Radio" and refers to a 5G wireless communication system.

On the other hand, if the 4G base station and 5G base station are disposed in a co-located structure, throughput improvement is achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 111 and the 5G wireless communication module 112.

The short-range communication module 113 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the electronic device 100 and a wireless communication system, communications between the electronic device 100 and another electronic device, or communications between the electronic device and a network where another electronic device (or an external server) is located, via wireless area networks. One example of the wireless area networks is a wireless personal area network.

Meanwhile, short-range communication between electronic devices may be performed using the 4G wireless communication module 111 and the 5G wireless communication module 112. In one embodiment, short-range communication may be performed between electronic devices in a device-to-device (D2D) manner without passing through base stations.

Meanwhile, for transmission rate improvement and communication system convergence, Carrier Aggregation (CA) may be carried out using at least one of the 4G wireless communication module 111 and the 5G wireless communication module 112 and the WiFi communication module 113. In this regard, 4G+WiFi CA may be performed using the 4G wireless communication module 111 and the Wi-Fi communication module 113. Or, 5G+WiFi CA may be performed using the 5G wireless communication module 112 and the WiFi communication module 113.

The location information module 114 is generally configured to detect, calculate, derive or otherwise identify a position (or current position) of the electronic device. As an example, the location information module 115 includes a Global Position System (GPS) module, a Wi-Fi module, or both. For example, when the electronic device uses a GPS module, a position of the electronic device may be acquired using a signal sent from a GPS satellite. As another example, when the electronic device uses the Wi-Fi module, a position of the electronic device can be acquired based on information related to a wireless access point (AP) which transmits or receives a wireless signal to or from the Wi-Fi module. If desired, the location information module 114 may alternatively or additionally function with any of the other modules of the wireless communication module 110 to obtain data related to the position of the electronic device. The location information module 114 is a module used for acquiring the position (or the current position) of the electronic device and may not be limited to a module for directly calculating or acquiring the position of the electronic device.

Specifically, when the electronic device utilizes the 5G wireless communication module 112, the position of the electronic device may be acquired based on information related to the 5G base station which performs radio signal transmission or reception with the 5G wireless communication module. In particular, since the 5G base station of the mmWave band is deployed in a small cell having a narrow coverage, it is advantageous to acquire the position of the electronic device.

The input device 120 may include a pen sensor 1200, a key button 123, a voice input module 124, a touch panel 151a, and the like. On the other hand, the input device 120 may include a camera module 121 for inputting an image signal, a microphone 152c or an audio input module for inputting an audio signal, or a user input unit 123 (e.g., a touch key, a push key (or a mechanical key), etc.) for allowing a user to input information. Data (for example, audio, video, image, and the like) may be obtained by the input device 120 and may be analyzed and processed according to user commands.

The camera module 121 is a device capable of capturing still images and moving images. According to one embodiment, the camera module 121 may include one or more image sensors (e.g., a front sensor or a rear sensor), a lens, an image signal processor (ISP), or a flash (e.g., LED or lamp).

The sensor module 140 may typically be implemented using one or more sensors configured to sense internal information of the electronic device, the surrounding environment of the electronic device, user information, and the like. For example, the sensor module 140 includes at least one of a gesture sensor 340a, a gyro sensor 340b, an air pressure sensor 340c, a magnetic sensor 340d, an acceleration sensor 340e, a grip sensor 340f, and a proximity sensor 340g, a color sensor 340h (e.g. RGB (red, green, blue) sensor), a bio-sensor 340i, a temperature/humidity sensor 340j, an illuminance sensor 340k, an ultra violet (UV) sensor 340l, a light sensor 340m, and a hall sensor 340n. The sensor module 140 may also include at least one of a finger scan sensor, an ultrasonic sensor, an optical sensor (for example, camera 121), a microphone (see 152c), a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The electronic device disclosed herein may be configured to utilize information obtained from one or more sensors, and combinations thereof.

The output interface 150 may typically be configured to output various types of information, such as audio, video, tactile output, and the like. The output interface 150 may be shown having at least one of a display 151, an audio output module 152, a haptic module 153, and an indicator 154.

With regard to this, the display 151 may have an interlayered structure or an integrated structure with a touch sensor in order to implement a touch screen. The touch screen may function as the user input unit 123 which provides an input interface between the electronic device 100 and the user and simultaneously provide an output interface between the electronic device 100 and a user. For example, the display 151 may be a liquid crystal display (LCD), a light emitting diode (LED) display, an organic light emitting diode (OLED) display, a microelectromechanical system (micro) electromechanical systems (MEMS) displays, or an electronic paper display. For example, the display 151 may display various contents (e.g., text, images, videos, icons, and/or symbols, etc.). The display 151 may include a touch screen, and may receive a touch, gesture, proximity, or hovering input using, for example, an electronic pen or a part of a user's body.

Meanwhile, the display 151 may include a touch panel 151a, a hologram device 151b, and a projector 151c and/or a control circuit for controlling them. In this regard, the panel may be implemented to be flexible, transparent, or wearable. The panel may include a touch panel 151a and one or more modules. The hologram device 151b may show a stereoscopic image in the air by using interference of light. The projector 151c may display an image by projecting light on a screen. The screen may be located, for example, inside or outside the electronic device 100.

The audio module 152 may be configured to interwork with the receiver 152a, the speaker 152b, and the microphone 152c. Meanwhile, the haptic module 153 may convert an electrical signal into a mechanical vibration, and generate a vibration or a haptic effect (e.g., pressure, texture). The electronic device may include a mobile TV supporting device (e.g., a GPU) that may process media data as per, e.g., digital multimedia broadcasting (DMB), digital video broadcasting (DVB), or MediaFlo™ standards. The indicator 154 may indicate a particular state of the electronic device 100 or a part (e.g., the processor 310) of the electronic device, including, e.g., a booting state, a message state, or a recharging state.

The wired communication module 160 which may be implemented as an interface unit serves as a passage with various types of external devices connected to the electronic device 100. The wired communication module 160 may include an HDMI 162, a USB 162, a connector/port 163, an optical interface 164, or a D-sub (D-subminiature) 165. Also, the wired communication module 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the electronic device 100 may perform assorted control functions associated with a connected external device, in response to the external device being connected to the wired communication module 160.

The memory 170 is typically implemented to store data to support various functions or features of the electronic device 100. For instance, the memory 170 may be configured to store application programs executed in the electronic device 100, data or instructions for operations of the electronic device 100, and the like. At least some of these application programs may be downloaded from an external server (e.g., a first server 310 or a second server 320) through wireless communication. Other application programs may be installed within the electronic device 100 at the time of manufacturing or shipping, which is typically the case for basic functions of the electronic device 100 (for example, receiving a call, placing a call, receiving a message, sending a message, and the like). It is common for application programs to be stored in the memory 170, installed in the electronic device 100, and executed by the controller 180 to perform an operation (or function) for the electronic device 100.

In this regard, the first server 310 may be referred to as an authentication server, and the second server 320 may be referred to as a content server. The first server 310 and/or the second server 320 may be interfaced with the electronic device through a base station. Meanwhile, a part of the second server 320 corresponding to the content server may be implemented as a mobile edge cloud (MEC) 330 in a base station unit. Accordingly, a distributed network may be implemented through the second server 320 implemented as the mobile edge cloud (MEC) 330, and content transmission delay may be shortened.

The memory 170 may include a volatile and/or nonvolatile memory. Also, the memory 170 may include an internal memory 170a and an external memory 170b. The memory 170 may store, for example, commands or data related to at least one of other components of the electronic device 100. According to one embodiment, the memory 170 may store software and/or a program 240. For example, the program 240 may include a kernel 171, middleware 172, an application programming interface (API) 173, an application program (or "application") 174, or the like. At least one of the kernel 171, the middleware 172, or the API 174 may be referred to as an operating system (OS).

The kernel 171 may control or manage system resources (e.g., the bus, the memory 170, or the processor 180) that are used for executing operations or functions implemented in other programs (e.g., the middleware 172, the API 173, or the application program 174). In addition, the kernel 171 may provide an interface to control or manage system resources by accessing individual components of the electronic device 100 in the middleware 172, the API 173, or the application program 174.

The middleware 172 may function as an intermediary so that the API 173 or the application program 174 communicates with the kernel 171 to exchange data. Also, the middleware 172 may process one or more task requests received from the application program 247 according to priorities. In one embodiment, the middleware 172 may give at least one of the application programs 174 a priority to use the system resources (e.g., the bus, the memory 170, or the processor 180) of the electronic device 100, and process one or more task requests. The API 173 is an interface for the application program 174 to control functions provided by the kernel 171 or the middleware 1723, for example, at least one for file control, window control, image processing, or text control. Interface or function, for example Command).

The processor 180 typically functions to control an overall operation of the electronic device 100, in addition to the operations associated with the application programs. The processor 180 may provide or process information or functions appropriate for a user by processing signals, data, information and the like, which are input or output by the foregoing components, or executing application programs stored in the memory 170. Furthermore, the processor 180 may control at least part of the components illustrated in FIGS. 1A and 2A, in order to execute the application programs stored in the memory 170. In addition, the processor 180 may control a combination of at least two of those components included in the electronic device 100 to activate the application program.

The processor 180 may include one or more of a central processing unit (CPU), an application processor (AP), an image signal processor (ISP), a communication processor (CP), and a low power processor (e.g., sensor hub). For example, the processor 180 may execute a control of at least one of other components and/or an operation or data processing related to communication.

The power supply unit 190 may be configured to receive external power or provide internal power in order to supply appropriate power required for operating elements and components included in the electronic device 100. The power supply unit 190 may include a power management module 191 and a battery 192, and the battery 192 may be an embedded battery or a replaceable battery. The power management module 191 may include a power management integrated circuit (PMIC), a charging IC, or a battery or fuel gauge. The PMIC may have a wired and/or wireless recharging scheme. The wireless charging scheme may include, e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 396, and a voltage, a current, or a temperature while the battery 396 is being charged. The battery 396 may include, e.g., a rechargeable battery or a solar battery.

Each of the external device 100*a*, the first server 310, and the second server 320 may be the same or different type of device (e.g., external device or server) as or from the electronic device 100. According to an embodiment, all or some of operations executed on the electronic device 100 may be executed on another or multiple other electronic devices (e.g., the external device 100*a*, the first server 310 and the second server 320. According to an embodiment, when the electronic device 100 should perform a specific function or service automatically or at a request, the electronic device 100, instead of executing the function or service on its own or additionally, may request another device (e.g., the external device 100*a*, the first server 310, and the second server 320) to perform at least some functions associated therewith. The another electronic device (e.g., the external device 100*a*, the first server 310, and the second server 320) may execute the requested function or additional function and transfer a result of the execution to the electronic device 100. The electronic device 100 may provide the requested function or service by processing the received result as it is or additionally. To that end, a cloud computing, distributed computing, client-server computing, or mobile-edge cloud (MEC) technology may be used, for example.

At least part of the components may cooperatively operate to implement an operation, a control or a control method of an electronic device according to various embodiments disclosed herein. Also, the operation, the control or the control method of the electronic device may be implemented on the electronic device by an activation of at least one application program stored in the memory 170.

Figure 1B:
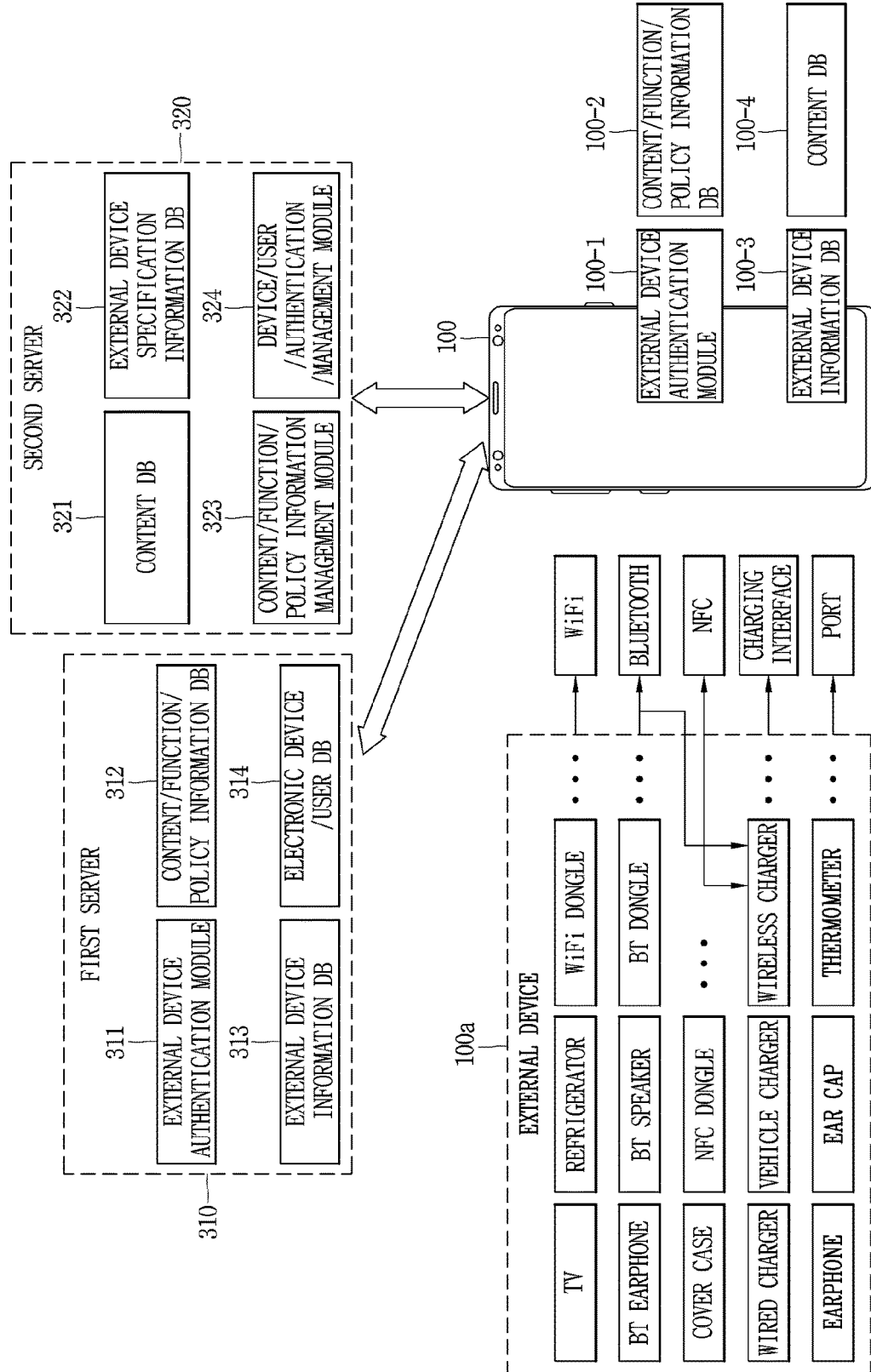
FIG. 1B is a view illustrating a detailed configuration in which the electronic device according to the one embodiment is interfaced with an external device or a server.

Referring to FIGS. 1A and 1B, the wireless communication system may include an electronic device 100, at least one external device 100*a*, a first server 310 and a second server 320. The electronic device 100 may be functionally connected to at least one external device 100*a*, and may control contents or functions of the electronic device 100 based on information received from the at least one external device 100*a*. According to one embodiment of the present disclosure, the electronic device 100 may perform authentication to determine whether the at least one external device 100*a* includes or generates information following a predetermined rule using the servers 310, 320. Also, the electronic device 100 may display contents or control functions by controlling the electronic device 100 based on an authentication result. According to an embodiment of the present disclosure, the electronic device 100 may be connected to at least one external device 100*a* through a wired or wireless communication interface to receive or transmit information. For example, the electronic device 100 and the at least one external device 100*a* include a near field communication (NFC), a charger (e.g., Information can be received or transmitted in a universal serial bus (USB)-C), ear jack, Bluetooth (BT), wireless fidelity (WiFi), or the like.

The electronic device 100 may include at least one of an external device authentication module 100-1, a content/function/policy information DB 100-2, an external device information DB 100-3, or a content DB 104. The at least one external device 100*a*, as an assistant apparatus associated with the electronic device 100, may be a device designed for various purposes, such as ease of use, increased appearance aesthetics, and enhanced usability of the electronic device 100. The at least one external device 100*a* may or may not be in physical contact with the electronic device 100. According to one embodiment, the at least one external device 100*a* may be functionally connected to the electronic device 100 using a wired/wireless communication module to control information for controlling content or a function in the electronic device 100.

According to one embodiment, the at least one external device 100*a* may include an authentication module for encrypting/decrypting at least one of various pieces of information included in the external device information, or storing or managing it in a physical/virtual memory area that is not directly accessible from the outside. According to one embodiment, the at least one external device 100*a* may perform communication with the electronic device 100 or may provide information through communication between the external devices. According to one embodiment, the at least one external device 100*a* may be functionally connected to the server 410 or 320. In various embodiments, the at least one external device 100*a* may be various types of products such as a cover case, an NFC dongle, a car charger, an earphone, an ear cap (e.g., an accessory device mounted on a mobile phone audio connector), a thermometer, an electronic pen, a BT earphone, a BT speaker, a BT dongle, a TV, a refrigerator, and a WiFi dongle.

In this regard, for example, the external device 100*a* such as a wireless charger may supply power to the electronic device 100 through a charging interface such as a coil. In this case, control information may be exchanged between the external device 100*a* and the electronic device 100 through in-band communication through a charging interface such as a coil. Meanwhile, control information may be exchanged between the external device 100*a* and the electronic device 100 through out-of-band communication such as Bluetooth or NFC.

On the other hand, the first server 310 may include a server or a cloud device for a service associated with the at least one external device 100*a*, or a hub device for controlling a service in a smart home environment. The first server 310 may include at least one of an external device authentication module 311, a content/function/policy information DB 312, an external device information DB 313, and an electronic device/user DB 314. The first server 310 may be referred to as an authentication management server, an authentication server, or an authentication related server. The second server 320 may include a server or cloud device for providing a service or content, or a hub device for providing a service in a smart home environment. The second server 320 may include at least one of a content DB 321, an external device specification information DB 322, a content/function/policy information management module 323, and a device/user authentication/management module 324. The second server 130 may be referred to as a content management server, a content server, or a content related server.

On the other hand, the electronic device 100 described herein may maintain a connection state between a 4G base station (eNB) and a 5G base station (eNB) through the 4G wireless communication module 111 and/or the 5G wireless communication module 112. In this regard, as described above, FIG. 1C illustrates a configuration in which the electronic device 100 is interfaced with a plurality of base stations or network entities.

Figure 1C:
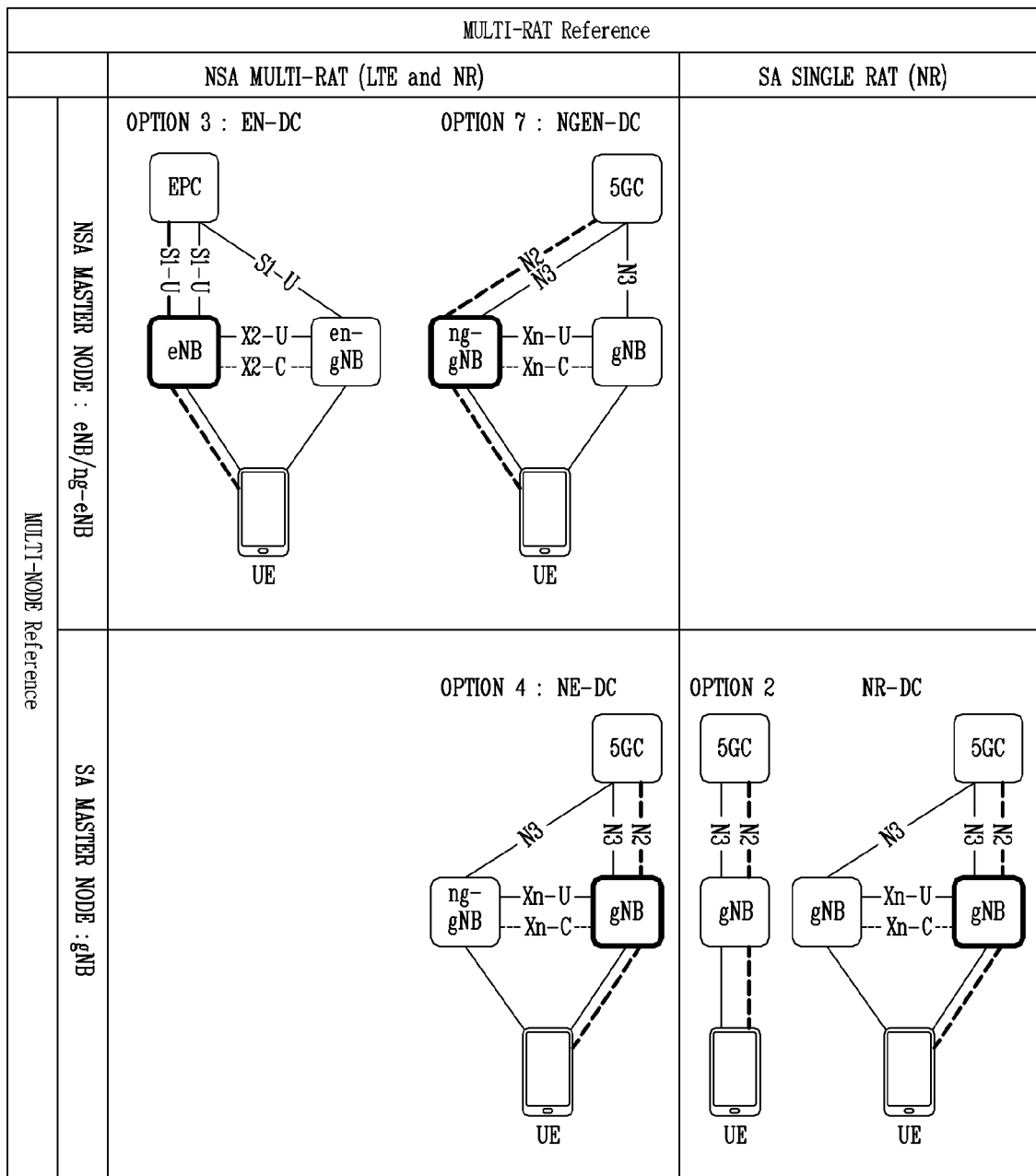
FIG. 1C is a view illustrating a configuration in which the electronic device according to the one embodiment is interfaced with a plurality of base stations or network entities.

Referring to FIG. 1C, 4G/5G deployment options are shown. With regard to 4G/5G deployment, when multi-RAT of 4G LTE and 5G NR is supported in a non-standalone (NSA) mode, it may be implemented as EN-DC in option 3 or NGEN-DC in option 5. On the other hand, when multi-RAT is supported in a standalone (SA) mode, it may be implemented as NE-DC in option 4. In addition, when single RAT is supported in a standalone (SA) mode, it may be implemented as NR-DC in option 2.

The NR frequency band is defined as a frequency range of two types (FR1, FR2). The FR1 is a sub-6 GHz range, and the FR2 is a range of above 6 GHz, which may denote millimeter waves (mmWs).

Operating bands for dual connectivity may be specified to operate in EN-DC, NGEN-DC, or NR-DC configuration. EN-DC or NGEN-DC band combinations may include at least one E-UTRA operating band. Specifically, operating bands for intra-band contiguous EN-DC, intra-band non-contiguous EN-DC, inter-band EN-DC in FR1, inter-band EN-DC including FR2, inter-band EN-DC including FR1 and FR2, and inter-band EN-DC between FR1 and FR2 may be defined.

A UE channel bandwidth for EN-DC may be defined. In this regard, a UE channel bandwidth for intra-band EN-DC in FR1 may be defined. Channel arrangements for DC may be defined. In this regard, channel spacing for intra-band EN-DC carriers may be defined.

The configuration for EN-DC may be defined. Specifically, configurations for intra-band contiguous EN-DC, intra-band non-contiguous EN-DC, inter-band EN-DC in FR1, inter-band EN-DC including FR2, inter-band EN-DC including FR1 and FR2, and inter-band EN-DC between FR1 and FR2 may be defined.

As an example, UL EN-DC configuration may be defined for 2, 3, 4, 5, or 6 bands in FR1. In this regard, the UL EN-DC configuration for 2, 3, 4, 5, or 6 bands in FR1 may be made of a combination of EUTRA and NR configurations. This EN-DC, NGEN-DC, or NR-DC configuration may also be defined for downlink (DL) as well as uplink (UL).

Transmitter power may be defined in relation to EN-DC. UE maximum output power and UE maximum output power reduction may be defined for each configuration of the above-described EN-DCs. UE additional maximum output power reduction may be defined in relation to EN-DC. Configured output power for EN-DC and configured output power for NR-DC may be defined.

With regard to the base station type, the eNB is a 4G base station, which is also called an LTE eNB, and is based on the Rel-8-Rel-14 standard. On the other hand, ng-eNB is an eNB capable of interworking with a 5GC and gNB, which is also called an eLTE eNB, and is based on the Rel-15 standard. Furthermore, the gNB is a 5G base station interworking with a 5G NR and 5GC, which is also called an NR gNB, and is based on the Rel-15 standard. In addition, the en-gNB is a gNB capable of interworking with an EPC and an eNB, also called an NR gNB, and is based on the Rel-15 standard. With regard to the Dual Connectivity (DC) type, option 3 represents E-UTRA-NR Dual Connectivity (EN-DC). Option 7 represents NG-RAN E-UTRA-NR Dual Connectivity (NGEN-DC). Furthermore, option 4 represents NR-E-UTRA Dual Connectivity (NE-DC). Furthermore, option 2 represents NR-NR Dual Connectivity (NR-DC). In this regard, the technical features of double connection according to option 2 through option 7 are as follows.

Option 2: Independent 5G services may be provided with only a 5G system (5GC, gNB). In addition to enhanced Mobile Broadband (eMBB), Ultra-Reliable Low-Latency Communication (URLLC) and Massive Machine Type Communication (mMTC) may be possible, and 5GC features such as network slicing, MEC support, mobility on demand, and access-agnostic may be available to provide a full 5G service. Initially, due to coverage limitations, it may be used as a hot spot, an enterprise or overlay network, and when it is out of a 5G NR coverage, EPC-5GC interworking is required. A 5G NR full coverage may be provided, and dual connectivity (NR-DC) may be supported between gNBs using a plurality of 5G frequencies.

Option 3: This is a case where only a gNB is introduced into the existing LTE infrastructure. The core is an EPC and the gNB is an en-gNB that can interwork with the EPC and the eNB. The dual connectivity (EN-DC) is supported between the eNB and the en-gNB, and the master node is an eNB. An eNB, which is a control anchor of an en-gNB, processes control signaling for network access, connection configuration, handover, etc. of a UE, and user traffic may be transmitted through the eNB and/or the en-gNB. It is an option that is mainly applied to a first stage of 5G migration, as an operator operating an LTE nationwide network is able to quickly build a 5G network with the introduction of the en-gNB and minimal LTE upgrade without 5GC.

There are three types of option 3, which are options 3/3a/3x, depending on the user traffic split schemes. Bearer split is applied to options 3/3x, but is not applied to option 3a. The main scheme is option 7x.

Option 3: Only an eNB is connected to an EPC and an en-gNB is connected only to the eNB. User traffic may be split at a master node (eNB) and transmitted simultaneously to LTE and NR.

Option 3a: Both the eNB and the gNB are connected to the EPC, and thus user traffic is directly transferred from the EPC to the gNB. User traffic is transmitted to LTE or NR.

Option 3x: It is a combination of option 3 and option 3a, which differs from Option 3 in that user traffic is split at the secondary node (gNB).

The advantages of option 3 are i) that LTE can be used as a capacity booster for eMBB services, and ii) the terminal is always connected to LTE to provide service continuity through LTE even if it is out of 5G coverage or NR quality deteriorates so as to provide stable communication.

Option 4: 5GC is introduced, and still interworking with LTE, but independent 5G communication is possible. Core is 5GC, and the eNB is an ng-eNB capable of interworking with 5GC and a gNB. Dual connectivity (NE-DC) is supported between an ng-eNB and a gNB, and the master node is the gNB. LTE may be used as a capacity booster when 5G NR coverage is fully extended. There are two types of option 4, which are option 4/4a. The main scheme is option 7x.

Option 7: 5GC is introduced, and still interworking with LTE, and 5G communication relies on LTE. Core is 5GC, and the eNB is an ng-eNB capable of interworking with 5GC and a gNB. Dual connectivity (NGEN-DC) is supported between an ng-eNB and a gNB, and the master node is a gNB. 5GC features may be used, and when 5G coverage is insufficient yet, service continuity may be provided using an eNB as the master node similar to option 3. There are three types of option 7, which are options 7/7a/7x, depending on the user traffic split schemes. Bearer split is applied to options 7/7x, but is not applied to option 7a. The main scheme is option 7x.

Referring to FIGS. 2B and 2C, the disclosed electronic device 100 includes a bar-like terminal body. However, the mobile terminal 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of electronic device. However, such teachings with regard to a particular type of electronic device will generally be applied to other types of electronic devices as well.

Here, considering the electronic device 100 as at least one assembly, the terminal body may be understood as a conception referring to the assembly.

The electronic device 100 will generally include a case (for example, frame, housing, cover, and the like) forming the appearance of the terminal. In this embodiment, the electronic device 100 may include a front case 101 and a rear case 102. Various electronic components are interposed into a space formed between the front case 101 and the rear case 102. At least one middle case may be additionally positioned between the front case 101 and the rear case 102.

A display 151 may be disposed on a front surface of the terminal body to output information. As illustrated, a window 151a of the display 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted on the rear case 102 are exposed to the outside. Meanwhile, part of a side surface of the rear case 102 may be implemented to operate as a radiator.

As illustrated, when the rear cover 103 is coupled to the rear case 102, a side surface of the rear case 102 may be partially exposed. In some cases, upon the coupling, the rear case 102 may also be completely shielded by the rear cover 103. Meanwhile, the rear cover 103 may include an opening for externally exposing a camera 121b or an audio output module 152b.

The electronic device 100 may include a display 151, first and second audio output modules 152a, 152b, a proximity sensor 141, an illumination sensor 152, an optical output module 154, first and second cameras 121a, 121b, first and second manipulation units 123a, 123b, a microphone 152c, a wired communication module 160, and the like.

The display 151 is generally configured to output information processed in the electronic device 100. For example, the display 151 may display execution screen information of an application program executing at the electronic device 100 or user interface (UI) and graphic user interface (GUI) information in response to the execution screen information.

The display 151 may be implemented using two display devices, according to the configuration type thereof. For instance, a plurality of the displays 151 may be arranged on one side, either spaced apart from each other, or these devices may be integrated, or these devices may be arranged on different surfaces.

The display 151 may include a touch sensor which senses a touch onto the display so as to receive a control command in a touching manner. When a touch is input to the display 151, the touch sensor may be configured to sense this touch and the processor 180 may generate a control command corresponding to the touch. The content which is input in the touching manner may be a text or numerical value, or a menu item which can be indicated or designated in various modes.

In this manner, the display 151 may form a flexible touch screen along with the touch sensor, and in this case, the touch screen may function as the user input unit 123 (refer to FIG. 1A). Therefore, the touch screen may replace at least some of the functions of the first manipulation unit 123a.

The first audio output module 152a may be implemented as a receiver for transmitting a call sound to a user's ear and the second audio output module 152b may be implemented as a loud speaker for outputting various alarm sounds or multimedia playback sounds.

The optical output module 154 may output light for indicating an event generation. Examples of the event generated in the electronic device 100 may include a message reception, a call signal reception, a missed call, an alarm, a schedule notice, an email reception, information reception through an application, and the like. When a user's event check is sensed, the processor 180 may control the optical output unit 154 to end the output of light.

The first camera 121a may process video frames such as still or moving images acquired by the image sensor in a video call mode or a capture mode. The processed video frames may be displayed on the display 151 or stored in the memory 170.

The first and second manipulation units 123a and 123b are examples of the user input unit 123, which may be manipulated by a user to provide input to the electronic device 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

On the other hand, the electronic device 100 may include a finger scan sensor which scans a user's fingerprint. The processor 180 may use fingerprint information sensed by the finger scan sensor as an authentication means. The finger scan sensor may be installed in the display 151 or the user input unit 123.

The wired communication module 160 may serve as a path allowing the electronic device 100 to interface with external devices. For example, the wired communication module 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the electronic device 100. The wired communication module 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a. The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained. The flash 125 may be disposed adjacent to the second camera 121b. When an image of a subject is captured with the camera 121b, the flash 125 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication. Furthermore, the microphone 152c may be configured to receive the user's voice, other sounds, and the like. The microphone 152c may be provided at a plurality of places, and configured to receive stereo sounds.

At least one antenna for wireless communication may be disposed on the terminal body. The antenna may be embedded in the terminal body or formed in the case. Meanwhile, a plurality of antennas connected to the 4G wireless communication module 111 and the 5G wireless communication module 112 may be arranged on a side surface of the terminal. Alternatively, an antenna may be formed in a form of film to be attached onto an inner surface of the rear cover 103 or a case including a conductive material may serve as an antenna.

Meanwhile, the plurality of antennas arranged on a side surface of the terminal may be implemented with four or more antennas to support MIMO. In addition, when the 5G wireless communication module 112 operates in a millimeter wave (mmWave) band, as each of the plurality of antennas is implemented as an array antenna, a plurality of array antennas may be arranged in the electronic device.

The terminal body is provided with a power supply unit 190 (see FIG. 1A) for supplying power to the electronic device 100. The power supply unit 190 may include a batter 191 which is mounted in the terminal body or detachably coupled to an outside of the terminal body.

Hereinafter, a multi-communication system structure and an electronic device including the same according to an embodiment, particularly embodiments related to an antenna and an electronic device including the same in a heterogeneous radio system, will be described with reference to the accompanying drawings. It will be apparent to those skilled in the art that the present disclosure may be embodied in other specific forms without departing from the spirit or essential characteristics thereof.

Meanwhile, a detailed operation and function of an electronic device having a plurality of antennas according to an embodiment provided with the 4G/5G wireless communication module as shown in FIG. 2A will be described below.

In a 5G communication system according to an embodiment, a 5G frequency band may be a higher frequency band than a sub-6 band. For example, the 5G frequency band may be a millimeter wave band, but the present disclosure may not be limited thereto and may be changed according to an application.

Figure 3A:
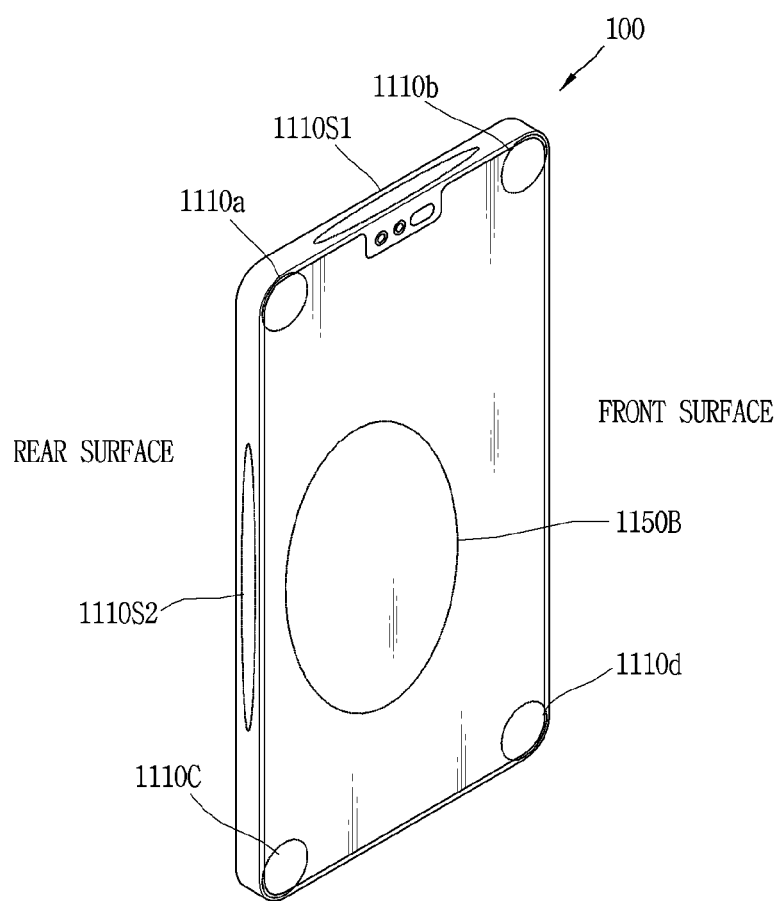
FIG. 3A illustrates an example of a configuration in which a plurality of antennas in an electronic device according to an embodiment can be arranged.

FIG. 3A illustrates an example of a configuration in which a plurality of antennas in an electronic device according to an embodiment can be arranged. Referring to FIG. 3A, a plurality of antennas 1110a to 1110d may be arranged on an inner side of or a front surface of the electronic device 100. In this regard, the plurality of antennas 1110a to 1110d may be implemented in a form printed on a carrier in an electronic device or in a system-on-chip (Soc) form along with an RFIC. Meanwhile, the plurality of antennas 1110a to 1110d may be disposed on a front surface of the electronic device in addition to an inner side of the electronic device. In this regard, the plurality of antennas 1110a to 1110d disposed on a front surface of the electronic device 100 may be implemented as transparent antennas embedded in a display.

On the other hand, a plurality of antennas 1110S1 and 1110S2 may be disposed on a side surface of the electronic device 100. In this regard, a 4G antenna may be disposed on a side surface of the electronic device 100 in the form of a conductive member, and a slot may be disposed in a conductive member region, and the plurality of antennas 1110a to 1110d may be configured to radiate 5G signals through the slot. Furthermore, antennas 1150B may be arranged on a rear surface of the electronic device 100 to radiate 5G signals to the back.

Meanwhile, the present disclosure may transmit or receive at least one signal through the plurality of antennas 1110S1 and 1110S2 on a side surface of the electronic device 100. In addition, the present disclosure may transmit or receive at least one signal through the plurality of antennas 1110a to 1110d, 1150B, 1110S1, and 1110S2 on a front and/or side surface of the electronic device 100. The electronic device may communicate with a base station through any one of the plurality of antennas 1110a to 1110d, 1150B, 1110S1, and 1110S2. Alternatively, the electronic device may perform multi-input multi-output (MIMO) communication with the base station through two or more antennas among the plurality of antennas 1110a to 1110d, 1150B, 1110S1, and 1110S2.

Figure 3B:
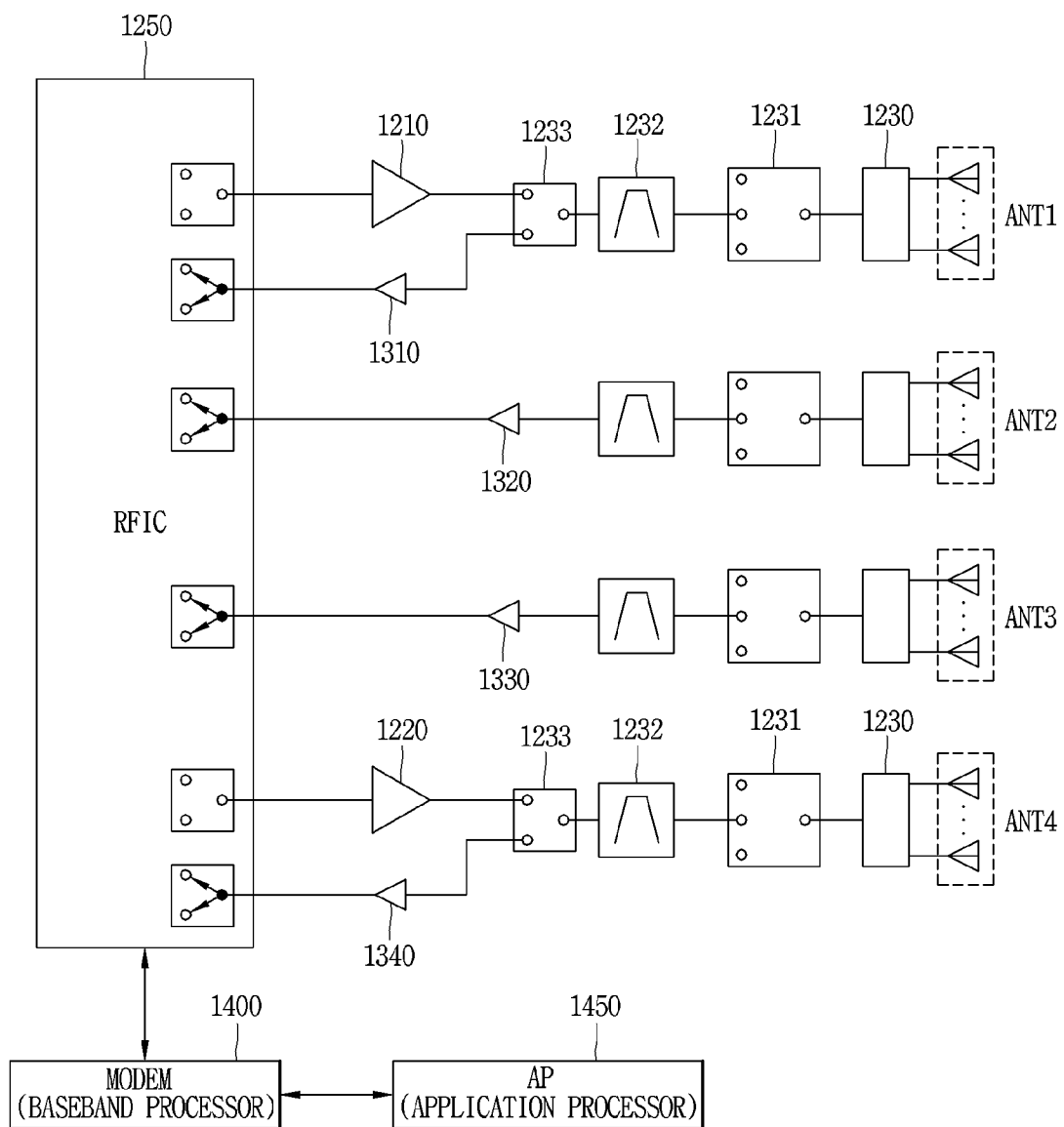
FIG. 3B is a block diagram illustrating a configuration of a wireless communication module of an electronic device operable in a plurality of wireless communication systems according to an embodiment.

FIG. 3B is a block diagram illustrating a configuration of a wireless communication module of an electronic device operable in a plurality of wireless communication systems according to an embodiment. Referring to FIG. 3B, the electronic device includes a first power amplifier 1210, a second power amplifier 1220, and an RFIC 1250. In addition, the electronic device may further include a modem 400 and an application processor (AP) 500. Here, the modem 400 and the application processor (AP) 500 may be physically implemented on a single chip, and may be implemented in a logical and functionally separated form. However, the present disclosure may not be limited thereto and may be implemented in the form of a chip that is physically separated according to an application.

Meanwhile, the electronic device includes a plurality of low noise amplifiers (LNAs) 410 to 440 in the receiver. Here, the first power amplifier 1210, the second power amplifier 1220, the RFIC 1250, and the plurality of low noise amplifiers 310 to 340 are all operable in a first communication system and a second communication system. In this case, the first communication system and the second communication system may be a 4G communication system and a 5G communication system, respectively.

As illustrated in FIG. 2B, the RFIC 1250 may be configured as a 4G/5G integrated type, but the present disclosure may not be limited thereto. The RFIC 250 may be configured as a 4G/5G separated type according to an application. When the RFIC 1250 is configured as a 4G/5G integration type, it is advantageous in terms of synchronization between 4G/5G circuits, and also there is an advantage that control signaling by the modem 1400 can be simplified.

On the other hand, when the RFIC 1250 is configured as the 4G/5G separated type, the separated RFIDs may be referred to as 4G RFIC and 5G RFIC, respectively. In particular, when a band difference between the 5G band and the 4G band is large, such as when the 5G band is configured as a millimeter wave band, the RFIC 1250 may be configured as a 4G/5G separation type. As such, when the RFIC 1250 is configured as a 4G/5G separation type, there is an advantage that the RF characteristics can be optimized for each of the 4G band and the 5G band.

Meanwhile, even when the RFIC 1250 is configured as a 4G/5G separation type, the 4G RFIC and the 5G RFIC may be logically and functionally separated but physically implemented on a single chip.

On the other hand, the application processor (AP) 1450 is configured to control the operation of each component of the electronic device. Specifically, the application processor (AP) 1450 may control the operation of each component of the electronic device through the modem 1400.

For example, the modem 1400 may be controlled through a power management IC (PMIC) for low power operation of the electronic device. Accordingly, the modem 1400 may operate the power circuits of the transmitter and the receiver in a low power mode through the RFIC 1250.

In this regard, when it is determined that the electronic device is in an idle mode, the application processor (AP) 500 may control the RFIC 1250 through the modem 300 as follows. For example, when the electronic device is in an idle mode, the application processor 280 may control the RFIC 1250 through the modem 300, such that at least one of the first and second power amplifiers 110 and 120 operates in the low power mode or is turned off.

According to another embodiment, the application processor (AP) 500 may control the modem 300 to provide wireless communication capable of performing low power communication when the electronic device is in a low battery mode. For example, when the electronic device is connected to a plurality of entities among a 4G base station, a 5G base station, and an access point, the application processor (AP) 1450 may control the modem 1400 to enable wireless communication at the lowest power. Accordingly, the application processor (AP) 500 may control the modem 1400 and the RFIC 1250 to perform short-range communication using only the short-range communication module 113, even at the expense of throughput.

According to another embodiment, when the remaining battery level of the electronic device is above the threshold, the modem 300 may be controlled to select an optimal wireless interface. For example, the application processor (AP) 1450 may control the modem 1400 to receive data through both the 4G base station and the 5G base station according to the remaining battery level and the available radio resource information. In this case, the application processor (AP) 1450 may receive the remaining battery information from the PMIC, and the available radio resource information from the modem 1400. Accordingly, when the remaining battery level and the available radio resources are sufficient, the application processor (AP) 500 may control the modem 1400 and the RFIC 1250 to receive data through both the 4G base station and 5G base station.

Meanwhile, the multi-transceiving system of FIG. 3B may integrate a transmitter and a receiver of each radio system into a single transceiver. Accordingly, there is an advantage in that a circuit portion for integrating two types of system signals may be eliminated at a RF front-end.

Furthermore, since the front end parts can be controlled by an integrated transceiver, the front end parts may be more efficiently integrated than when the transceiving system is separated by communication systems.

In addition, when separated by communication systems, it may be impossible to control other communication systems as required, or impossible to perform efficient resource allocation since system delay increases due to this. On the other hand, the multi-transceiving system as illustrated in FIG. 2 has advantages of controlling different communication systems according to necessity and minimizing system delay, which may result in enabling efficient resource allocation.

Meanwhile, the first power amplifier 1210 and the second power amplifier 1220 may operate in at least one of the first and second communication systems. In this regard, when the 5G communication system operates in a 4G band or a sub-6 band, the first and second power amplifiers 1210 and 1220 may operate in both the first and second communication systems.

On the contrary, when the 5G communication system operates in a millimeter wave (mmWave) band, the first and second power amplifiers 1210, 1220 may operate in either the 4G band and the other in the millimeter wave band.

On the other hand, a transmitter and a receiver may be integrated to implement two different wireless communication systems using a single antenna using a dual transmit/receive antenna. In this case, 4×4 MIMO may be implemented using four antennas as illustrated in FIG. 3B. In this case, 4×4 DL MIMO may be performed through downlink (DL).

In this regard, Multi-Input and Multiple-Output (MIMO) is a key technology to improve the throughput. It uses multiple antennas both on the transmitter and receiver sides, so as to enable multi-layer data transmission. NR supports multi-layer data transmission for a single UE (single-user MIMO) with a maximum of eight transmission layers for DL and four for UL. NR also supports multi-layer data transmission to multiple UEs on different layers (multi-user MIMO) using a maximum of twelve transmission layers for DL and UL transmissions.

Reference Signals (RSs) are specified by assuming multi-layer transmissions. For demodulation of date/control information for both uplink and downlink, demodulation RS (DM-RS) is supported. For measurement of channel state information of downlink, channel state information RS (CSI-RS) is supported. CSI-RS is also used for mobility measurement, measurement of gNB transmission beamforming, and frequency/time tracking. The CSI-RS used for the frequency/time tracking is named as tracking RS (TRS). In a high frequency range, phase noise is a problem that degrades the transmission performance. A phase tracking reference signal (PT-RS) is applied with respect to PDSCH and PUSCH to enable a receiver to track the phase and mitigate performance loss due to the phase noise. For uplink channel sounding, sounding RS (SRS) is supported.

For UL multi-layer data transmission, both codebook-based precoding and non-codebook-based precoding are supported. In codebook-based UL transmission, precoding matrix applied for PUSCH transmission is selected by gNB. In non-codebook-based UL transmission, precoded multiple SRS are transmitted and then the gNB selects a desired transmission layer for PUSCH based on the reception of the SRS.

Since NR supports a multi-beam operation where every signal/channel is transmitted on directional beam, beamforming is an important technique for achieving higher throughput and sufficient coverage especially in a high frequency range. For DL transmission beamforming, a gNB applies transmission beamforming to SS/PBCH block and/or CSI-RS transmissions, and a UE measures reference signal received power on a physical layer (L1-RSRP) on the configured SS/PBCH block and/or CSI-RS resource. The UE reports an SS/PBCH block or CSI-RS resource with a maximum L1-RSRP value as L1-RSRP beam reporting. The gNB may decide gNB transmission beamforming for the UE based on the reported L1. For PDCCH/PDSCH transmission, the gNB informs the UE that the gNB transmission beamforming applied to a certain SS/PBCH block or CSI-RS resource is applied to the PDCCH/PDSCH transmission so that the UE can apply reception beamforming which fits into the gNB transmission beamforming. For UL transmission beamforming, two mechanisms are supported. In one of the mechanisms, the UE transmits multiple SRS symbols with different UE transmission beamforming so that the gNB can measure them and identify the best UE transmission beamforming. In another mechanism, the UE generates UL transmission beamforming which is the same as DL reception beamforming used for SS/PBCH block or CSI-RS resource reception. In addition, beam failure recovery (BFR) is supported to achieve quick recovery from the beam failure. The UE may identify the beam failure and informs the gNB of the index of SS/PBCH block or CSI-RS resource as new candidate beam.

For DL channel state information (CSI) acquisition, NR supports two precoding matrix indicator (PMI) definitions, type I and II codebooks that provide different levels of CSI granularity.

Meanwhile, when the 5G band is a sub-6 band, first to fourth antennas (ANT1 to ANT4) may be configured to operate in both the 4G band and the 5G band. In this regard, UL-MIMO and/or DL-MIMO may be performed through the first to fourth antennas ANT1 to ANT4.

In the case of PC2 UE having two transmitting antennas in a closed-loop spatial multiplexing scheme, maximum output power for all transmission bandwidths in a channel bandwidth may be specified. These maximum output power requirements may comply with the specified UL-MIMO configuration. For UE supporting UL-MIMO, the maximum output power may be measured as the sum of maximum output power at each UE antenna connector. A measurement period may be defined as at least one subframe (1 ms), but may not be limited thereto. In the case of UE having two transmitting antennas in a closed-loop spatial multiplexing scheme, the maximum power reduction (MPR) allowable for maximum output power may be specified. In the case of UE having two transmitting antennas in a closed loop spatial multiplexing scheme, a specific additional maximum output power reduction (A-MPR) value may be applied to specific maximum output power. In the case of UE supporting UL-MIMO, transmission power may be configured for each UE. Definitions of the configured maximum output power PCMAX, c, a lower limit PCMAX_L, c and an upper limit PCMAX_H, c may be applied to the UE supporting UL-MIMO.

Regarding the output power adjustment (dynamics) for UL-MIMO, the minimum output power for the UL-MIMO, transmission OFF power, transmission ON/OFF time mask, and power control may be applied. For UE having two transmitting antennas in a closed-loop spatial multiplexing scheme, the minimum output power is defined as the sum of an average power of each transmitting antenna in one subframe (1 ms). It may be controlled so that the minimum output power does not exceed a specific value.

If a 5G band is a mmWave band, UL-MIMO and/or DL-MIMO may be performed in the mmWave band through the first to fourth antennas ANT1 to ANT4. The operating band for UL-MIMO may be at least one of n257, n258, n260, and n261 bands. Transmission power for UL-MIMO may be defined. UE maximum power for UL-MIMO may be defined for each power class (PC). For PC1 UE, the UE maximum power may be defined as the maximum output power radiated by the UE using UL-MIMO for all transmission bandwidths within a channel bandwidth for non-CA configuration.

For each of PC1 UE to PC4 UE, the UE minimum peak EIRP (dBm) for UL-MIMO, UE maximum power limit, and UE spherical coverage may be defined for each band. In relation to these requirements, a measurement period may be at least one subframe (1 ms).

Meanwhile, a channel bandwidth for UL-MIMO and UE maximum power for modulation may be defined for each power class (PC). Regarding the output power adjustment (dynamics) for UL-MIMO, the minimum output power for the UL-MIMO, transmission OFF power, transmission ON/OFF time mask, and power control may be applied.

Each of the first to fourth antennas ANT1 to ANT4 may be configured as an array antenna. Meanwhile, 2×2 MIMO may be implemented using two antennas connected to the first power amplifier 1210 and the second power amplifier 1220 among four antennas. In this case, 2×2 UL MIMO (2 Tx) may be performed through uplink (UL). Alternatively, the present disclosure may not be limited to 2×2 UL MIMO and may be implemented using 1Tx or 4Tx. In this case, when the 5G communication system is implemented with 1 Tx, only one of the first and second power amplifiers 1210, 1220 may operate in the 5G band. Meanwhile, when the 5G communication system is implemented using 4Tx, an additional power amplifier operating in the 5G band may be further provided. Alternatively, a transmission signal may be branched in each of one or two transmission paths, and the branched transmission signals may be connected to the plurality of antennas.

On the other hand, a switch-type splitter or power divider is embedded in an RFIC corresponding to the RFIC 1250. Accordingly, a separate external component is not needed, thereby improving a component mounting configuration. In more detail, a single pole double throw (SPDT) type switch may be provided in the RFIC corresponding to the controller 1250 to select transmitters (TXs) of two different communication systems.

In addition, the electronic device that is operable in the plurality of wireless communication systems according to an embodiment may further include a duplexer (1231), a filter 1232 and a switch 1233.

The duplexer 1231 is configured to separate signals in a transmission band and a reception band from each other. In this case, signals in a transmission band transmitted through the first and second power amplifiers 1210, 1220 are applied to the antennas (ANT1, ANT4) through a first output port of the duplexer 1231. On the contrary, a signal in a reception band received through the antennas (ANT1, ANT4) are received by the low noise amplifiers 310, 340 through a second output port of the duplexer 1231.

The filter 1232 may be configured to pass signals in a transmission band or a reception band and block signals in the remaining bands. In this case, the filter 1232 may include a transmission filter connected to the first output port of the duplexer 1231 and a reception filter connected to the second output port of the duplexer 1231. Alternatively, the filter 1232 may be configured to pass only signals in the transmission band or only signals in the reception band according to a control signal.

The switch 1233 is configured to transmit only one of the transmission signal and the reception signal. In an embodiment of the present disclosure, the switch 1233 may be configured in a single-pole double-throw (SPDT) type to separate a transmission signal and a reception signal in a time division duplex (TDD) scheme. Here, the transmission signal and the reception signal are signals of the same frequency band, and thus the duplexer 1231 may be implemented in the form of a circulator.

Meanwhile, in another implementation of the present invention, the switch 1233 may also be applied to a frequency division multiplex (FDD) scheme. In this case, the switch 1233 may be configured in the form of a double-pole double-throw (DPDT) to connect or block a transmission signal and a reception signal, respectively. On the other hand, the transmission signal and the reception signal may be separated by the duplexer 1231, and thus the switch 1233 is not necessarily required.

Meanwhile, the electronic device according to an embodiment may further include a modem 1400 corresponding to the controller. In this case, the RFIC 1250 and the modem 1400 may be referred to as a first controller (or a first processor) and a second controller (a second processor), respectively. On the other hand, the RFIC 1250 and the modem 1400 may be implemented as physically separated circuits. Alternatively, the RFIC 1250 and the modem 1400 may be logically or functionally distinguished from each other on one physical circuit.

The modem 1400 may perform control of signal transmission and reception through different communication systems using the RFID 1250 and processing of those signals. The modem 1400 may be acquired through control information received from the 4G base station and/or the 5G base station. Here, the control information may be received through a physical downlink control channel (PDCCH), but the present disclosure may not be limited thereto.

The modem 1400 may control the RFIC 1250 to transmit and/or receive signals through the first communication system and/or the second communication system at specific time and frequency resources. Accordingly, the RFIC 1250 may control transmission circuits including the first and second power amplifiers 1210 and 1220 to transmit a 4G signal or a 5G signal at a specific time interval. In addition, the RFIC 1250 may control reception circuits including the first to fourth low noise amplifiers 1310 to 1340 to receive a 4G signal or a 5G signal at a specific time interval.

Meanwhile, the multi-transceiving system of FIG. 3B may integrate a transmitter and a receiver of each radio system into a single transceiver. Accordingly, there is an advantage in that a circuit portion for integrating two types of system signals may be eliminated at a RF front-end.

Furthermore, since the front end parts can be controlled by an integrated transceiver, the front end parts may be more efficiently integrated than when the transceiving system is separated by communication systems. On the contrary, the multi-transceiving system as shown in FIG. 3B may control other communication systems as needed, thereby minimizing system delay due to this, and thus there is an advantage in that efficient resource allocation is possible.

Meanwhile, the first power amplifier 1210 and the second power amplifier 1220 may operate in at least one of the first and second communication systems. In this regard, when the 5G communication system operates in a 4G band or a sub-6 band, the first and second power amplifiers 1210 and 1220 may operate in both the first and second communication systems.

On the contrary, when the 5G communication system operates in a millimeter wave (mmWave) band, the first and second power amplifiers 1210, 1220 may operate in either the 4G band and the other in the millimeter wave band.

Figure 5A:
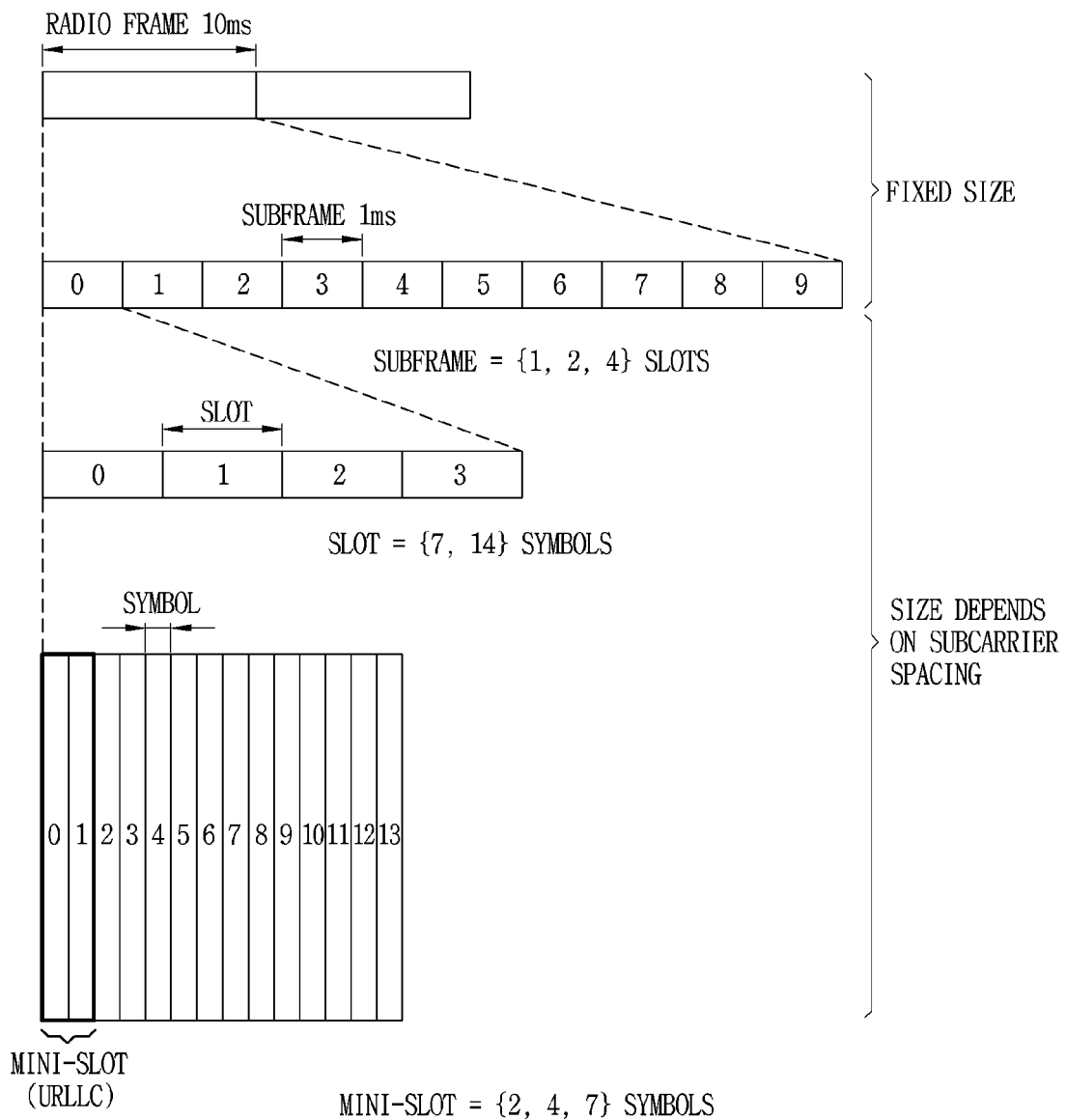
FIG. 5A is a view illustrating an example of a frame structure in NR.

On the other hand, a transmitter and a receiver may be integrated to implement two different wireless communication systems using a single antenna using a dual transmit/receive antenna. In this case, 4×4 MIMO may be implemented using four antennas as illustrated in FIG. 5A. In this case, 4×4 DL MIMO may be performed through downlink (DL).

Figure 3C:
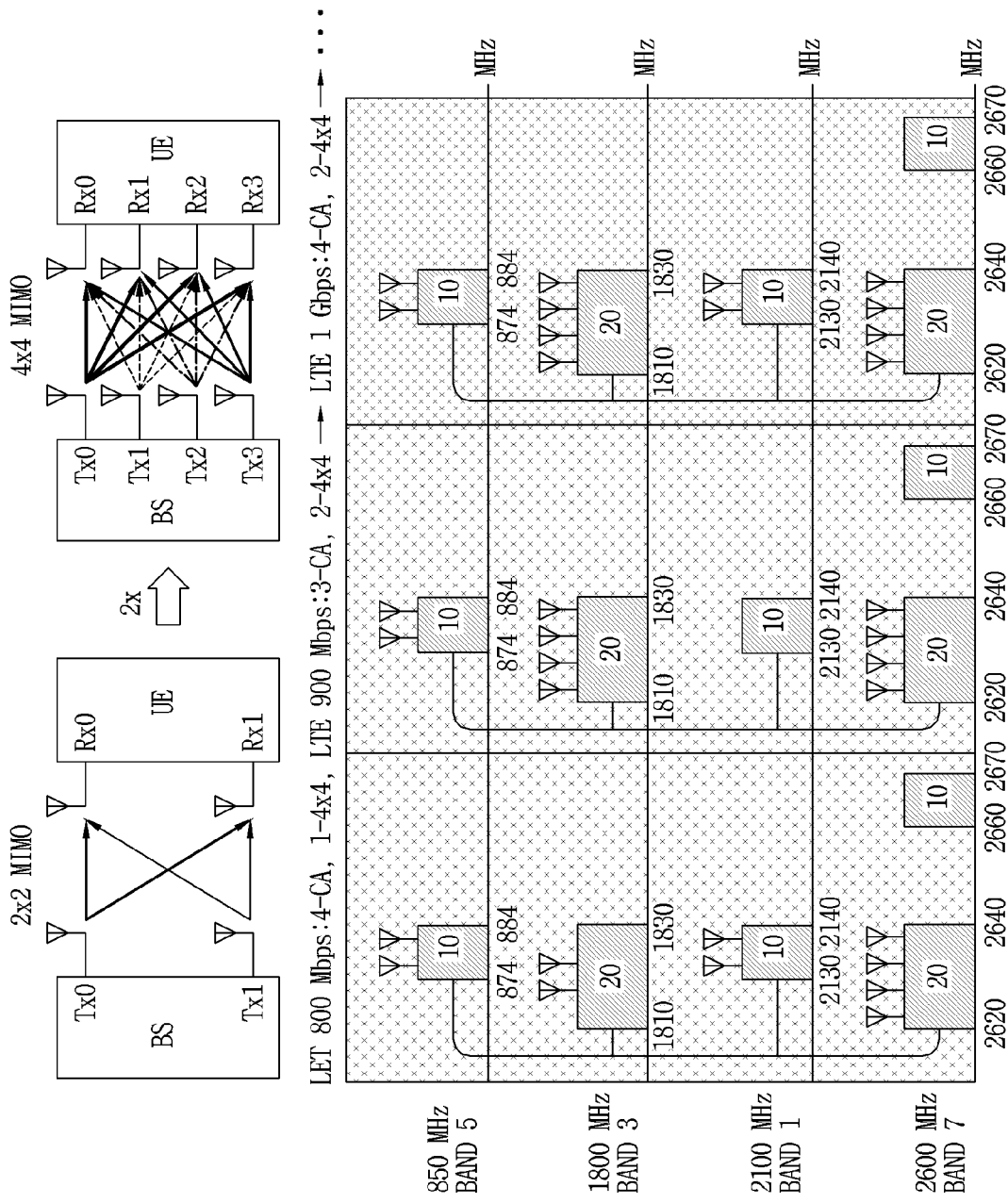
FIG. 3C is a diagram illustrating a MIMO configuration and a MIMO+carrier aggregation (CA) configuration between a UE and a base station (BS) in accordance with one implementation.
Figure 4:
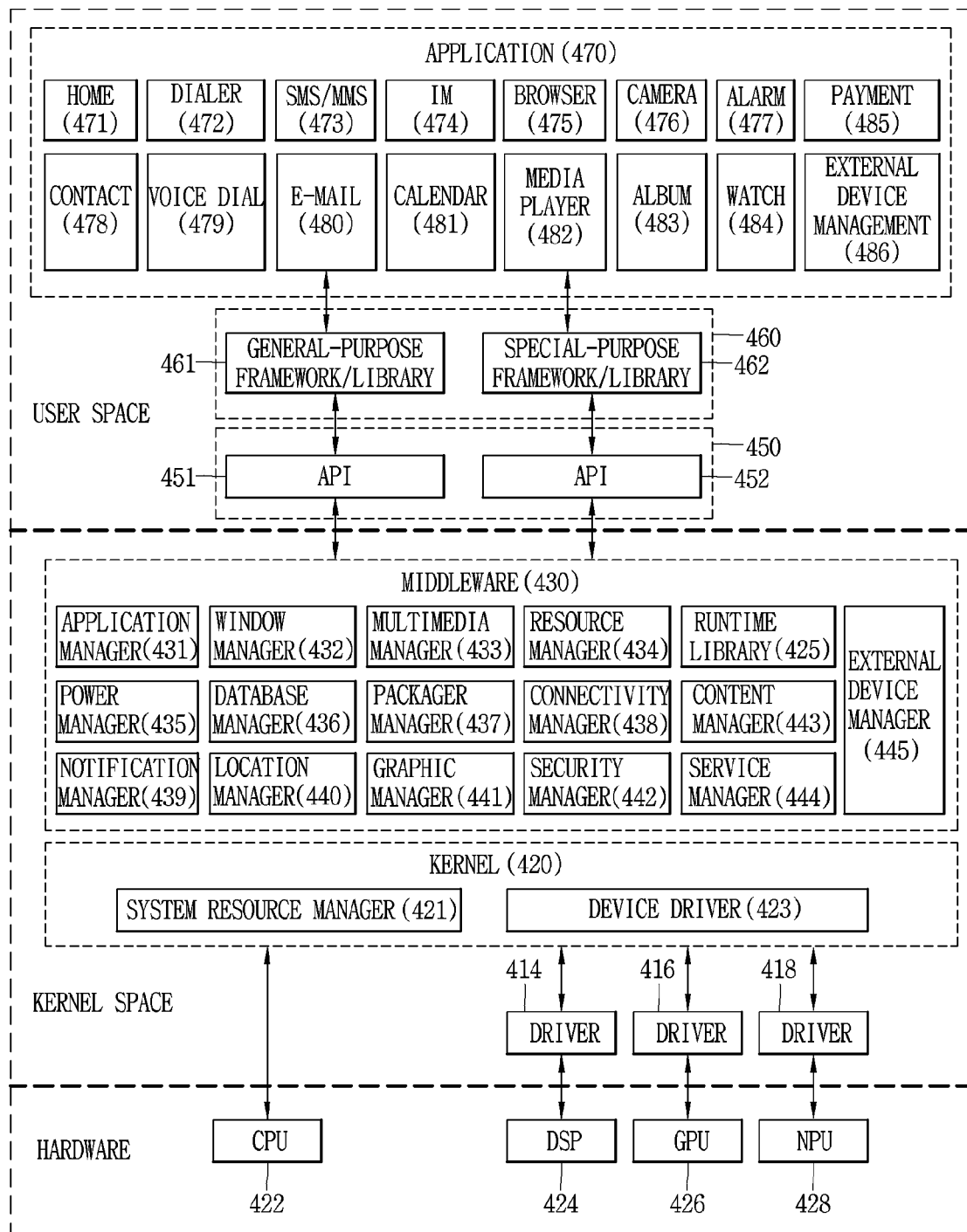
FIG. 4 is a view illustrating a framework structure related to an application program operating in an electronic device according to one embodiment.

In this regard, Multi-Input and Multiple-Output (MIMO) is a key technology to improve the throughput. FIG. 3C is a diagram illustrating a MIMO configuration and a MIMO+ carrier aggregation (CA) configuration between a UE and a base station (BS) in accordance with one implementation. Referring to FIG. 3C, 4×4 MIMO requires four Tx antennas at the base station and four Rx antennas at the UE. In addition, if the four antennas of the base station operate as Rx antennas, the four antennas of the UE operate as Tx antennas. Thus, 4×4 MIMO can double a data rate (or capacity) compared to 2×2 MIMO.

It uses multiple antennas both on the transmitter and receiver sides, so as to enable multi-layer data transmission. NR supports multi-layer data transmission for a single UE (single-user MIMO) with a maximum of eight transmission layers for DL and four for UL. NR also supports multi-layer data transmission to multiple UEs on different layers (multi-user MIMO) using a maximum of twelve transmission layers for DL and UL transmissions.

Reference Signals (RSs) are specified by assuming multi-layer transmissions. For demodulation of date/control information for both uplink and downlink, demodulation RS (DM-RS) is supported. For measurement of channel state information of downlink, channel state information RS (CSI-RS) is supported. CSI-RS is also used for mobility measurement, measurement of gNB transmission beamforming, and frequency/time tracking. The CSI-RS used for the frequency/time tracking is named as tracking RS (TRS). In a high frequency range, phase noise is a problem that degrades the transmission performance. A phase tracking reference signal (PT-RS) is applied with respect to PDSCH and PUSCH to enable a receiver to track the phase and mitigate performance loss due to the phase noise. For uplink channel sounding, sounding RS (SRS) is supported.

For UL multi-layer data transmission, both codebook-based precoding and non-codebook-based precoding are supported. In codebook-based UL transmission, precoding matrix applied for PUSCH transmission is selected by gNB. In non-codebook-based UL transmission, precoded multiple SRS are transmitted and then the gNB selects a desired transmission layer for PUSCH based on the reception of the SRS.

Since NR supports a multi-beam operation where every signal/channel is transmitted on directional beam, beamforming is an important technique for achieving higher throughput and sufficient coverage especially in a high frequency range. For DL transmission beamforming, a gNB applies transmission beamforming to SS/PBCH block and/or CSI-RS transmissions, and a UE measures reference signal received power on a physical layer (L1-RSRP) on the configured SS/PBCH block and/or CSI-RS resource. The UE reports an SS/PBCH block or CSI-RS resource with a maximum L1-RSRP value as L1-RSRP beam reporting. The gNB may decide gNB transmission beamforming for the UE based on the reported L1. For PDCCH/PDSCH transmission, the gNB informs the UE that the gNB transmission beamforming applied to a certain SS/PBCH block or CSI-RS resource is applied to the PDCCH/PDSCH transmission so that the UE can apply reception beamforming which fits into the gNB transmission beamforming. For UL transmission beamforming, two mechanisms are supported. In one of the mechanisms, the UE transmits multiple SRS symbols with different UE transmission beamforming so that the gNB can measure them and identify the best UE transmission beamforming. In another mechanism, the UE generates UL transmission beamforming which is the same as DL reception beamforming used for SS/PBCH block or CSI-RS resource reception. In addition, beam failure recovery (BFR) is supported to achieve quick recovery from the beam failure. The UE may identify the beam failure and informs the gNB of the index of SS/PBCH block or CSI-RS resource as new candidate beam.

For DL channel state information (CSI) acquisition, NR supports two precoding matrix indicator (PMI) definitions, type I and II codebooks that provide different levels of CSI granularity.

With respect to carrier aggregation (CA), 5-CA that aggregates up to 5 bands may be applied. The CA may be applied in combination with MIMO. Referring to FIG. 3C, 4-CA and 1-4×4 MIMO (2.6 GHz) may support up to 800 Mbps. In this regard, 4-CA may be supported for Bands 1, 3, 5, and 7. Bands 1, 3, 5, and 7 may have bandwidths of 10, 20, 10, and 20 MHz, respectively. 4×4 MIMO may be applied to Band 7.

Meanwhile, 3-CA and 2-4×4 MIMO (2.6 GHz and 1.8 GHz) may support up to 900 Mbps. 3-CA may be supported for Bands 3, 5, and 7. 4×4 MIMO may be applied to Band 7.

Meanwhile, 4-CA and 2-4×4 MIMO supporting 1 Gbps may be supported. 4-CA may be supported for Bands 1, 3, 5, and 7. Bands 1, 3, 5, and 7 may have bandwidths of 10, 20, 10, and 20 MHz, respectively. 4×4 MIMO may be applied to Bands 3 and 7. Meanwhile, 5-CA and 3-4×4 MIMO supporting 1 Gbps may be supported.

By aggregating 5 carriers and applying 256 QAM and 4×4 MIMO in all bands, a data rate can be improved up to 1.4 Gbps. However, a 4.5G or 5G data rate may be gradually improved depending on processing performance of a UE in use (e.g., the number of data streams that can be simultaneously processed).

The combination of CA and MIMO may be applied to 5G NR in addition to 4G LTE. CA and MIMO for 4G LTE or 5G NR may be referred to as intra-CA+MIMO. On the other hand, CA and MIMO for both 4G LTE and 5G NR may be referred to as inter-CA+MIMO.

Meanwhile, when the 5G band is a sub-6 band, first to fourth antennas (ANT1 to ANT4) may be configured to operate in both the 4G band and the 5G band. In this regard, UL-MIMO and/or DL-MIMO may be performed through the first to fourth antennas ANT1 to ANT4.

In the case of PC2 UE having two transmitting antennas in a closed-loop spatial multiplexing scheme, maximum output power for all transmission bandwidths in a channel bandwidth may be specified. These maximum output power requirements may comply with the specified UL-MIMO configuration. For UE supporting UL-MIMO, the maximum output power may be measured as the sum of maximum output power at each UE antenna connector. A measurement period may be defined as at least one subframe (1 ms), but may not be limited thereto. In the case of UE having two transmitting antennas in a closed-loop spatial multiplexing scheme, the maximum power reduction (MPR) allowable for maximum output power may be specified. In the case of UE having two transmitting antennas in a closed loop spatial multiplexing scheme, a specific additional maximum output power reduction (A-MPR) value may be applied to specific maximum output power. In the case of UE supporting UL-MIMO, transmission power may be configured for each UE. Definitions of the configured maximum output power PCMAX, c, a lower limit PCMAX_L, c and an upper limit PCMAX_H, c may be applied to the UE supporting UL-MIMO.

Regarding the output power adjustment (dynamics) for UL-MIMO, the minimum output power for the UL-MIMO, transmission OFF power, transmission ON/OFF time mask, and power control may be applied. For UE having two transmitting antennas in a closed-loop spatial multiplexing scheme, the minimum output power is defined as the sum of an average power of each transmitting antenna in one subframe (1 ms). It may be controlled so that the minimum output power does not exceed a specific value.

If a 5G band is a mmWave band, UL-MIMO and/or DL-MIMO may be performed in the mmWave band through the first to fourth antennas ANT1 to ANT4. The operating band for UL-MIMO may be at least one of n257, n258, n260, and n261 bands. Transmission power for UL-MIMO may be defined. UE maximum power for UL-MIMO may be defined for each power class (PC). For PC1 UE, the UE maximum power may be defined as the maximum output power radiated by the UE using UL-MIMO for all transmission bandwidths within a channel bandwidth for non-CA configuration.

For each of PC1 UE to PC4 UE, the UE minimum peak EIRP (dBm) for UL-MIMO, UE maximum power limit, and UE spherical coverage may be defined for each band. In relation to these requirements, a measurement period may be at least one subframe (1 ms).

Meanwhile, a channel bandwidth for UL-MIMO and UE maximum power for modulation may be defined for each power class (PC). Regarding the output power adjustment (dynamics) for UL-MIMO, the minimum output power for the UL-MIMO, transmission OFF power, transmission ON/OFF time mask, and power control may be applied.

Each of the first to fourth antennas ANT1 to ANT4 may be configured as an array antenna. Meanwhile, 2×2 MIMO may be implemented using two antennas connected to the first power amplifier 1210 and the second power amplifier 1220 among four antennas. In this case, 2×2 UL MIMO (2 Tx) may be performed through uplink (UL). Alternatively, the present disclosure may not be limited to 2×2 UL MIMO and may be implemented using 1Tx or 4Tx. In this case, when the 5G communication system is implemented with 1 Tx, only one of the first and second power amplifiers 1210, 1220 may operate in the 5G band. Meanwhile, when the 5G communication system is implemented using 4Tx, an additional power amplifier operating in the 5G band may be further provided. Alternatively, a transmission signal may be branched in each of one or two transmission paths, and the branched transmission signals may be connected to the plurality of antennas.

Meanwhile, as shown in FIG. 5, an application program operating in the electronic device described herein may be executed by interworking with a user space, a kernel space, and hardware. FIG. 4 is a view illustrating a framework structure related to an application program operating in an electronic device according to one implementation. The program module 410 may include a kernel 420, middleware 430, an API 450, a framework/library 460, and/or an application 470. At least part of the program module 410 may be pre-loaded on an electronic device or downloaded from an external device or a server.

The kernel 420 may include a system resource manager 421 and/or a device driver 423. The system resource manager 421 may perform control, allocation, or retrieval of system resources. According to one embodiment, the system resource manager 421 may include a process manager, a memory manager, or a file system manager. The device driver 423 may include a display driver, a camera driver, a Bluetooth driver, a shared memory driver, a USB driver, a keypad driver, a WiFi driver, an audio driver, or an inter-process communication (IPC) driver. The middleware 430 may provide functions commonly required by the application 470 or provide various functions to the application 470 through the API 460, for example, to allow the application 470 to use limited system resources inside the electronic device.

The middleware 430 may include at least one of a runtime library 425, an application manager 431, a window manager 432, a multimedia manager 433, a resource manager 434, a power manager 435, a database manager 436, a package manager 437, a connectivity manager 438, a notification manager 439, a location manager 440, a graphic manager 441, a security manager 442, a content manager 443, a service manager 444 and an external device manager 445.

The framework/library 460 may include a general-purpose framework/library 461 and a special-purpose framework/library 462. Here, the general-purpose framework/library 461 and the special-purpose framework/library 462 may be referred to as a first framework/library 451 and a second framework/library 452, respectively. The first framework/library 461 and the second framework/library 462 may be interfaced with a kernel space and hardware through the first API 451 and the second API 452, respectively. Here, the second framework/library 452 may be an exemplary software architecture capable of modularizing artificial intelligence (AI) functions. Using the architecture, the various processing blocks of hardware implemented with a System on Chip (SoC) (e.g., CPU 422, DSP 424, GPU 426, and/or NPU 428) may perform functions for supporting operations during the runtime operation of the application 470.

The application 470 may include a home 471, a dialer 472, an SMS/MMS 473, an instant message 474, a browser 475, a camera 476, an alarm 477, a contact 478, a voice dial 479, an email 480, a calendar 481, a media player 482, an album 483, a watch 484, a payment 485, an accessory management 486, a health care, or an environmental information providing application.

An AI application may be configured to call functions defined in a user space capable of allowing the electronic device to provide for detection and recognition of a scene indicating a location at which the electronic device is currently operating. The AI application may configure a microphone and a camera differently depending on whether the recognized scene is an indoor space or an outdoor space. The AI application may make a request for compiled program codes associated with a library defined in a scene detect application programming interface (API) to provide an estimate of the current scene. This request may rely on the output of a deep neural network configured to provide scene estimates based on video and location data.

The framework/library 462, which may be compiled codes of the Runtime Framework, may be further accessible by the AI application. The AI application may cause a runtime framework engine to request scene estimation triggered at specific time intervals or by events detected by the application's user interface. When estimating a scene, the runtime engine may then send a signal to an operating system such as a Linux kernel running on the SoC. The operating system may cause the operation to be performed on the CPU 422, the DSP 424, the GPU 426, the NPU 428, or some combination thereof. The CPU 422 may be accessed directly by the operating system and other processing blocks may be accessed via a driver such as a driver 414 to 418 for the DSP 424, the GPU 426, or the NPU 428. In an illustrative example, a deep neural network and an AI algorithm may be configured to run on a combination of processing blocks, such as the CPU 422 and the GPU 426, or an AI algorithm such as a deep neural network may run on the NPU 428.

The AI algorithm performed through the special-purpose framework/library as described above may be performed only by the electronic device or by a server supported scheme. When the AI algorithm is performed by the server supported scheme, the electronic device may receive and transmit information associated AI processing with the AI server through the 4G/5G communication system.

Meanwhile, referring to FIGS. 1A and 2A, a 5G wireless communication system, that is, 5G new radio access technology (NR) may be provided. In this regard, as more communication devices demand larger communication capacities, there is a need for improved mobile broadband communication as compared to radio access technology in the related art. In addition, massive MTC (Machine Type Communications), which connects multiple devices and objects to provide various services anytime and anywhere, is also one of major issues to be considered in next-generation communication. In addition, communication system design in consideration of services/terminals that are sensitive to reliability and latency is being discussed. As described above, introduction of next-generation radio access technology in consideration of enhanced mobile broadband communication (eMBB), massive MTC (mMTC), ultra-reliable and low latency communication (URLLC), and the like, is being discussed, and the relevant technology is referred to herein as NR for the sake of convenience. The NR is an expression showing an example of 5G radio access technology (RAT).

A new RAT system including the NR uses an OFDM transmission scheme or a similar transmission scheme. The new RAT system may follow OFDM parameters different from the OFDM parameters of LTE. Alternatively, the new RAT system may follow the existing numerology of LTE/LTE-A as it is but have a larger system bandwidth (e.g., 100 MHz). Alternatively, a single cell may support a plurality of numerologies. In other words, electronic devices operating with different numerologies may coexist in a single cell.

In this regard, in the case of 4G LTE, since the maximum bandwidth of the system is limited to 20 MHz, a single sub-carrier spacing (SCS) of 15 KHz is used. However, since 5G NR supports a channel bandwidth between 5 MHz and 400 MHz, FFT processing complexity may increase to process the entire bandwidth through a single subcarrier spacing. Accordingly, the subcarrier spacing used for each frequency band may be extended and applied.

A numerology corresponds to one subcarrier spacing in the frequency domain. By scaling a reference subcarrier spacing to an integer N, different numerologies may be defined. In this regard, FIG. 5A shows an example of a frame structure in NR. FIG. 5B is a view illustrating a change in a slot length in accordance with a change in a subcarrier spacing in the NR.

An NR system may support a number of numerologies. Here, a numerology may be defined by a subcarrier spacing and a cyclic prefix overhead. Here, a plurality of subcarrier spacings may be derived by scaling a basic subcarrier spacing to an integer N (or µ). Furthermore, even when it is assumed that a very low subcarrier spacing is not used at a very high carrier frequency, the used numerology may be selected independently of the frequency band. In addition, in an NR system, various frame structures according to a number of numerologies may be supported.

Hereinafter, an Orthogonal Frequency Division Multiplexing (OFDM) numerology and frame structure that can be considered in the NR system will be described. A number of OFDM numerologies supported in the NR system may be defined as shown in Table 1 below.

TABLE 1

| µ | $\Delta f = 2^{\mu} * 15$ [kHz] | Cyclic prefix (CP) |
|---|---|---|
| 0 | 15 | Normal |
| 1 | 30 | Normal |
| 2 | 60 | Normal, Extended |
| 3 | 120 | Normal |
| 4 | 240 | Normal |

NR supports a number of numerologies (or subcarrier spacings (SCSs)) for supporting various 5G services. For example, NR supports a wide area in traditional cellular bands when the SCS is 15 kHz, and supports a dense-urban, a lower latency and a wider carrier bandwidth when the SCS is 30 kHz/60 kHz, and supports a bandwidth greater than 24.25 GHz to overcome phase noise when the SCS is 60 kHz or higher. The NR frequency band is defined as a frequency range of two types (FR1, FR2). The FR1 is a sub-6 GHz range, and the FR2 is a range of above 6 GHz, which may denote millimeter waves (mmWs). Table 2 below shows the definition of the NR frequency band.

TABLE 2

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

With regard to a frame structure in a NR system, the sizes of various fields in the time domain are expressed in multiples of a specific time unit. FIG. 3A illustrates an example of an SCS of 60 kHz, in which one subframe may include four slots. One example of one subframe={1,2,4} slots is shown in FIG. 3, in which the number of slot(s) that can be included in one subframe may be one, two or four. In addition, a mini-slot may include two, four, or seven symbols or may include more or fewer symbols. Referring to FIG. 5B, a subcarrier spacing of 5G NR phase I and a length of an OFDM symbol corresponding to the spacing are shown. Each subcarrier spacing is extended by a multiplier of two, which inversely reduces the symbol length. In FR1, subcarrier spacings of 15 kHz, 30 kHz, and 60 kHz may be available, depending on a frequency band/bandwidth. In FR2, 60 kHz and 120 kHz may be used for data channels, and 240 kHz may be used for synchronization signals.

In 5G NR, a basic unit of scheduling may be defined as a slot, and the number of OFDM symbols included in a single slot may be limited to 14 as shown in FIG. 3A or 3B regardless of the subcarrier spacing. Referring to FIG. 3B, when a wide subcarrier spacing is used, the length of one slot may decrease in inverse proportion to the subcarrier spacing, thereby reducing transmission delay in a wireless section. In addition, in order to efficiently support ultra reliable low latency communication (uRLLC), mini-slot (e.g., 2, 4, 7 symbols) unit scheduling may be supported, as described above, in addition to slot-based scheduling.

In consideration of the foregoing technical features, slots in 5G NR described herein may be provided at the same interval as those in 4G LTE or may be provided with slots of various sizes. For an example, in 5G NR, the slot interval may be configured to be 0.5 ms equal to that of 4G LTE. For another example, the slot interval in 5G NR may be configured to be 0.25 ms, which is a narrower interval than that in 4G LTE.

In this regard, the 4G communication system and the 5G communication system may be referred to as a first communication system and a second communication system, respectively. Accordingly, a first signal (first information) of the first communication system may be a signal (information) in a 5G NR frame having a slot interval that is scalable to 0.25 ms, 0.5 ms, and the like. On the contrary, a second signal (second information) of the second communication system may be a signal (information) in a 4G LTE frame having a fixed slot interval of 0.5 ms.

Meanwhile, the first signal of the first communication system may be transmitted and/or received through a maximum bandwidth of 20 MHz. On the contrary, the second signal of the second communication system may be transmitted and/or received through a variable channel bandwidth of 5 MHz to 400 MHz. In this regard, the first signal of the first communication system may be FFT-processed at a single sub-carrier spacing (SCS) of 15 KHz.

On the other hand, the second signal of the second communication system may be FFT-processed at subcarrier spacings of 15 kHz, 30 kHz, and 60 kHz according to the frequency band/bandwidth. In this case, the second signal of the second communication system may be modulated and frequency-converted into a FR1 band and transmitted through a 5G sub-6 antenna. Meanwhile, the FR1 band signal received through the 5G sub-6 antenna may be frequency-converted and demodulated. Then, the second signal of the second communication system may be IFFT-processed at subcarrier spacings of 15 kHz, 30 kHz, and 60 kHz according to the frequency band/bandwidth.

On the other hand, the second signal of the second communication system may be FFT-processed at subcarrier spacings of 60 kHz, 120 kHz, and 240 kHz according to the frequency band/bandwidth and data/synchronous channel. In this case, the second signal of the second communication system may be modulated in a FR2 band and transmitted through a 5G mmWave antenna. Meanwhile, the FR2 band signal received through the 5G mmWave antenna may be frequency converted and demodulated. Then, the second signal of the second communication system may be IFFT-processed through subcarrier spacings of 60 kHz, 120 kHz, and 240 kHz according to the frequency band/bandwidth and data/synchronous channel.

In 5G NR, symbol-level time alignment may be used for transmission schemes using various slot lengths, mini-slots, and different subcarrier spacings. Accordingly, the present disclosure provides flexibility to efficiently multiplex various communication services such as enhancement mobile broadband (eMBB) and ultra reliable low latency communication (uRLLC) in the time domain and the frequency domain. In addition, unlike 4G LTE, 5G NR may define uplink/downlink resource allocation at a symbol level within a single slot as shown in FIG. 3. In order to reduce a hybrid automatic repeat request (HARQ) delay, a slot structure capable of directly transmitting HARQ ACK/NACK in a transmission slot may be defined. This slot structure may be referred to as a self-contained structure.

Unlike 4G LTE, 5G NR may support a common frame structure constituting an FDD or TDD frame through a combination of various slots. Accordingly, a dynamic TDD scheme may be adopted to freely dynamically adjust the transmission direction of individual cells according to traffic characteristics.

On the other hand, a detailed operation and function of the electronic device having a plurality of antennas according to an embodiment provided with a multi-transceiving system as shown in FIG. 3B will be discussed below.

Figure 6A:
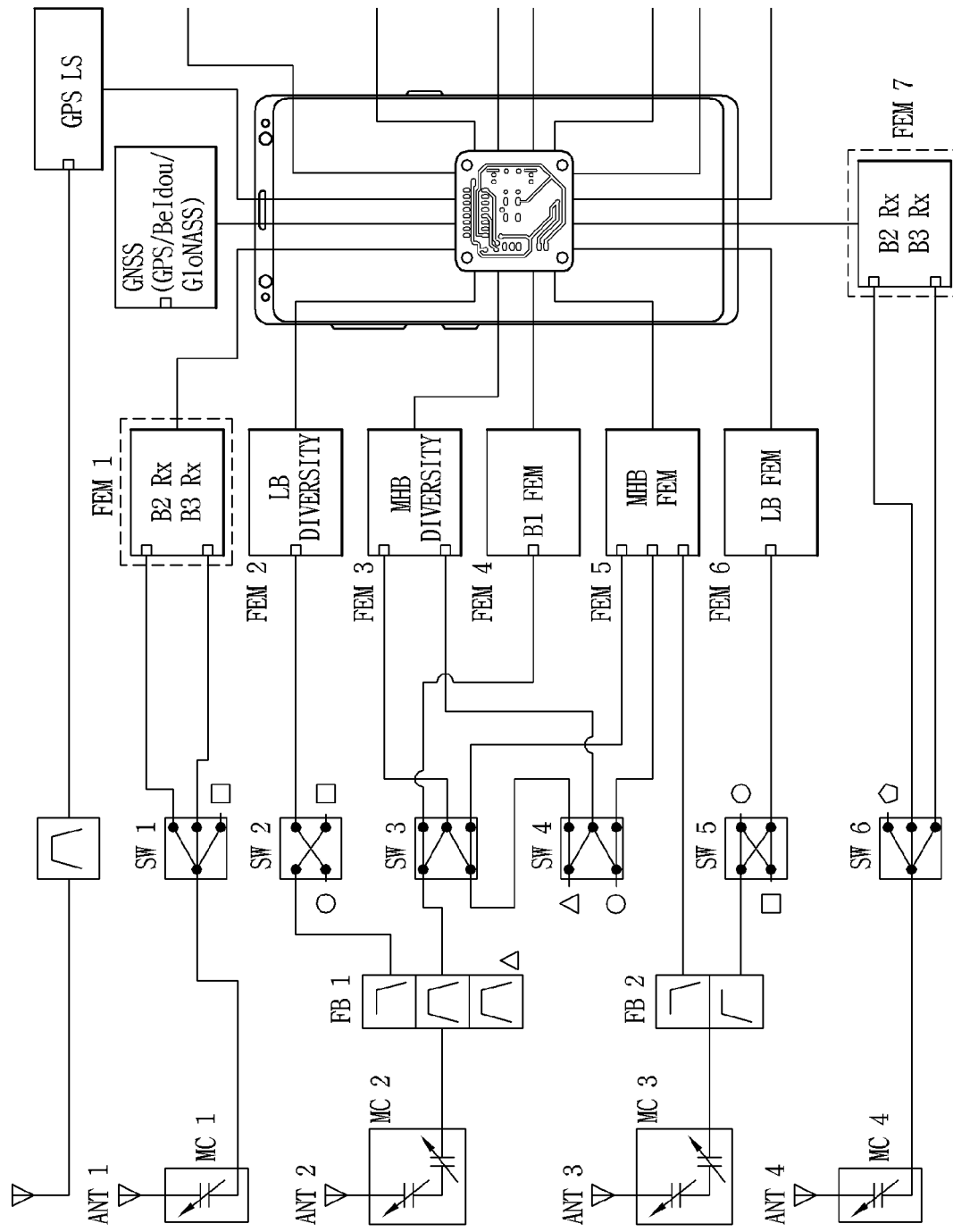
FIG. 6A is a configuration diagram in which a plurality of antennas and transceiver circuits according to an embodiment are coupled to a processor in an operable manner.
Figure 6B:
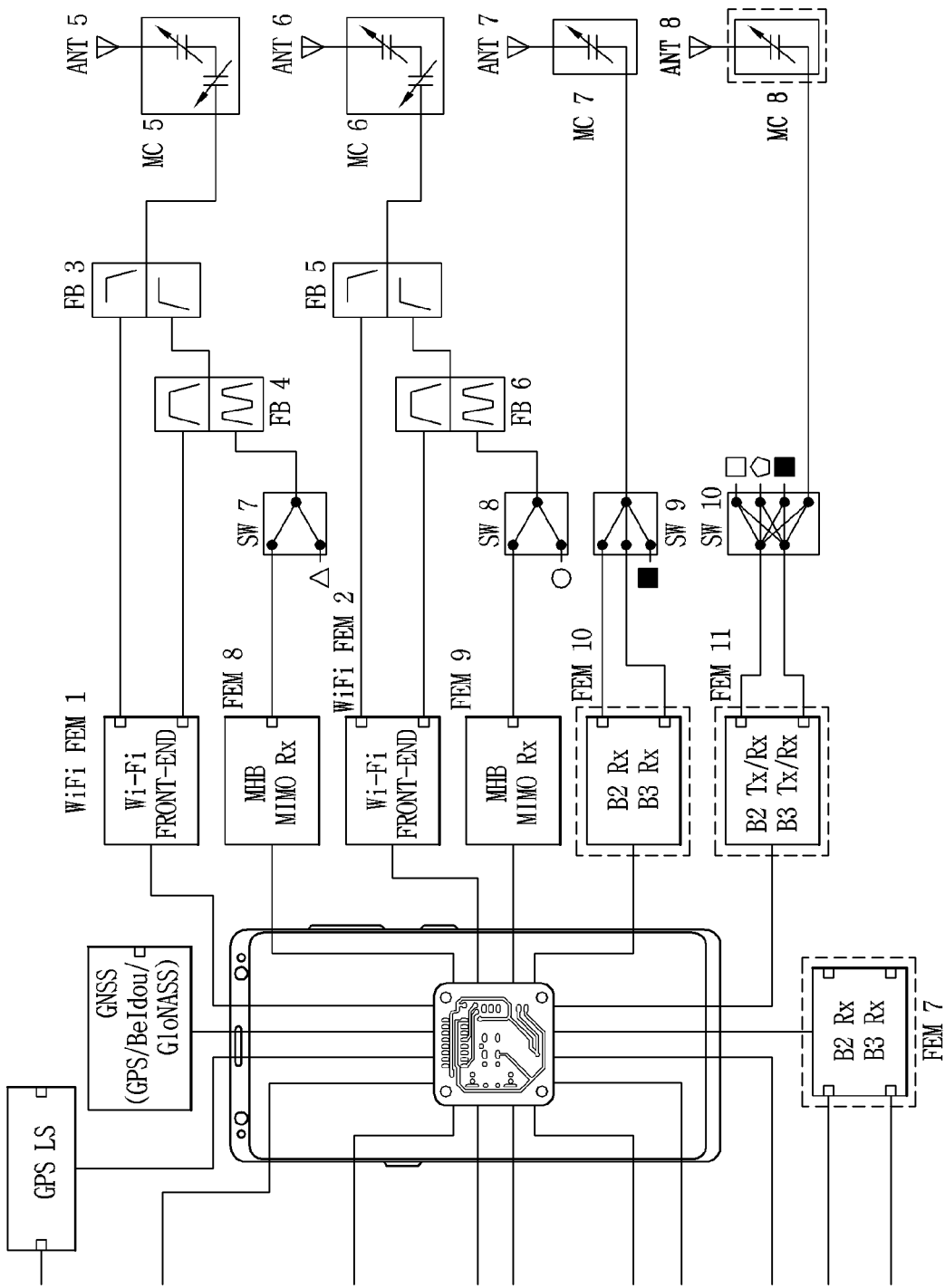
FIG. 6B is a configuration diagram in which antennas and transceiver circuits are additionally coupled to a processor in an operable manner in the configuration diagram in FIG. 6A.

In a 5G communication system according to an embodiment, the 5G frequency band may be a sub-6 band. In this regard, FIG. 6A is a configuration diagram in which a plurality of antennas and transceiver circuits according to an embodiment are coupled to a processor in an operable manner. FIG. 6B is a configuration diagram in which antennas and transceiver circuits are additionally coupled to a processor in an operable manner in the configuration diagram in FIG. 6A.

Referring to FIGS. 6A and 6B, the electronic device may include a plurality of antennas ANT1 to ANT4 and front-end modules FEM1 to FEM7 operating in a 4G band and/or a 5G band. In this regard, a plurality of switches SW1 to SW6 may be arranged between the plurality of antennas ANT1 to ANT4 and the front-end modules FEM1 to FEM7.

Referring to FIGS. 6A and 6B, the electronic device may include a plurality of antennas ANT5 to ANT8 and front-end modules FEM8 to FEM11 operating in a 4G band and/or a 5G band. In this regard, a plurality of switches SW7 to SW10 may be arranged between the plurality of antennas ANT1 to ANT4 and the front-end modules FEM8 to FEM11.

Meanwhile, a plurality of signals that can be branched through the plurality of antennas ANT1 to ANT8 may be transmitted to the input of the front-end modules FEM1 to FEM11 or to the plurality of switches SW1 to SW10 through one or more filters.

For an example, the first antenna ANT1 may be configured to receive signals in a 5G band. In this case, the first antenna ANT1 may be configured to receive a second signal of a second band B2 and a third signal of a third band B3. Here, the second band B2 may be an n77 band and the third band B3 may be an n79 band, but the present disclosure may not be limited thereto. The second band B2 and the third band B3 may change according to an application. Meanwhile, the first antenna ANT1 may also operate as a transmitting antenna in addition to a receiving antenna.

In this regard, the first switch SW1 may be configured as an SP2T switch or an SP3T switch. When implemented as an SP3T switch, one output port may be used as a test port. The first and second output ports of the first switch SW1 may be connected to the inputs of the first front end module FEM1.

In one example, the second antenna ANT2 may be configured to transmit and/or receive signals in a 4G band and/or a 5G band. In this case, the second antenna ANT2 may be configured to transmit/receive a first signal of a first band B1. Here, the first band (B1) may be an n41 band, but the present may not be limited thereto, and the first band (B1) may change according to an application.

Meanwhile, the second antenna (ANT2) may operate in a low band (LB). In addition, the second antenna (ANT2) may be configured to operate in a mid band (MB) and/or a high band (HB). Here, the middle band (MB) and high band (HB) may be referred to as MHB.

A first output of the first filter bank FB1 connected to the second antenna ANT2 may be connected to the second switch SW2. Meanwhile, a second output of the first filter bank FB1 connected to the second antenna ANT2 may be connected to the third switch SW3. Furthermore, a third output of the first filter bank FB1 connected to the second antenna ANT2 may be connected to the fourth switch SW4.

Accordingly, an output of the second switch SW2 may be connected to an input of the second front-end module FEM2 operating in the low band (LB). Meanwhile, a second output of the third switch SW3 may be connected to an input of the third front-end module FEM3 operating in the MHB band. In addition, a first output of the third switch SW3 may be connected to an input of a fourth front-end module FEM4 operating in a first 5G band B1. Furthermore, a third output of the third switch SW3 may be connected to an input of the fifth front-end module FEM5 operating in the MHB band operating in the first 5G band B1.

In this regard, a first output of the fourth switch SW4 may be connected to an input of the third switch SW3. Meanwhile, a second output of the fourth switch SW4 may be connected to an input of the third front-end module FEM3. In addition, a third output of the fourth switch SW4 may be connected to an input of the fifth front-end module FEM5.

For an example, the third antenna ANT3 may be configured to transmit and/or receive signals in the LB band and/or the MHB band. In this regard, a first output of the second filter bank FB2 connected to the second antenna ANT2 may be connected to an input of the fifth front-end module FEM5 operating in the MHB band. Meanwhile, a second output of the second filter bank FB2 connected to the second antenna ANT2 may be connected to the fifth switch SW5.

In this regard, an output of the fifth switch SW5 may be connected to an input of the sixth front-end module FEM6 operating in the LB band.

For an example, the fourth antenna ANT4 may be configured to transmit and/or receive a signal in a 5G band. In this regard, the fourth antenna ANT4 may be configured such that the second band B2 that is a transmission band and the third band B3 that is a reception band are frequency-division multiplexed (FDM). Here, the second band B2 may be an n77 band and the third band B3 may be an n79 band, but the present disclosure may not be limited thereto. The second band B2 and the third band B3 may change according to an application.

In this regard, the fourth antenna ANT4 may be connected to the sixth switch SW6, and one of the outputs of the sixth switch SW6 may be connected to a reception port of the seventh front end module FEM7. Meanwhile, another one of the outputs of the sixth switch SW6 may be connected to the transmission port of the seventh front end module FEM7.

For an example, the fifth antenna ANT5 may be configured to transmit and/or receive signals in a WiFi band. Furthermore, the sixth antenna ANT5 may be configured to transmit and/or receive signals in the MHB band.

In this regard, the fifth antenna ANT5 may be connected to the third filter bank FB3, and a first output of the third filter bank FB3 may be connected to a first WiFi module (WiFi FEM1). On the other hand, a second output of the third filter bank FB3 may be connected to a fourth filter bank FB4. In addition, a first output of the fourth filter bank FB4 may be connected to the first WiFi module (WiFi FEM1). Meanwhile, a second output of the fourth filter bank FB4 may be connected to the eighth front-end module FEM8 operating in the MHB band through the seventh switch SW7. Therefore, the fifth antenna ANT5 may be configured to receive WiFi band and 4G/5G band signals.

Similarly, the sixth antenna ANT6 may be configured to transmit and/or receive signals in a WiFi band. Furthermore, the sixth antenna ANT6 may be configured to transmit and/or receive signals in the MHB band.

In this regard, the sixth antenna ANT6 may be connected to a fifth filter bank FB5, and a first output of the fifth filter bank FB5 may be connected to a second WiFi module (WiFi FEM2). On the other hand, a second output of the fifth filter bank FB5 may be connected to a sixth filter bank FB6. In addition, a first output of the sixth filter bank FB6 may be connected to a second WiFi module (WiFi FEM2). A second output of the sixth filter bank FB6 may be connected to the ninth front end module FEM9 operating in the MHB band through the eighth switch SW8. Therefore, the sixth antenna ANT6 may be configured to receive the WiFi band and 4G/5G band signals.

Referring to FIGS. 3B, 6A, and 6B, the baseband processor, that is, the modem 1400 may control antennas and the transceiver circuit (RFIC) 1250 to perform multi-input multi-output (MIMO) or diversity in the MHB band. In this regard, the second antenna ANT2 and the third antenna ANT3 adjacent thereto may be used in a diversity mode for transmitting and/or receiving the same information as a first signal and a second signal. On the contrary, antennas disposed on different side surfaces may be used in the MIMO mode in which first information is included in the first signal and second information is included in the second signal. For an example, the baseband processor 1400 may perform MIMO through the second antenna ANT2 and the fifth antenna ANT5. For an example, the baseband processor 1400 may perform MIMO through the second antenna ANT2 and the fifth antenna ANT6.

For an example, the seventh antenna ANT7 may be configured to receive signals in a 5G band. In this case, the seventh antenna ANT7 may be configured to receive a third signal of a second band B2 and a third signal of a third band B3. Here, the second band B2 may be an n77 band and the third band B3 may be an n79 band, but the present disclosure may not be limited thereto. The second band B2 and the third band B3 may change according to an application. Meanwhile, the seventh antenna ANT7 may also operate as a transmitting antenna in addition to a receiving antenna.

In this regard, the ninth switch SW9 may be configured as an SP2T switch or an SP3T switch. When implemented as an SP3T switch, one output port may be used as a test port. On the other hand, the first and second output ports of the ninth switch SW9 may be connected to the inputs of the tenth front-end module FEM10.

For an example, the eighth antenna ANT8 may be configured to transmit and/or receive signals in the 4G band and/or the 5G band. In this case, the eighth antenna ANT8 may be configured to transmit/receive a signal of the second band B2. In addition, the eighth antenna ANT8 may be configured to transmit/receive a signal of the third band B3. Here, the second band B2 may be an n77 band and the third band B3 may be an n79 band, but the present disclosure may not be limited thereto. The second band B2 and the third band B3 may change according to an application. In this regard, the eighth antenna ANT8 may be connected to the eleventh front-end module FEM11 through the tenth switch SW10.

Meanwhile, the antennas ANT1 to ANT8 may be connected to impedance matching circuits MC1 to MC8 to operate in a plurality of bands. In this regard, when operating in adjacent bands such as the first antenna ANT1, the fourth antenna ANT4, the seventh antenna ANT7 and the eighth antenna ANT8, only one variable element may be used. In this case, the variable element may be a variable capacitor configured to vary the capacitance by varying the voltage.

On the contrary, when operating in spaced bands such as the second antenna ANT2, the third antenna ANT3, the fifth antenna ANT5, and the sixth antenna ANTE, only two or more variable elements may be used. In this case, the two or more variable elements may be two or more variable capacitors or a combination of variable inductors and variable capacitors.

Referring to FIGS. 3B, 6A, and 6B, the baseband processor 1400 may perform MIMO through at least one of the second band B2 and the third band B3 in a 5G band. In this regard, the baseband processor 1400 may perform MIMO through at least two of the first antenna ANT1, the fourth antenna ANT4, the seventh antenna ANT7, and the eighth antenna ANT8 in the second band B2. On the other hand, the baseband processor 1400 may perform MIMO through at least two of the first antenna ANT1, the fourth antenna ANT4, the seventh antenna ANT7, and the eighth antenna ANT8 in the third band B3. Accordingly, the baseband processor 1400 may control the plurality of antennas and the transceiver circuit 1250 to support MIMO up to 4 RXs as well as 2 RXs in the 5G band.

Hereinafter, description will be given of detailed operations and functions of an electronic device having a plurality of antennas according to an implementation, which is provided with the multi-transceiving system as illustrated in FIGS. 3B, 6A, and 6B.

Figure 7:
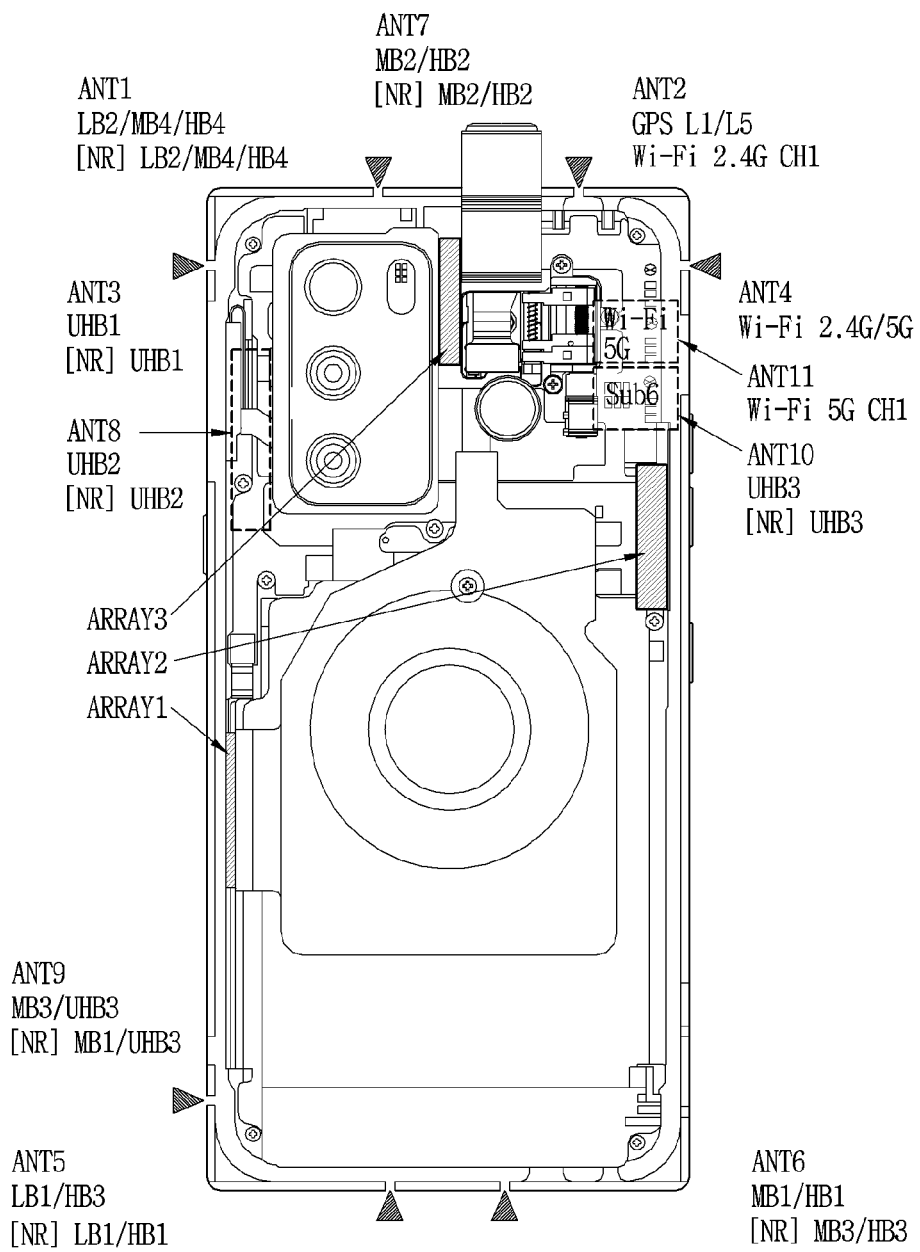
FIG. 7 is a view illustrating a structure in which a plurality of antennas is disposed on metal rims of an electronic device.

In this regard, FIG. 7 is a view illustrating a structure in which a plurality of antennas is disposed on metal rims of an electronic device. Specifically, FIG. 7 illustrates a structure in which a plurality of LTE/5G Sub-6 antennas and WiFi antennas are disposed on metal rims of the electronic device. On the other hand, a plurality of mmWave antenna modules may be disposed inside the electronic device. In this regard, the electronic device of FIG. 7 may be an electronic device according to various form factors. In one implementation, the electronic device of FIG. 7 may be a swivel terminal in which one frame rotates with respect to another frame at a predetermined angle to be switched into a swivel state, but the present disclosure may not be limited thereto.

Referring to FIG. 7, the plurality of antennas may be configured to include a first antenna ANT1 and a second antenna ANT2 disposed in an upper portion of the electronic device. The plurality of antennas may alternatively be configured to include first to fourth antennas ANT1 to ANT4 disposed in the upper portion of the electronic device. In addition, the plurality of antennas may alternatively be configured to include first to sixth antennas ANT1 to ANTE disposed in upper and lower portions of the electronic device. Further, the plurality of antennas may alternatively be configured to include first to eleventh antennas ANT1 to ANT11 disposed in the upper and lower portions of the electronic device.

For example, the first antenna ANT1 may be configured to operate in a low band (LB), a mid-band (MB) and a high band (HB) of the LTE band. The first antenna ANT1 may alternatively be configured to operate in the LB, MB and HB of the NR band (5G Sub-6 band). Accordingly, the first antenna ANT1 may be configured to transmit and/or receive at least one of signals of the LB, MB and HB of the LTE band. In addition, the first antenna ANT1 may be configured to transmit and/or receive at least one of signals of the LB, MB, and HB of the NR band (5G Sub-6 band). On the other hand, the second antenna ANT2 may be configured to operate in a GPS L1/L5 band and a WiFi band of a first band. Therefore, the second antenna ANT2 may be configured to transmit and/or receive signals of the GPS L1/L5 band and/or the WiFi band of the first band.

The third antenna ANT3 may be configured to operate in an ultra-high band (UHB) of the LTE band. In addition, the third antenna ANT3 may be configured to operate in a UHB of the NR band (5G Sub-6 band). Therefore, the third antenna ANT3 may be configured to transmit and/or receive a signal of the UHB of the LTE band. Also, the third antenna ANT3 may be configured to transmit and/or receive a signal of the UHB of the NR band (5G Sub-6 band). Meanwhile, the fourth antenna ANT4 may operate in a WiFi band. In detail, the fourth antenna ANT4 may be configured to operate in WiFi bands of the first band and a second band. In this regard, the first band and the second band may be 2.4 GHz and 5 GHz bands, respectively, but may not be limited thereto.

The fifth antenna ANT5 and the sixth antenna ANT6 may be disposed in a lower region of the electronic device. The fifth antenna ANT5 may be configured to operate in the LB and HB of the LTE band. The fifth antenna ANT5 may be configured to operate in the LB and HB of the NR band (5G Sub-6 band). For an example, the fifth antenna ANT5 may be configured to transmit and/or receive signals of the LB and HB of the LTE band. In addition, the fifth antenna ANT5 may be configured to transmit and/or receive signals of the LB and HB of the NR band (5G Sub-6 band). Meanwhile, the sixth antenna ANT6 may be configured to operate in the MB and HB of the LTE band. The sixth antenna ANT6 may be configured to operate in the MB and HB of the NR band (5G Sub-6 band). Accordingly, the sixth antenna ANT6 may be configured to transmit and/or receive at least one of signals of the MB and HB of the LTE band. In addition, the sixth antenna ANT6 may be configured to transmit and/or receive at least one of signals of the MB and HB of the NR band (5G Sub-6 band).

An antenna may additionally be disposed between the first antenna ANT1 and the second antenna ANT2. The seventh antenna ANT7 may be disposed by being isolated from the first antenna ANT1 and the second antenna ANT2 by a slit. The seventh antenna ANT7 may be configured to operate in the MB and HB of the LTE band. In addition, the seventh antenna ANT7 may be configured to operate in the MB and HB of the NR band (5G Sub-6 band). Accordingly, the seventh antenna ANT7 may be configured to transmit and/or receive at least one of signals of the MB and HB of the LTE band. In addition, the seventh antenna ANT7 may be configured to transmit and/or receive at least one of signals of the MB and HB of the NR band (5G Sub-6 band).

Antennas may be further disposed on different side surface portions of the electronic device. An eighth antenna ANT8 and a ninth antenna ANT9 may be disposed on one side surface portion of the electronic device. A tenth antenna ANT10 and an eleventh antenna ANT11 may be disposed on another side surface portion of the electronic device. In this regard, some of the eighth antenna ANT8 to the eleventh antenna ANT11 may also be disposed inside side surface portions of the electronic device. For example, the eighth antenna ANT8 may be disposed inside one side surface portion. In addition, the tenth antenna ANT10 and the eleventh antenna ANT11 may be disposed inside another side surface portion.

The eighth antenna ANT8 may be configured to operate in the UHB of the LTE band. In addition, the eighth antenna ANT8 may be configured to operate in the UHB of the NR band (5G Sub-6 band). Therefore, the eight antenna ANT8 may be configured to transmit and/or receive a signal of the UHB of the LTE band. Also, the eighth antenna ANT8 may be configured to transmit and/or receive a signal of the UHB of the NR band (5G Sub-6 band). Meanwhile, the ninth antenna ANT9 may be configured to operate in the MB and UHB of the LTE band. In addition, the ninth antenna ANT9 may be configured to operate in the MB and UHB of the NR band (5G Sub-6 band). Accordingly, the ninth antenna ANT9 may be configured to transmit and/or receive at least one of signals of the MB and UHB of the LTE band. In addition, the ninth antenna ANT9 may be configured to transmit and/or receive at least one of signals of the MB and UHB of the NR band (5G Sub-6 band).

The tenth antenna ANT10 and the eleventh antenna ANT11 may be disposed on another side surface portion of the electronic device. The tenth antenna ANT10 may be configured to operate in the UHB of the LTE band. In addition, the tenth antenna ANT10 may be configured to operate in the UHB of the NR band (5G Sub-6 band). Therefore, the tenth antenna ANT10 may be configured to transmit and/or receive a signal of the UHB of the LTE band. Also, the tenth antenna ANT10 may be configured to transmit and/or receive a signal of the UHB of the NR band (5G Sub-6 band). Meanwhile, the eleventh antenna ANT11 may operate in a WiFi band. Also, the eleventh antenna ANT11 may operate in a WiFi band of the second band. Therefore, the eleventh antenna ANT11 may be configured to transmit and/or receive a WiFi signal of the second band.

Referring to FIG. 7, a plurality of mmWave band antenna modules may be disposed on the side surfaces of and/or inside the electronic device. The plurality of mmWave band antenna modules may be configured to include a first array antenna ARRAY1 to a third array antenna ARRAY3. The first array antenna ARRAY1 and the second array antenna ARRAY2 may be disposed on one and another side surfaces of the electronic device, respectively, to radiate signals in a lateral direction. The third array antenna ARRAY3 may be provided with antenna elements disposed to radiate signals toward the rear of the electronic device. In the first array antenna ARRAY1 to the third array antenna ARRAY3, a plurality of antenna elements may be spaced apart from one another by predetermined intervals. Beamforming may be performed by controlling a phase of a signal applied to each antenna element disposed at the predetermined intervals.

An optimal antenna may be selected from among the first array antenna ARRAY1 to the third array antenna ARRAY3, and beamforming may be performed through the selected array antenna. As another example, MIMO or diversity may be performed using two or more array antennas among the first array antenna ARRAY1 to the third array antenna ARRAY3.

In this regard, the electronic device may be configured to provide 5G communication services in various frequency bands. Recently, attempts have been made to provide 5G communication services using a Sub-6 band below a 6 GHz band. In the future, it is also expected to provide 5G communication services by using a millimeter wave (mm-Wave) band in addition to the Sub-6 band for faster data rate.

Meanwhile, electronic devices that provide 4G and 5G communication services may be provided in various form factors. As an example of the form factor for the electronic devices, a foldable device may be considered. The foldable device may cause deviation in wireless performance in open and closed states.

As one of electronic devices having a plurality of frames, a swivel terminal in which one frame rotates relative to another frame at a predetermined angle may be provided. In a swivel electronic device, when one frame rotates at a predetermined angle with respect to another frame, there is a problem in that wireless performance of antennas disposed on a side surface of the device is changed.

In detail, a metal structure for supporting the front display may be required in an electronic device to which a swivel structure is applied, which may degrade antenna radiation efficiency. In the swivel state of the electronic device, a change in antenna performance may occur due to a change in ground characteristic compared to a normal state.

Meanwhile, when LTE antennas are already provided in the form of metal rims on side surfaces of the swivel electronic device, a space limitation problem may occur for some of antennas operating in a Sub-6 band.

The present disclosure is directed to solving the aforementioned problems and other drawbacks. Another aspect of the implementation is to provide an antenna structure capable of minimizing changes in characteristics of antennas disposed on side surfaces of an electronic device when a form factor changes.

Another aspect of the implementation is to provide an antenna structure capable of minimizing changes in antenna characteristics due to frame rotation in a swivel structure.

Another aspect of the implementation is to provide a mechanical structure having slits and slots to minimize changes in antenna characteristics due to frame rotation in a swivel structure.

Another aspect of the implementation is to secure antenna characteristics in a swivel structure while providing a rigid structure capable of supporting a display.

Figure 8A:
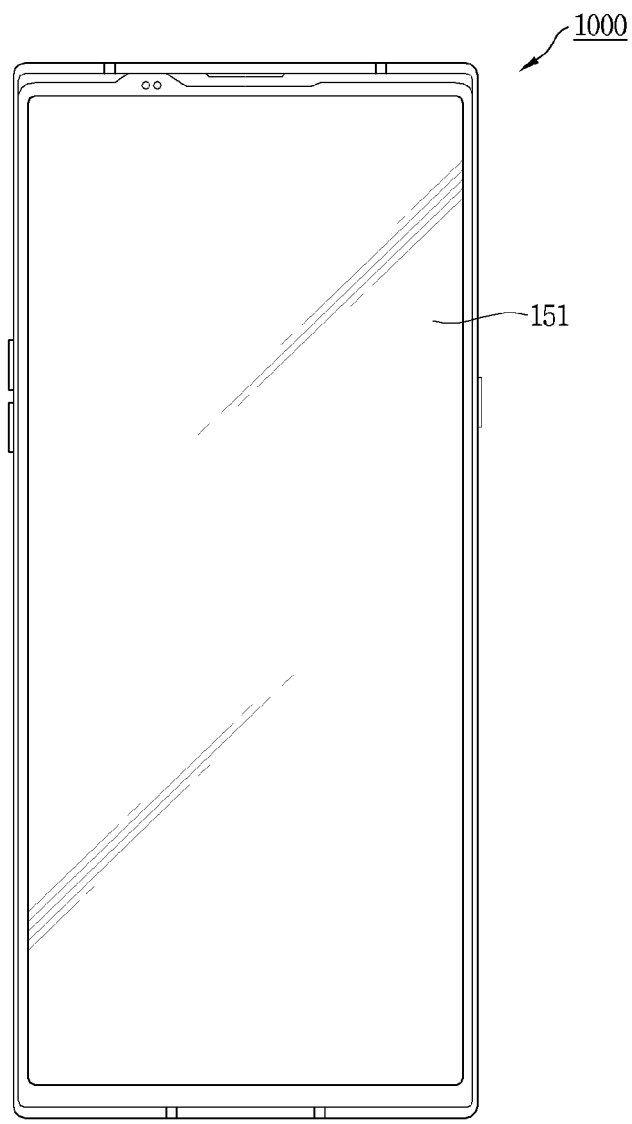
FIGS. 8A and 8B are views illustrating a normal state in which a display of an electronic device according to one implementation fully overlaps a main body and a swivel state in which the display has rotated relative to the main body by a predetermined angle.
Figure 8B:
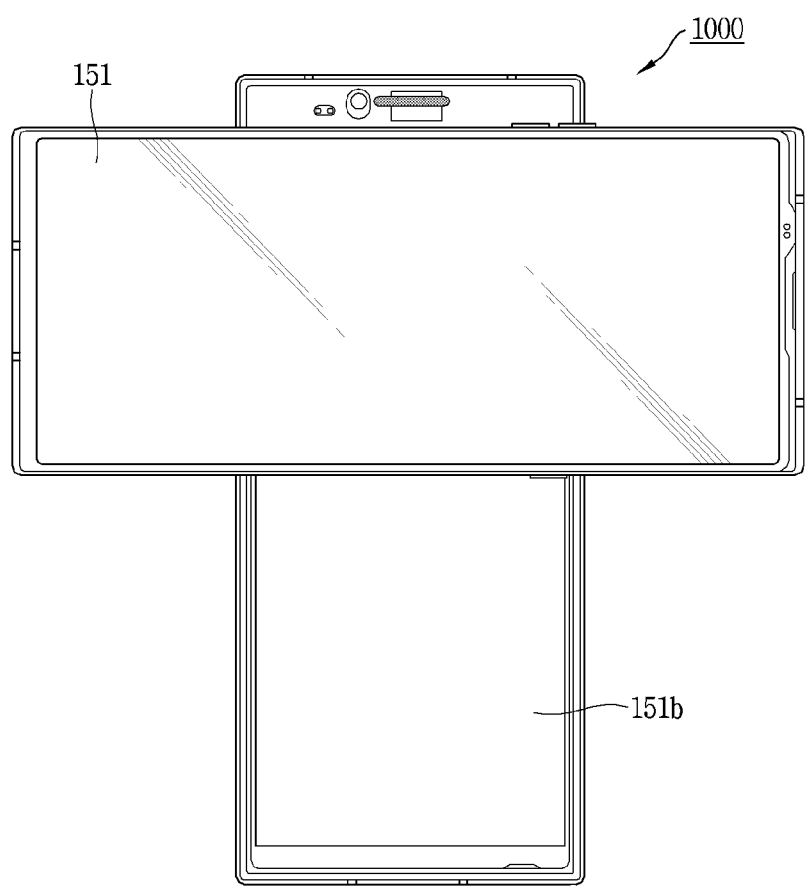

FIGS. 8A and 8B are views illustrating a normal state in which a display of an electronic device according to one implementation fully overlaps a main body and a swivel state in which the display has rotated relative to the main body by a predetermined angle.

Specifically, FIG. 8A illustrates a normal state in which a display of the electronic device 1000 overlaps the main body. Meanwhile, FIG. 8B illustrates a swivel state in which the display of the electronic device 1000 rotates relative to the main body at a predetermined angle.

Referring to FIG. 8A, in the normal state, a screen may be displayed through a front display 151 corresponding to a main display. Meanwhile, referring to FIG. 8B, the front display 151 and a sub display 151b may be disposed on the front surface in the swivel state. Accordingly, according to this specification, a structure in which the front display 151 may be used in the normal state and both the front display 151 and the sub display 151b may be used in the swivel state. In this regard, according to this specification, it is intended to secure antenna performance by implementing slits and antenna clearance in the normal state. It is also intended to secure performance of antennas configured as metal rims, by way of changing a structure of slits and slots in the swivel state.

Meanwhile, the subject matter of the present disclosure related to an electronic device capable of securing antenna performance even in a swivel state compared to a normal state may be proposed in the following structure, but the present disclosure may not be limited thereto.

1) Proposing a front display cover structure configured by an injection part and a metal part 2) Proposing a front metal structure that can be applied simultaneously to the normal state and the swivel state 3) Improving antenna efficiency characteristics by using a front display metal slot Specifically, in an electronic device to which a variable structure such as a swivel structure according to this specification is applied, a front display metal slot structure for securing antenna performance is proposed. In this regard, a front metal case may be used as a swivel front display assembly. When the swivel type electronic device is in the normal state, slit positions of the front metal case and a middle metal case may align with (or overlap) each other. On the other hand, in the swivel state, a structure that is aligned with (or overlaps) openings such as slits and slots may be formed on the front metal case so as not to interfere with the slit positions of the middle metal case. Meanwhile, side regions of the middle metal case may be used as antennas. Hereinafter, a display and antenna structure of the swivel type electronic device will be described in detail with reference to FIGS. 9A and 9B.

Figure 9A:
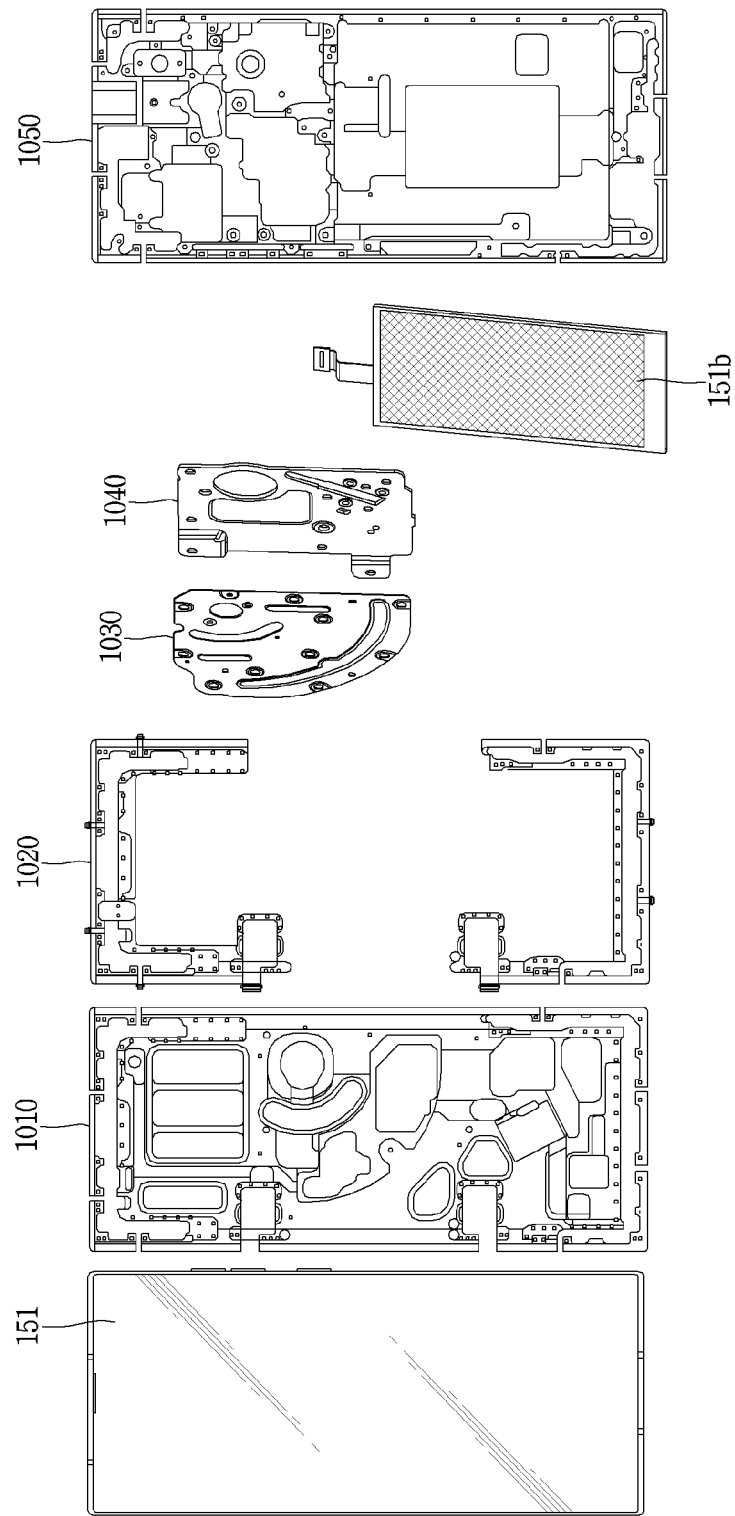
FIG. 9A is an exploded view illustrating a plurality of detailed components configuring an electronic device according to one implementation.
Figure 9B:
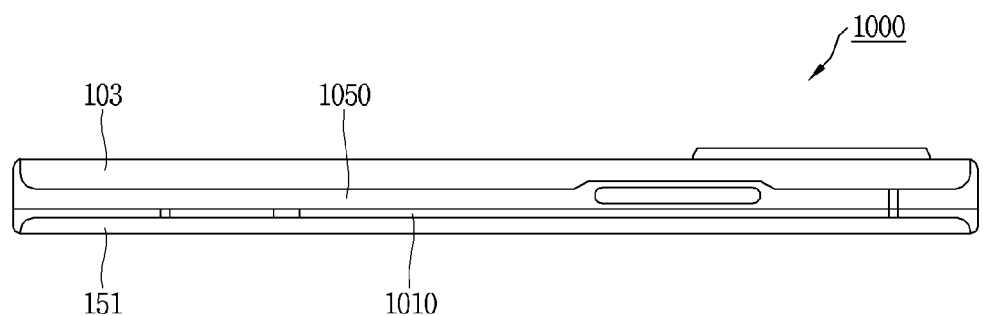
FIG. 9B is a lateral view of the electronic device in which the plurality of detailed components is coupled together.

First of all, a detailed structure of the electronic device disclosed herein will be described. In this regard, FIG. 9A is an exploded view illustrating a plurality of detailed components configuring an electronic device according to one implementation. FIG. 9B is a lateral view of the electronic device in which the plurality of detailed components is coupled together.

Referring to FIGS. 9A and 9B, the electronic device may include a display 151, a supporting frame 1010 corresponding to a metal frame of a front display, and a dielectric frame 1020 corresponding to an injection region of the front display. In addition, the electronic device may further include a swivel hinge 1030, a fixing hinge 1040, and a sub display 151b. In addition, the electronic device may further include a main frame 1050 and a rear cover 103.

The display 151 may be configured to display a screen, and disposed on a front surface of a main body of the electronic device. On the other hand, a sub display 151b may be configured to be exposed on the front surface together with the display 151 when the electronic device is switched to the swivel state.

The supporting frame 1010 may be configured as a metal frame that supports the front display. The supporting frame 1010 may be coupled to the display to support the display, and provided with a metal rim disposed on at least one side surface.

The dielectric frame 1020 may be configured to support the display 151 by being coupled to the supporting frame 1010. The dielectric frame 1020 may correspond to an injection region of the display 151 to be coupled to the front display 151.

The swivel hinge 1030 may be disposed in aperture regions of the supporting frame 1010 and the main frame 1050 so that the supporting frame 1010 and the main frame 1050 are coupled to each other. The swivel hinge 1030 may be disposed in the aperture regions of the supporting frame 1010 and the main frame 1050 so that the supporting frame 1010 rotates with respect to the main frame 1050. Alternatively, the swivel hinge 1030 may be disposed in the aperture regions of the supporting frame 1010 and the main frame 1050 so that the main frame 1050 rotates with respect to the supporting frame 1010. The fixing hinge 1040 may be coupled to the swivel hinge 1030 so that the supporting frame 1010 rotates with respect to the main frame 1050. Alternatively, the fixing hinge 1040 may be coupled to the swivel hinge 1030 such that the main frame 1050 rotates with respect to the supporting frame 1010.

The main frame 1050 may be rotatably coupled to the supporting frame 1010 and provided with a metal rim disposed on a side surface. The metal rim of the main frame 1050 may include a first antenna ANT1 and a second antenna ANT2 operating in different bands. The rear cover 103 coupled to the main frame 1050 may be formed of a glass material.

Figure 10A:
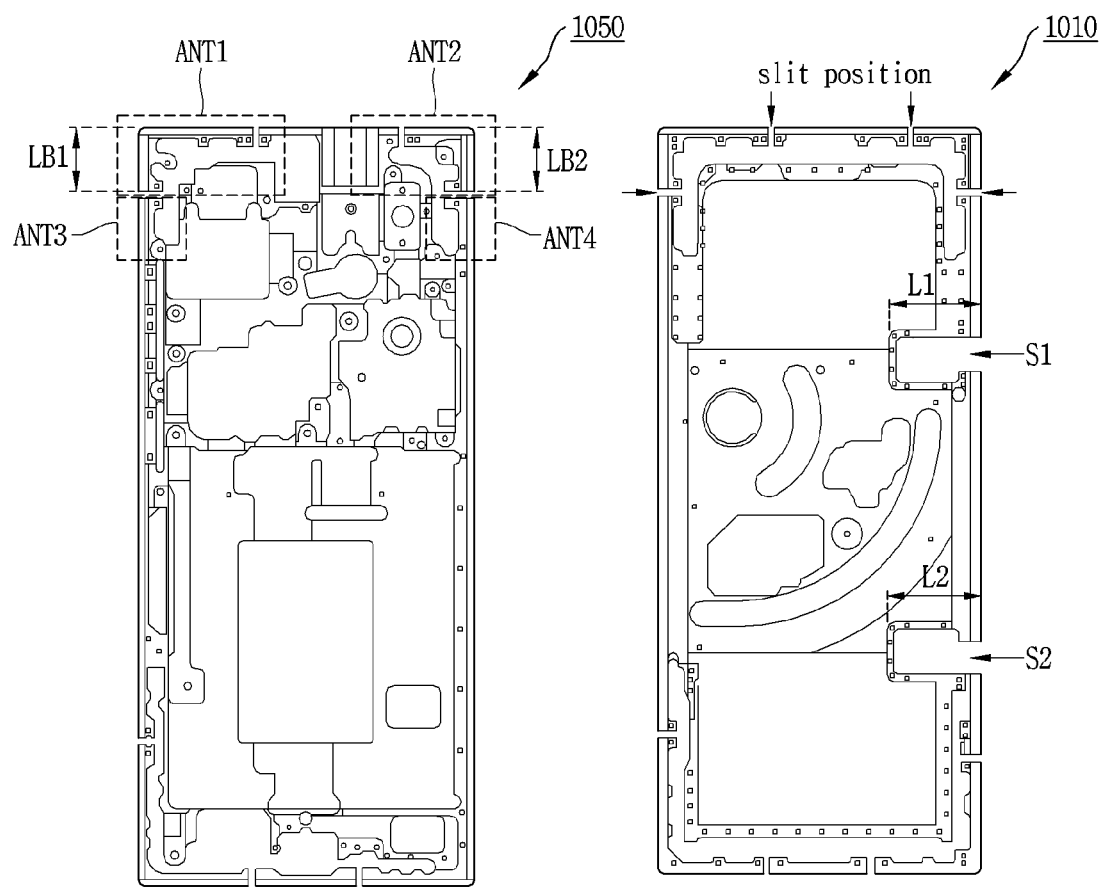
FIG. 10A is a view illustrating a structure of a plurality of metal rims formed by segmenting side surfaces of a main frame and a supporting frame using slits in accordance with one implementation.
Figure 10B:
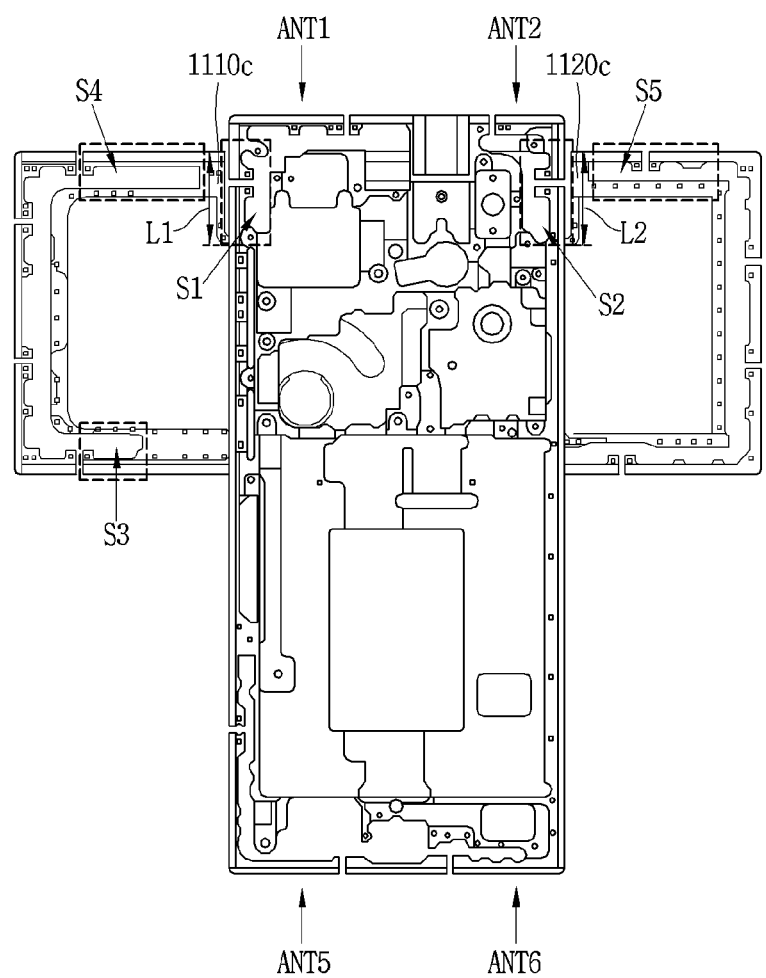
FIG. 10B is a view illustrating a normal state in which a supporting frame and a main frame are disposed to correspond to each other in accordance with one implementation.
Figure 10C:
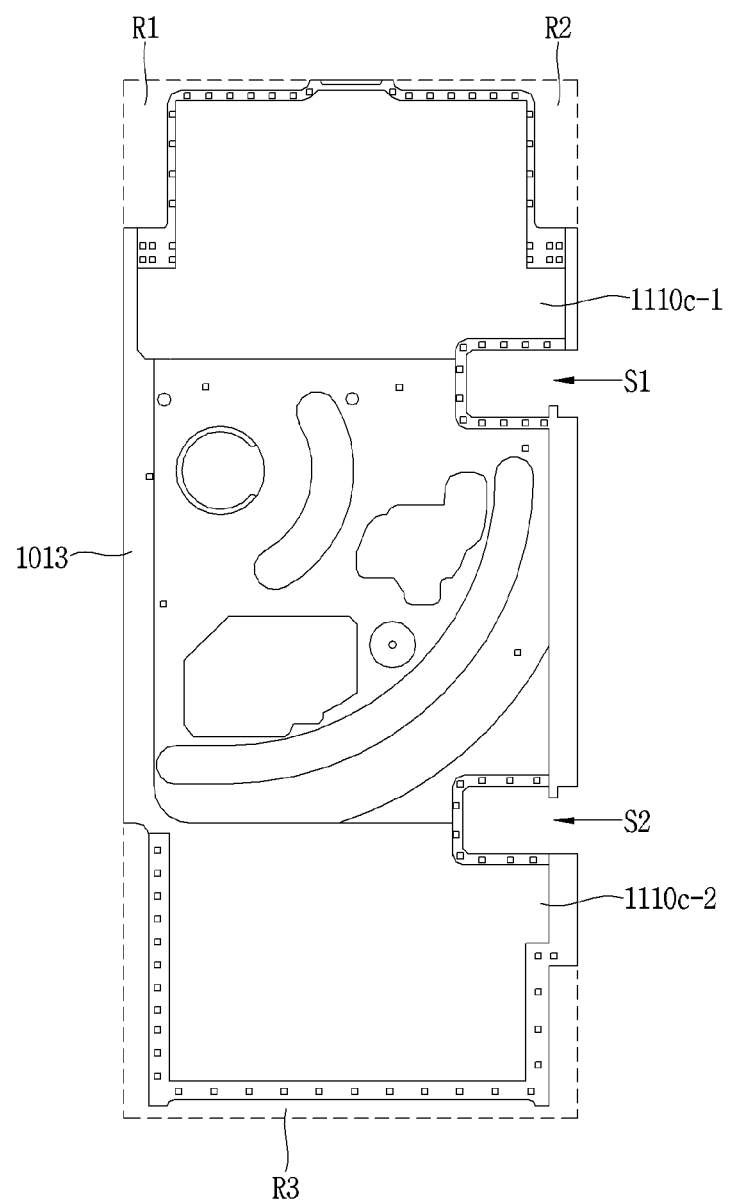
FIG. 10C is a view illustrating a supporting frame having a shape from which metal rims of upper and lower portions are removed in accordance with another implementation.

Meanwhile, the antennas provided on the main frame 1050 disclosed herein may be configured to ensure antenna performance even in the swivel state. In this regard, FIG. 10A is a view illustrating a structure of a plurality of metal rims formed by segmenting side surfaces of the main frame and the supporting frame using slits in accordance with one implementation. FIG. 10B is a view illustrating a normal state in which the supporting frame and the main frame are disposed to correspond to each other in accordance with one implementation. FIG. 10C is a view illustrating a supporting frame having a shape from which metal rims of upper and lower portions are removed in accordance with another implementation.

Referring to FIGS. 10A and 10B, the electronic device may include a supporting frame 1010 and a main frame 1050. In order to secure the rigidity of the mechanism, the supporting frame 1010 needs to be configured as an outer metal structure. In this regard, when implemented as the outer metal structure, antenna radiation efficiency may be degraded. In particular, as the supporting frame 1010 and the main frame 1050 rotate relative to each other, the antenna radiation efficiency may be degraded due to the outer metal structure of the supporting frame 1010. In order to prevent such degradation in radiation efficiency, a first slot S1 and a second slot S2 may be formed in the supporting frame 1010. Even under a swivel condition, antenna clearance may be secured by the first slot S1 and the second slot S2, thereby preventing the degradation in antenna radiation efficiency.

Also, slits may be disposed in the same shape in the supporting frame 1010 and the main frame 1050 at positions corresponding to each other under a normal condition. In addition to the arrangement in which the slits are disposed in the supporting frame 1010 and the main frame 1050 at the corresponding positions to each other, another arrangement in which one slot includes another slot may be implemented. Alternatively, a different arrangement in which the slits of the supporting frame 1010 and the main frame 1050 are regarded as being disposed at substantially the same positions although they partially overlap each other may be implemented. Accordingly, according to the present disclosure, the antenna performance can be secured by implementing the antenna clearance similarly under the normal/swivel condition (state) by the first slot S1 and the second slot S2. In addition, even in the swivel condition (state), a plurality of slits and slots may be implemented in the supporting frame 1010, thereby applying an antenna structure with improved or maintained antenna characteristics.

In this regard, the supporting frame 1010 may be coupled to the display to support the display, and provided with a metal rim disposed on at least one side surface. Meanwhile, the main frame 1050 may be rotatably coupled to the supporting frame 1010 and provided with a metal rim disposed on a side surface. In this regard, one of the supporting frame 1010 and the main frame 1050 may be referred to as a first metal frame and the other may be referred to as a second metal frame. Meanwhile, the supporting frame 1010 disclosed herein may be configured in a shape in which metal rims have been removed from upper and lower end portions as illustrated in FIG. 10C.

According to the implementation, the metal rim of the main frame 1050 may include a plurality of antennas operating in different bands. For example, a metal rim of the main frame 1050 may include a first antenna ANT1 and a second antenna ANT2 operating in different bands.

Referring to FIG. 10B, the supporting frame may be provided with the first slot S1 and the second slot S2 in regions thereof adjacent to a region where the first antenna ANT1 and the second antenna ANT2 are disposed in a swivel state of the supporting frame 1010 with respect to the main frame 1050.

For example, lengths L1 and L2 of the first and second slots S1 and S2 may be longer than bent lengths LB1 and LB2 of the first and second antennas ANT1 and ANT2. That is, the length L1 of the first slot S1 may be longer than the bent length LB1 of the first antenna ANT1. Also, the length L2 of the second slot S2 may be longer than the bent length LB2 of the second antenna ANT2.

Accordingly, in the swivel state, parts of the metal rims adjacent to end portions of the first antenna ANT1 and the second antenna ANT2 may be accommodated in the regions in which the first slot S1 and the second slot S2 are formed, respectively. In this regard, in the swivel state, the end portions of the first antenna ANT1 and the second antenna ANT2 and parts of the third antenna ANT3 and the fourth antenna ANT4 may be accommodated in the regions in which the first slot S1 and the second slot S2 are formed. That is, in the swivel state, the end portion of the first antenna ANT1 and the part of the third antenna ANT3 may be accommodated in the region where the first slot S1 is formed. In addition, in the swivel state, the end portion of the second antenna ANT2 and the part of the fourth antenna ANT4 may be accommodated in the region where the second slot S2 is formed.

Meanwhile, a plurality of slot structures disclosed herein may be interconnected or may be isolated (separated) from one another by coupling portions in the form of a metal frame. In this regard, a first coupling portion 1110c and a second coupling portion 1120c may be formed at end portions of the first slot S1 and the second slot S2, respectively. The first coupling portion 1110c and the second coupling portion 1120c may be disposed in parallel with parts of a first conductive member 1110 and a second conductive member 1120 in the swivel state. Accordingly, currents produced in the first conductive member 1110 and the second conductive member 1120 may be induced to the adjacent first and second coupling portions 1110c and 1120c, thereby improving radiation efficiency. The structure for improving the radiation efficiency will be described in detail later with reference to FIGS. 15A and 16A.

Meanwhile, the main frame having the antenna structure disclosed herein may further include a third antenna ANT3 and a fourth antenna ANT4 disposed adjacent to the first antenna ANT1 and the second antenna ANT2, respectively. In the normal state in which the supporting frame 1010 is disposed to correspond to (overlap) the main frame 1050, the supporting frame 1010 corresponding to the placement of the third antenna ANT3 and the fourth antenna ANT4 may be provided with a third slot S3 and a fourth slot S4. In addition, in order to secure performance of a sixth antenna ANTE formed on the lower end portion of the main frame 1050 in the normal state, a fifth slot S5 may be formed in the supporting frame 1010.

Figure 11A:
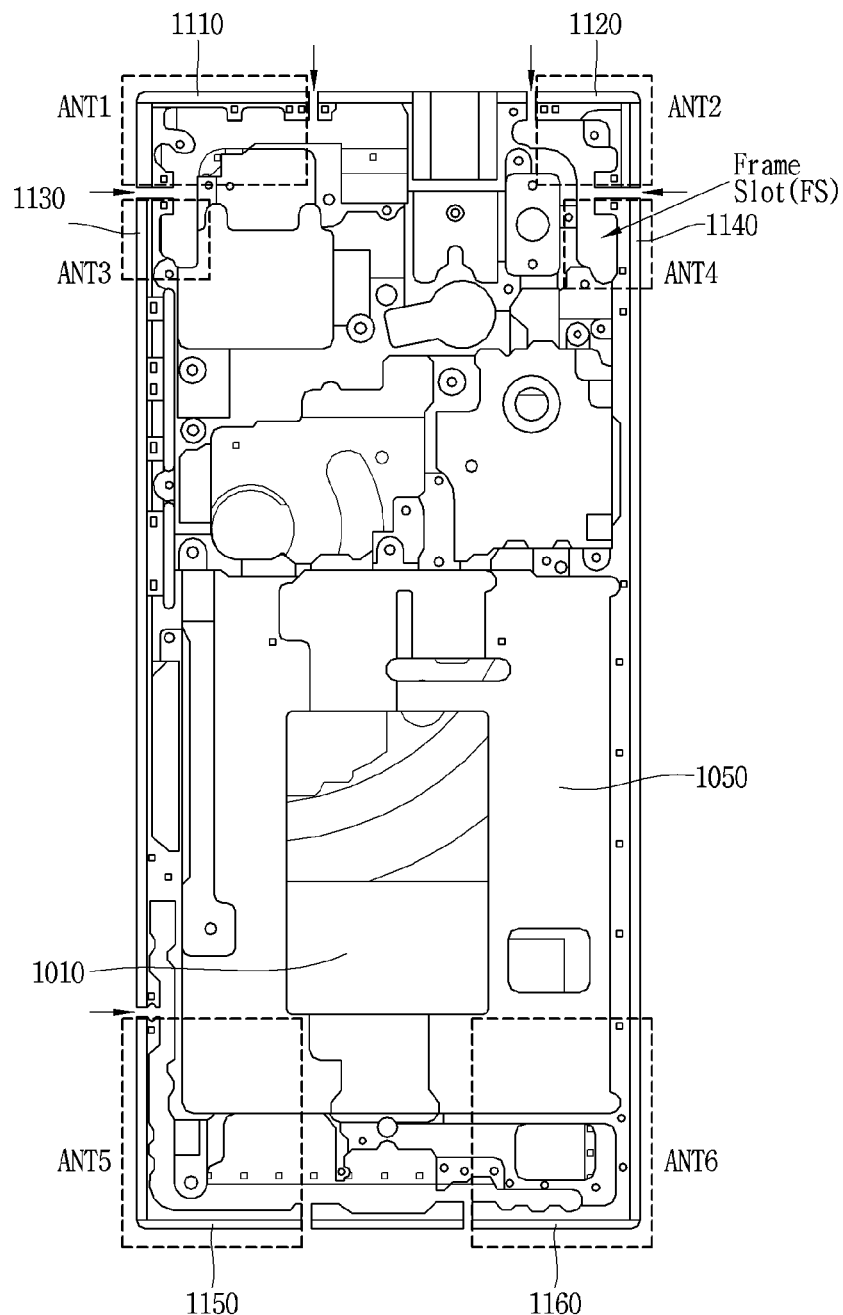
FIG. 11A is a view illustrating a normal state in which the supporting frame and the main frame of the electronic device are coupled to overlap each other.
Figure 11B:
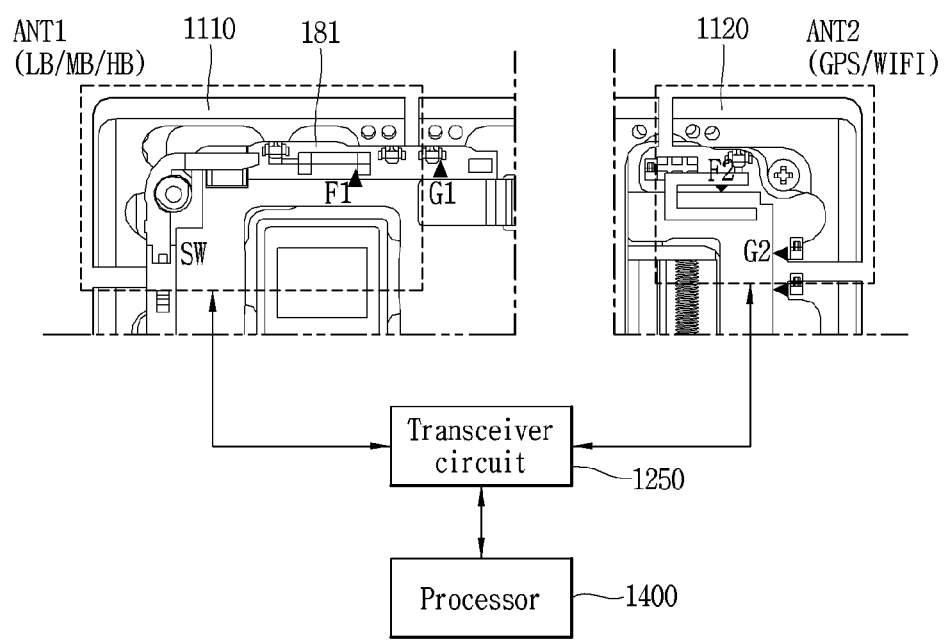
FIG. 11B is a view illustrating a detailed configuration of first and antennas and a circuit board in a normal state.

The structure in which the supporting frame 1010 and the main frame 1050 are coupled to each other in the normal state will be described in detail as follows. In this regard, FIG. 11A is a view illustrating a normal state in which the supporting frame and the main frame of the electronic device are coupled to overlap each other. FIG. 11B is a view illustrating a detailed configuration of the first and second antennas and a circuit board in the normal state.

Referring to FIGS. 10B and 11A, the fourth slot S4 may be isolated from the first slot S1 by the first coupling portion 1110c. Meanwhile, the length of the fourth slot S4 may be longer than a length of a frame slot FS formed by the second antenna ANT2 and the fourth antenna ANT4. Accordingly, the performance of the second antenna ANT2 and the fourth antenna ANT4 may be secured in the normal state through the fourth slot S4. In addition, the fourth slot S4 isolated from the first slot S1 by the first coupling portion 1110c may secure the performance of the first antenna ANT1 and the third antenna ANT3 in the swivel state.

In this regard, in the normal state in which the supporting frame 1010 is disposed to correspond to (overlap) the main frame 1050, a metal region may be removed from the supporting frame 1010 corresponding to the first antenna ANT1 and the second antenna ANT2. Referring to the swivel state of FIG. 10B, the metal region may be removed from the supporting frame 1010 corresponding to the first antenna ANT1 and the second antenna ANT2, through the third slot S3 and the fourth slot S4. For example, a single slot including the third slot S3 and the fourth slot S4 may be integrally formed in a region corresponding to the first to fourth antennas ANT1 to ANT4.

A first metal rim and a second metal rim may be formed on the supporting frame 1010 corresponding to the first antenna ANT1 and the second antenna ANT2. Referring to FIG. 11A, in the normal state where the supporting frame 1010 is disposed to correspond to the main frame 1050, the shape and placement of the first antenna ANT1 and the second antenna ANT2 may correspond to the shape and placement of the first metal rim and the second metal rim, respectively.

Such correspondence may also be realized substantially in a slit position, in addition to the shape and placement of the metal rims in the normal state. Referring to FIGS. 10B and 11A, the first conductive member 1110 and the second conductive member 1120 corresponding to the first antenna ANT1 and the second antenna ANT2 may be segmented from adjacent conductive members by slits. In the normal state where the supporting frame 1010 is placed to correspond to the main frame 1050, the shape and placement of the slits formed in the supporting frame 1010 may correspond to the shape and placement of the slits formed in the main frame 1050.

Meanwhile, referring to FIGS. 10A and 100, a metal rim may be removed from an upper end portion of the supporting frame 1010. In this regard, the supporting frame 1010 corresponding to the first antenna ANT1 and the second antenna ANT2 may have a first region R1 and a second region R2 without a metal rim. A metal rim 1013 may be formed in a region adjacent to the first region R1 formed on one side of the supporting frame 1010, so as to support the display. A first coupling portion 1110c-1 by which the second region R2 and the first slot S1 are isolated from each other may be formed in a region adjacent to the second region R2.

Referring to FIG. 10C, a metal rim may be removed from a lower end portion of a supporting frame 1010-2. In this regard, the metal rim may be removed either from the upper end portion of the supporting frame 1010-2 or from the lower end portion of the supporting frame 1010-2. Alternatively, the metal rims may be removed from both the upper end portion and the lower end portion of the supporting frame 1010-2.

The main frame 1050 disclosed herein may further include the fifth antenna ANT5 and the sixth antenna ANT6. The fifth antenna ANT5 may be configured to be formed on a lower end portion and one side portion of the main frame 1050. The sixth antenna ANT6 may be configured to be formed on the lower end portion and another side portion of the main frame 1050. In this regard, the supporting frame 1010 corresponding to the fifth antenna ANT5 and the sixth antenna ANT6 may have a third region R3 without a metal rim.

As an example, the third region R3 may be integrally formed at the lower end portion, the one side portion and the another side portion of the supporting frame 1010. In this regard, a capacitor sensor for measuring a specific absorption rate (SAR) may be disposed in a region between the fifth antenna ANT5 and the sixth antenna ANT6. In addition, the lower end portion of the supporting frame 1010 may have a larger radius of rotation than the upper end portion of the supporting frame 1010, so that the third region R3 may be formed at all of the lower end portion, the one side portion and the another side portion of the supporting frame 1010. Meanwhile, a second coupling portion 1110c-2 isolating the third region R3 from the second slot S2 may be formed in a region adjacent to the third region R3.

Referring to FIG. 11B, the electronic device may further include a transceiver circuit 1250 and a processor 1400. The transceiver circuit 1250 may be operably coupled to the first antenna ANT1 and the second antenna ANT2, to control the first antenna ANT1 and the second antenna ANT2. The processor 1400 may be operably coupled to the transceiver circuit 1250 to control the transceiver circuit 1250. In this regard, the processor 1400 may be a baseband processor such as a modem. However, the present disclosure may not be limited thereto and the processor 1400 may be an arbitrary processor that controls the transceiver circuit 1250.

Figure 12A:
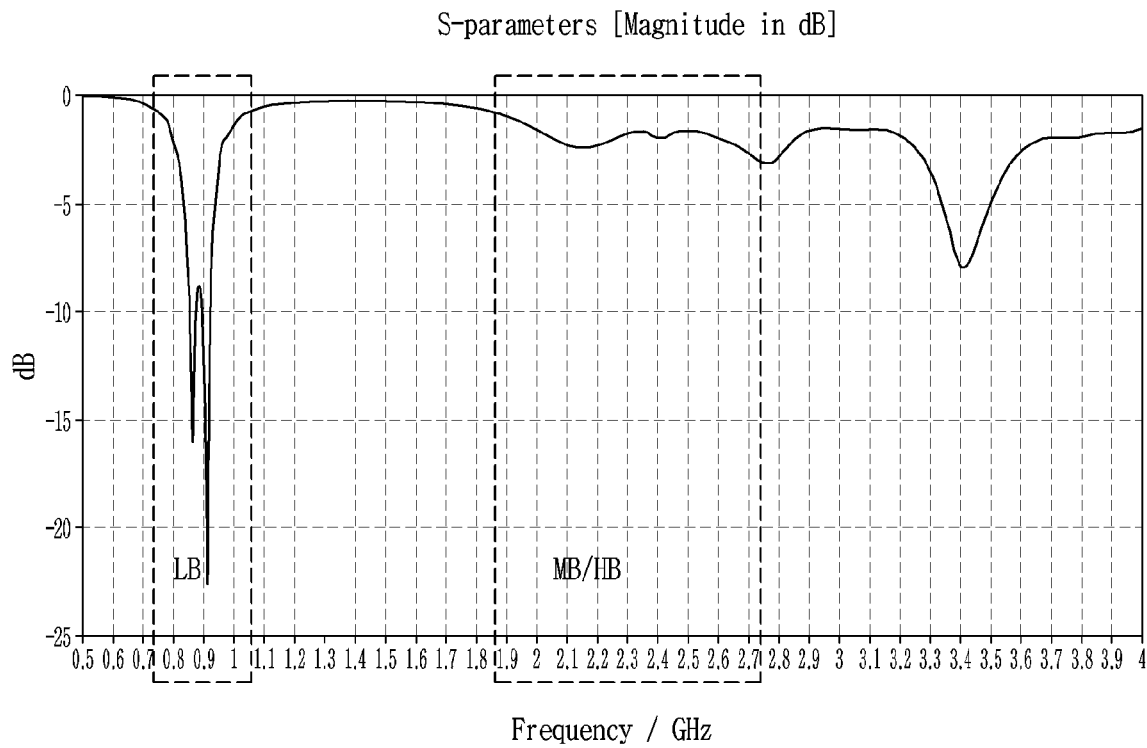
FIGS. 12A and 12B are views illustrating reflection coefficient characteristics of the first and second antennas in accordance with one implementation.
Figure 12B:
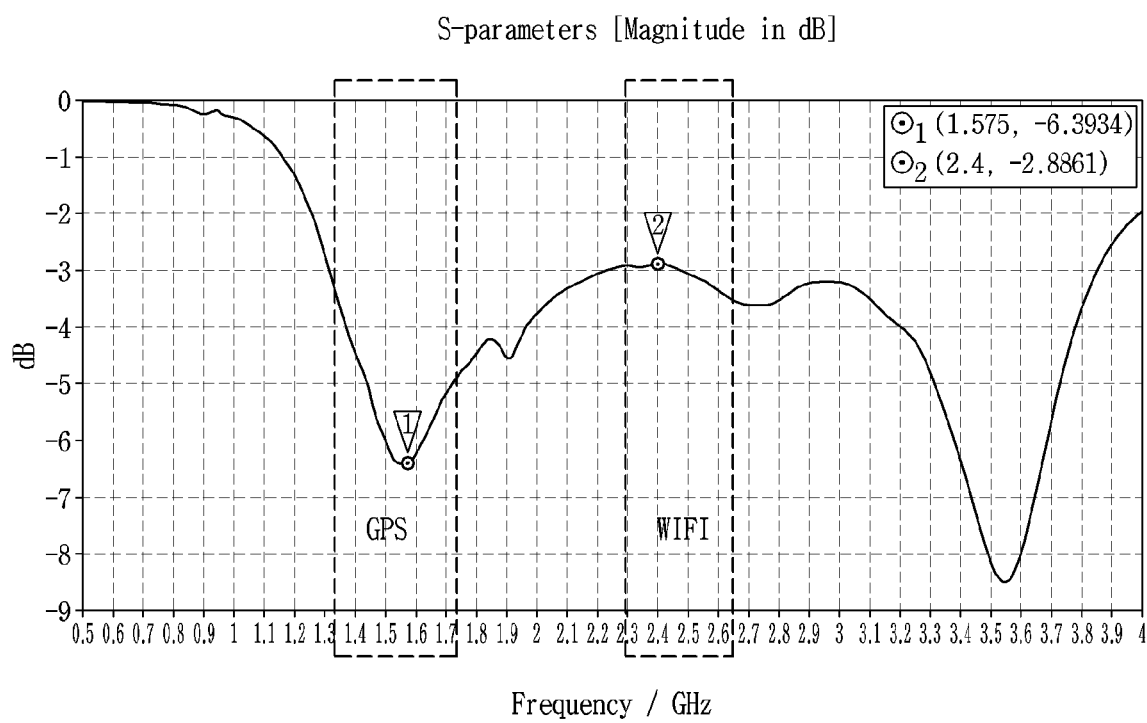
Figure 12C:
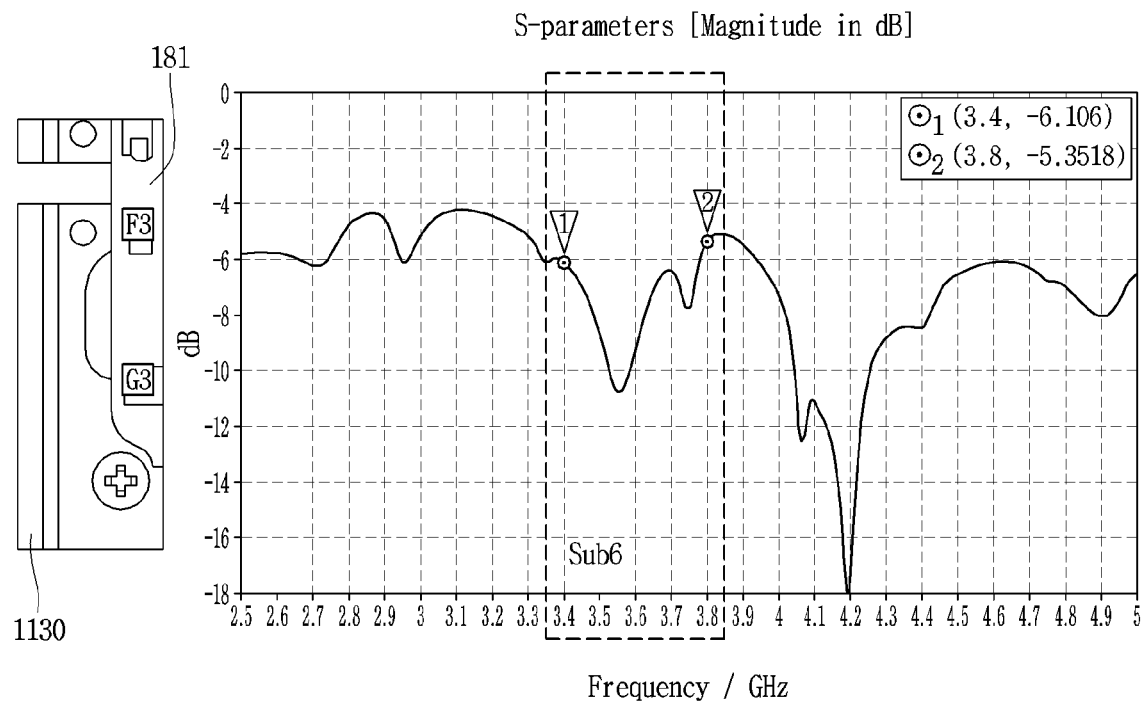
FIGS. 12C and 12D are views illustrating configurations and reflection coefficient characteristics of third and fourth antennas in accordance with one implementation.
Figure 12D:
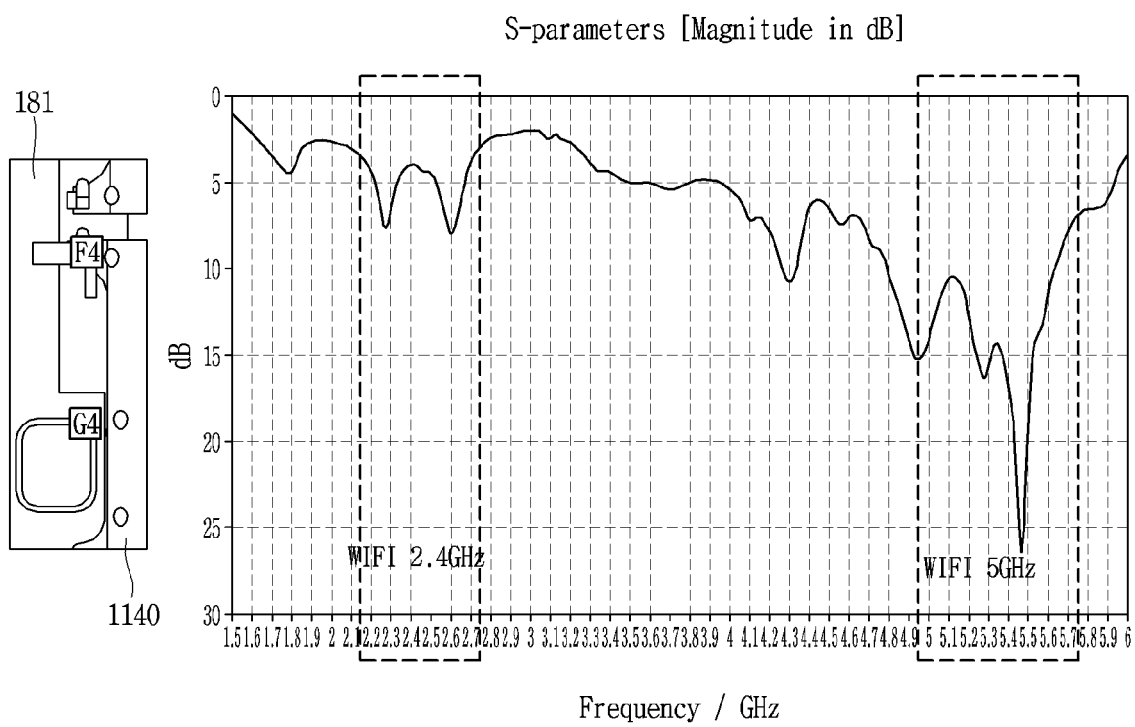

Meanwhile, a comparison of the characteristics of the plurality of antennas disclosed herein is as follows. FIGS. 12A and 12B are views illustrating reflection coefficient characteristics of the first and second antennas in accordance with one implementation. FIGS. 12C and 12D are views illustrating configurations and reflection coefficient characteristics of third and fourth antennas in accordance with one implementation.

Referring to FIGS. 10B, 11A, 11B, and 12A, the first antenna ANT1 may be configured to operate in 5G NR low band (LB), mid band (MB), and high band (HB). The first conductive member 1110 of the first antenna ANT1 may be connected to a feed line (or feeding unit) F1, a ground G1, and a switch SW of a circuit board 181 that is disposed inside the electronic device.

Referring to FIGS. 10B, 11A, 11B, and 12B, the second antenna ANT2 may be configured to operate in a GPS or WiFi band. The GPS band may be about 1.5 GHz band and the WiFi band may be about 2.4 GHz band, but the present disclosure may not be limited thereto. The second conductive member 1120 of the second antenna ANT2 may be connected to a feed line (or feeding unit) F2 and a ground G2 of the circuit board 181 that is disposed inside the electronic device.

Referring to FIGS. 10B, 11A, 12C, and 12D, the main frame 1050 may further include the third antenna ANT3 and the fourth antenna ANT4 disposed adjacent to the first antenna ANT1 and the second antenna ANT2, respectively. The third conductive member 1130 of the third antenna ANT3 may be connected to a feed line (or feeding unit) F3 and a ground G3 of the circuit board 181 that is disposed inside the electronic device. The fourth conductive member 1140 of the fourth antenna ANT4 may be connected to a feed line (or feeding unit) F4 and a ground G4 of the circuit board 181 that is disposed inside the electronic device. The third antenna ANT3 and the fourth antenna ANT4 may operate in a 5G NR HB band and a WiFi band, respectively. Specifically, the third antenna ANT3 may operate in an ultra-high band (UHB) of 5G NR Sub-6 HB. The fourth antenna ANT4 may operate in a WiFi band of a 2.4 GHz band and a 5 GHz band.

Figure 13A:
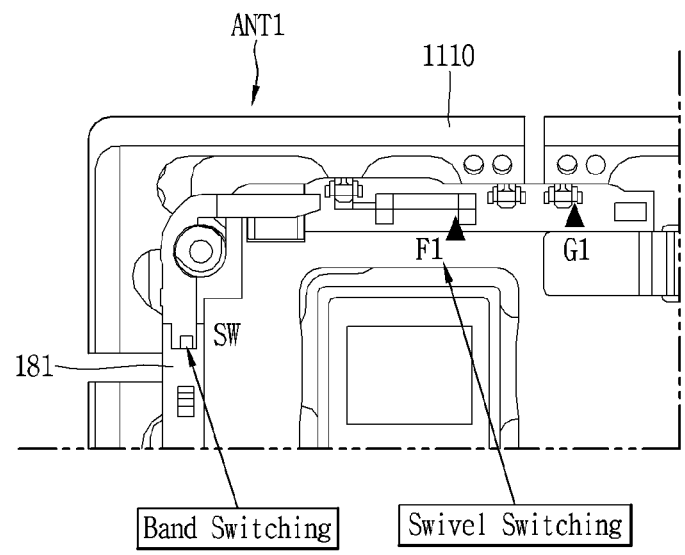
FIGS. 13A and 13B are views illustrating the configuration of an input matching circuit disposed between the first and second antennas and a feeding unit.
Figure 13A:
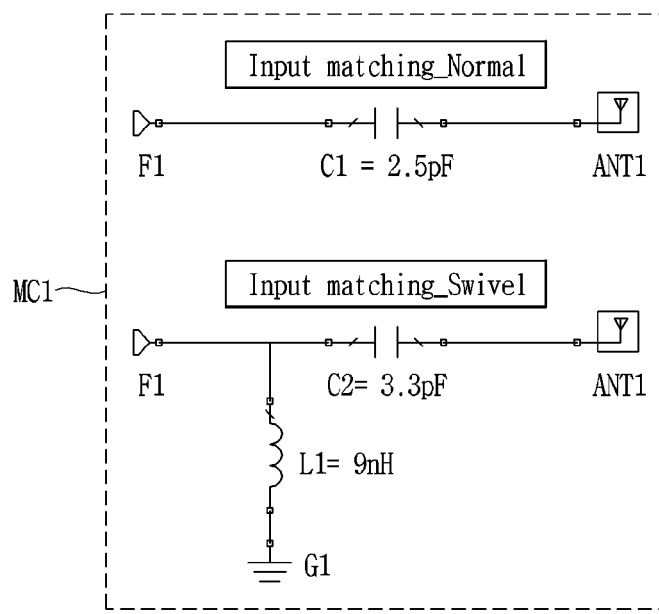
Figure 13B:
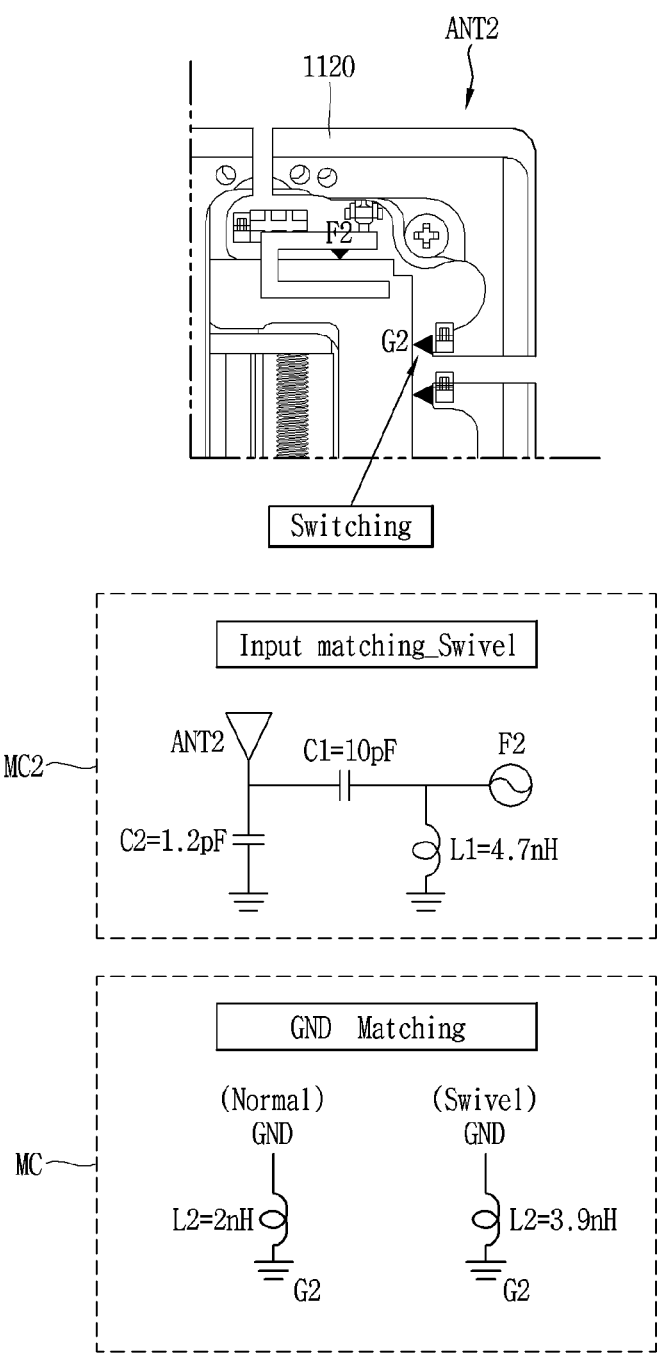
Figure 14A:
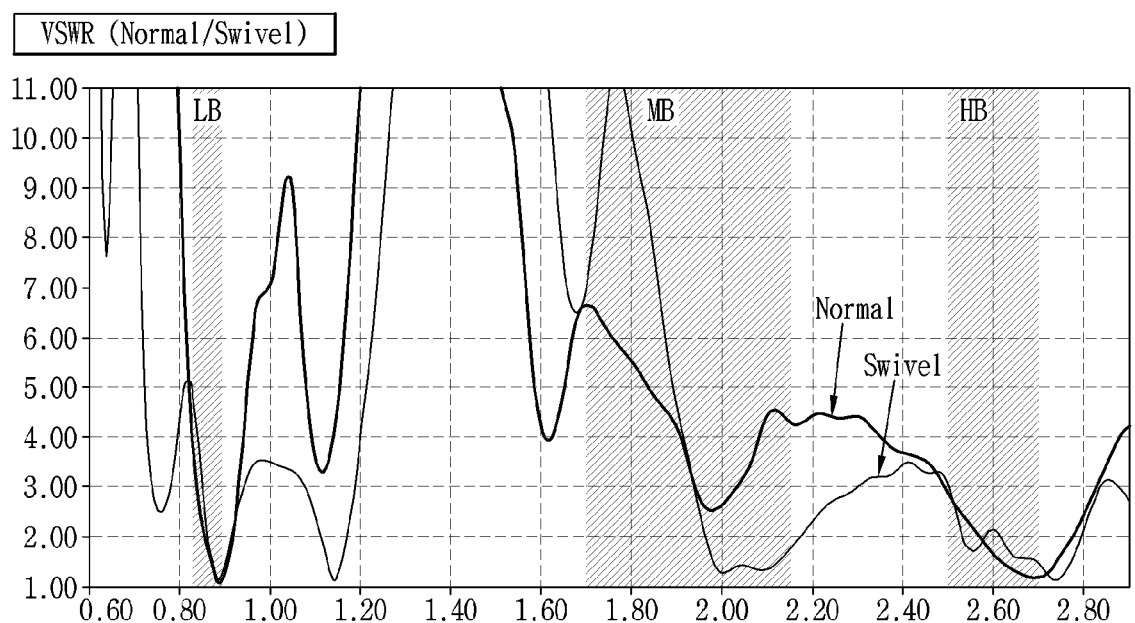
FIG. 14A is a view illustrating VSWR characteristics of the first antenna in a normal state and a swivel state.
Figure 14B:
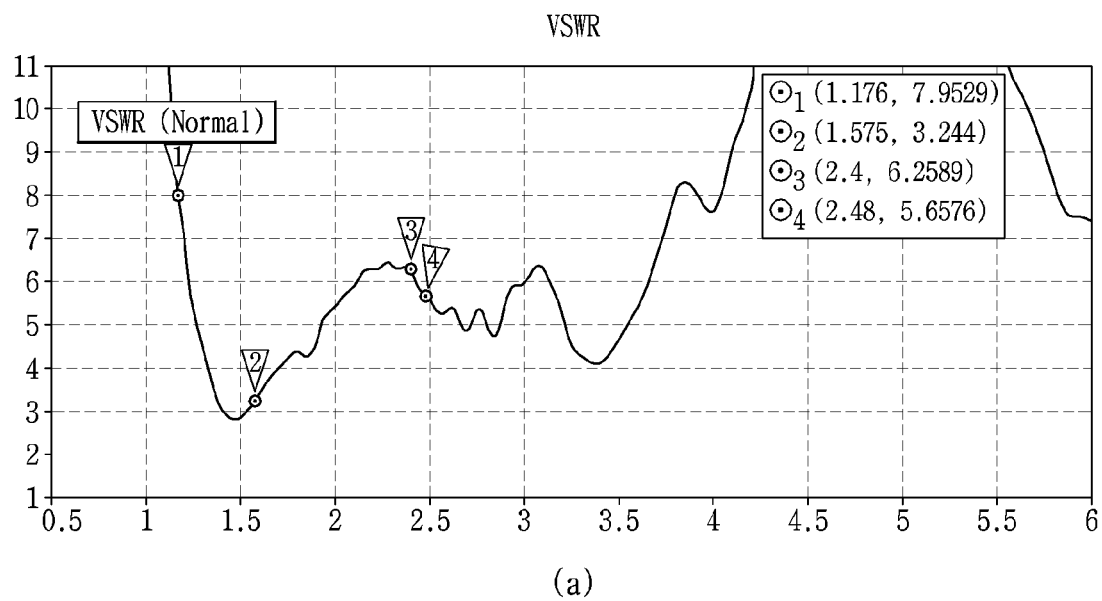
FIG. 14B is a view illustrating VSWR characteristics of the second antenna in a normal state and a swivel state.
Figure 14B:
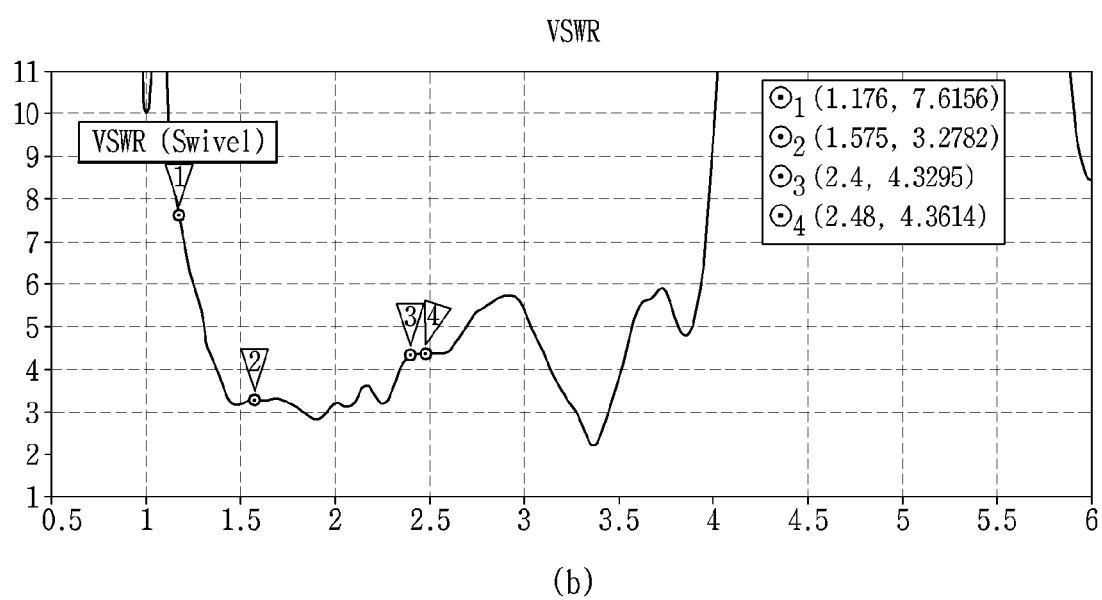

Meanwhile, the plurality of antennas disclosed herein may control an s circuit between a feeding unit and the conductive member to maintain constant antenna characteristics in the normal state and the swivel state. In this regard, FIGS. 13A and 13B are views illustrating the configuration of an input matching circuit disposed between the first and second antennas and a feeding unit. FIG. 14A is a view illustrating VSWR characteristics of the first antenna in the normal state and the swivel state. FIG. 14B is a view illustrating VSWR characteristics of the second antenna in the normal state and the swivel state.

Specifically, FIG. 13A illustrates the configuration of an input matching circuit MC1 disposed between the first conductive member 1110 of the first antenna ANT1 and the feeding unit F1. FIG. 13B illustrates the configuration of an input matching circuit MC2 disposed between the second conductive member 1120 of the second antenna ANT2 and the feeding unit F2.

Referring to FIG. 13A, in the normal state, the input matching circuit MC1 may include a capacitor having a first capacitance value. In the swivel state, the input matching circuit MC2 may include a capacitor having a second capacitance value and an inductor L having a predetermined inductance value. To this end, the input matching circuit MC1 may include a capacitor having a variable capacitance value and an inductor L having a predetermined inductance value.

Alternatively, the input matching circuit MC1 may include a first capacitor C1 having a first capacitance value, a second capacitor C2 having a second capacitance value, and an inductor L having a predetermined inductance value. In the normal state, the input matching circuit MC1 may perform a switching operation, so as to be configured by only the first capacitor C1. In the swivel state, the input matching circuit MC1 may perform a switching operation, so as to be configured by the second capacitor C2 and the inductor L. Accordingly, the first antenna ANT1 may perform input matching, in response to band selection in the LB through the switch SW and normal/swivel state switching through the switch connected to the feeding unit F1.

The processor 1400 may perform a control operation for the input matching circuit MC1. The processor 1400 may be configured to determine whether the electronic device is in the swivel state. To this end, the processor 1400 may be interfaced with the circuit board 181 to detect the state of the swivel hinge 1030 and/or the fixing hinge 1040. Alternatively, the processor 1400 may be interfaced with at least one sensor that is capable of detecting a rotation state of the electronic device.

Referring to FIGS. 11B and 13A, the processor 1400 may control the transceiver circuit 1250 such that the configuration of the input matching circuit MC1 located between the first conductive member 1110 and the feeding unit F1 changes, when the electronic device is in the swivel state. As an example, when the electronic device is switched from the normal state to the swivel state, the processor 1400 may control the transceiver circuit 1250 such that the configuration of the input matching circuit MC1 located between the first conductive member 1110 and the feeding unit F1 changes. Accordingly, in the swivel state, the input matching circuit MC1 may perform a switching operation, so as to be configured by the second capacitor C2 having the second capacitance value and the inductor L.

On the other hand, when the electronic device is in the normal state, the processor 1400 may control the transceiver circuit 1250 such that the configuration of the input matching circuit MC1 located between the first conductive member 1110 and the feeding unit F1 changes. As an example, when the electronic device is switched from the swivel state to the normal state, the processor 1400 may control the transceiver circuit 1250 such that the configuration of the input matching circuit MC1 located between the first conductive member 1110 and the feeding unit F1 changes. Accordingly, in the normal state, the input matching circuit MC1 may perform a switching operation, so as to be configured by the first capacitor C1 having the first capacitance value.

Referring to FIGS. 13A and 14A, it can be seen that the VSWR characteristic in the swivel state in the MB and HB is more improved than the VSWR characteristic in the normal state in the MB and HB, through the input matching circuit MC1 connected to the first antenna ANT1. To this end, the processor 1400 may be configured to determine a band assigned to the electronic device and whether the electronic device is in the swivel state. The processor 1400 may control the input matching circuit MC1 located between the first conductive member 1100 and the feeding unit when the electronic device has been assigned with the MB or HB and is in the swivel state. Accordingly, in the swivel state, the input matching circuit MC1 may perform a switching operation, so as to be configured by the second capacitor C2 having the second capacitance value and the inductor L. In this regard, when it is determined that the LB has been assigned to the electronic device, the configuration of the input matching circuit MC1 may not change even in the swivel state. In this case, the switch SW may be controlled based on an LB sub-band assigned to the electronic device.

Meanwhile, the processor 1400 may control the input matching circuit MC2 connected to the second antenna ANT2 by determining whether the electronic device is in the swivel state. Referring to FIGS. 10B and 13B, when the electronic device is in the swivel state, the processor 1400 may control the transceiver circuit 1250 such that the configuration of the input matching circuit MC2 located between the second conductive member 1120 and the feeding unit F2 changes. The processor 1400 may also control the transceiver circuit 1250 such that a configuration of a matching circuit MC located between the second conductive member 1120 and the ground G2 changes.

For example, in the swivel state, the input matching circuit MC2 may include a first capacitor C1 disposed between the second conductive member 1120 and the feeding unit F2, and a second capacitor C2 and a first inductor L1 connected in parallel to the first capacitor C1. On the other hand, in the swivel state, an inductance value of a second inductor L2 of the matching circuit MC may change from a first inductance value to a second inductance value. For an example, the inductance value of the second inductor L2 may change from 2 nH to 3.9 nH, but may not be limited thereto.

Referring to FIGS. 13B and 14B, it can be seen that the VSWR characteristic is more improved in the swivel state than in the normal state through the matching circuit MC in the GPS band and the WiFi band. It can also be seen that the VSWR characteristic is more improved in the swivel state than in the normal state through the input matching circuit MC2 and the matching circuit MC in the GPS band and the WiFi band.

Figure 15A:
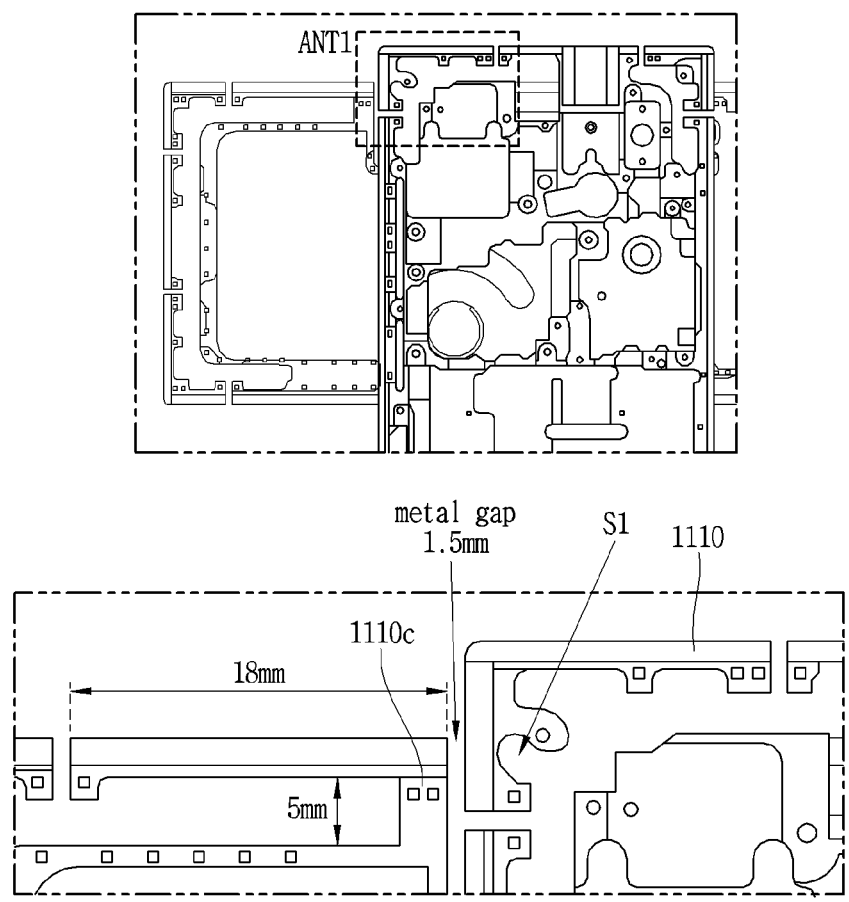
FIG. 15A is a view illustrating a slot formed in a first antenna region and a coupling portion adjacent to the slot.
Figure 15B:
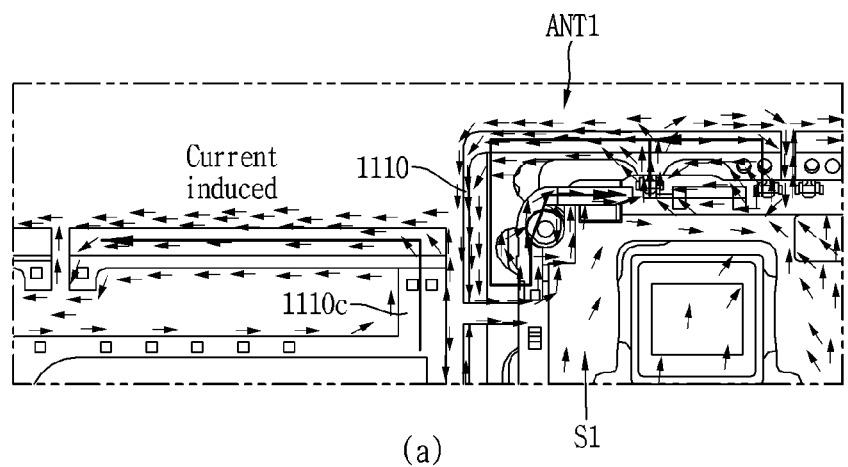
FIG. 15B is a view illustrating a current distribution formed in a region adjacent to the first antenna region depending on whether a slot is formed.
Figure 15B:
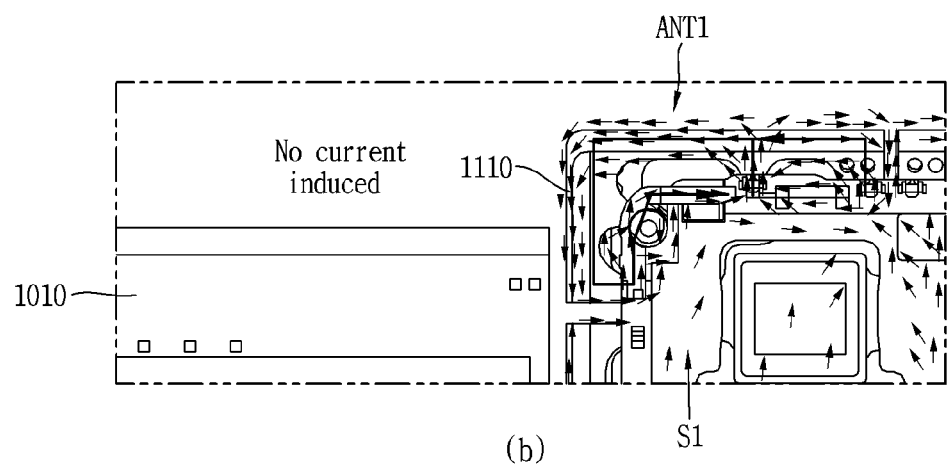
Figure 15C:
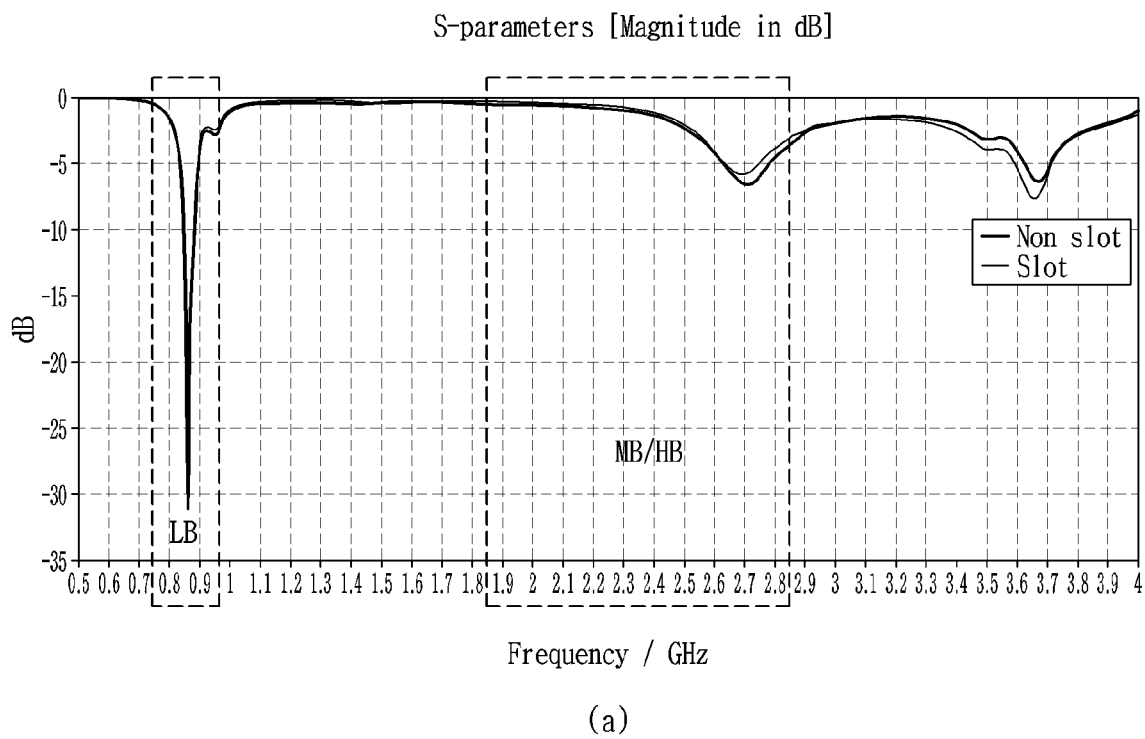
FIG. 15C is a view illustrating a reflection coefficient characteristic and an efficiency characteristic of the first antenna depending on whether a slot is formed.

The antenna implemented in the shape of the metal rim disclosed herein may cause a current induction phenomenon in the swivel state due to a coupling portion having a slot. FIG. 15A is a view illustrating a slot formed in a first antenna region and a coupling portion adjacent to the slot. FIG. 15B is a view illustrating a current distribution formed in a region adjacent to the first antenna region depending on whether a slot is formed. FIG. 15C is a view illustrating a reflection coefficient characteristic and an efficiency characteristic of the first antenna depending on whether a slot is formed.

Referring to FIGS. 10B and 15A, in order to prevent degradation of antenna performance in the swivel state, the first coupling portion 1110c may be formed in parallel to the first conductive member 1110. In addition, the first slot S1 may be disposed in a placement region of the first conductive member 1110. In this regard, it is necessary to form the first slot S1 to be disposed in a region where the first antenna ANT1 is disposed even when a gap (spacing) is made due to mechanical error and vibration in the swivel state.

For example, a gap distance between the first conductive member 1110 and the first coupling portion 1110c in the swivel state due to the first slot S1 may be about 1.5 mm, but may not be limited thereto. On the other hand, a length of a metal rim formed by bending the first coupling portion 1110c may be about 18 mm, but may not be limited thereto. In addition, a width of the fourth slot S4 may be about 5 mm, but may not be limited thereto.

Referring to FIG. 10B and (a) of FIG. 15B, the first coupling portion 1110c may be formed at an end portion of the first slot S1. The first coupling portion 1110c may be disposed in parallel to a part of the first conductive member 1110 corresponding to the first antenna ANT1 in the swivel state. Accordingly, currents generated in the first conductive member 1110 may be induced to the first coupling portion 1110c and a metal rim connected thereto. On the other hand, referring to FIG. 10B and (b) of FIG. 15B, any slot may not be formed in the supporting frame 1010 adjacent to the first conductive member 1110 corresponding to the first antenna ANT1. Accordingly, the currents generated in the first conductive member 1110 may not be induced to the metal rim of the supporting frame 1010.

Accordingly, in the structure in which the slot is formed as illustrated in (a) of FIG. 15B, the structure that interferes with signals radiated from the first antenna ANT1 may be removed by the first slot S1, thereby improving antenna radiation efficiency. In addition, the plurality of slits and slots may be realized in the supporting frame 1010 that is the metal region of the front display of the first antenna ANT1, thereby improving the antenna radiation efficiency. In addition, an antenna clearance inside the antenna required upon switching to the swivel state can be basically secured. Accordingly, even when switching to the swivel state by using the plurality of slits and slots, antenna performance of a level similar to that in the normal state or of a more improved level can be secured.

Referring to FIG. 15C, in the LB, MB and HB, the reflection coefficient characteristic of the first antenna does not change significantly depending on presence or absence of a slot. However, in specific frequency bands within the LB, MB, and HB, antenna efficiency may be degraded in a non-slot structure compared to a slot structure. Particularly, in a specific frequency band within the MB and HB, the antenna efficiency may be degraded in the non-slot structure compared to the slot structure.

Figure 16A:
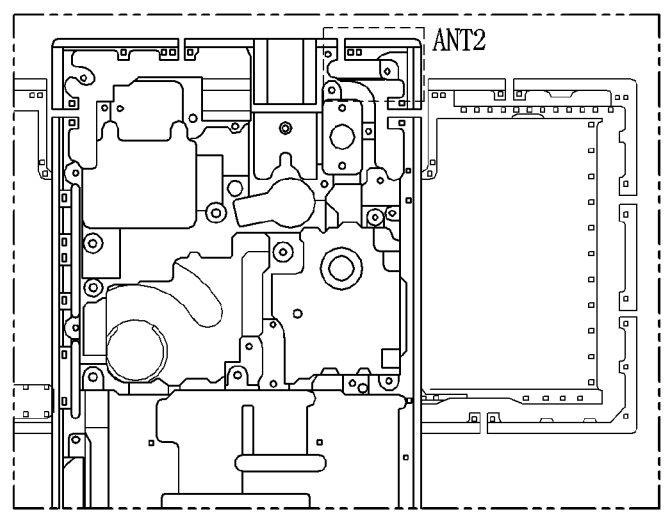
FIG. 16A is a view illustrating a slot formed in a second antenna region and a coupling portion adjacent to the slot.
Figure 16A:
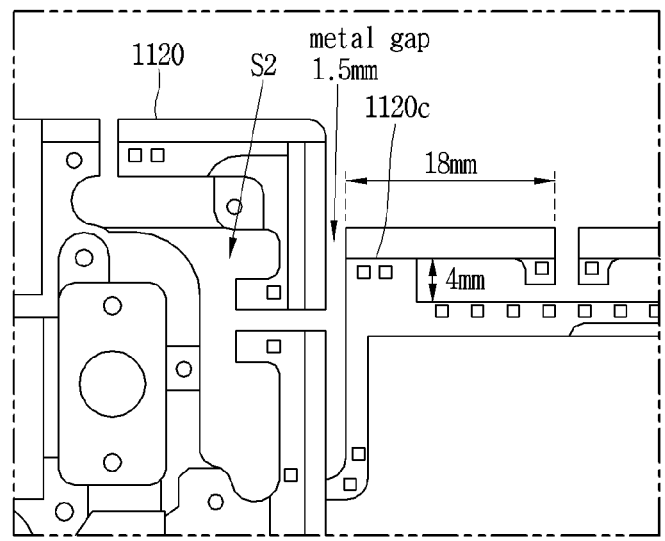
Figure 16B:
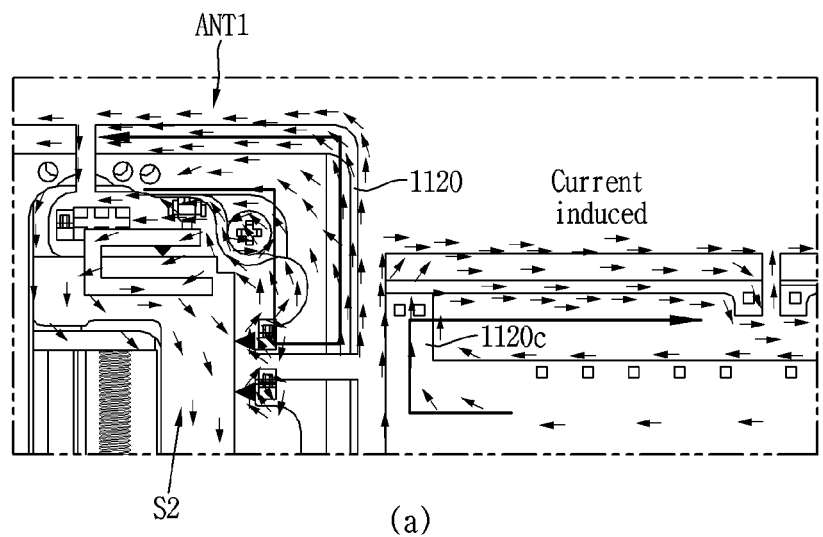
FIG. 16B is a view illustrating a current distribution formed in a region adjacent to the second antenna region depending on whether a slot is formed.
Figure 16B:
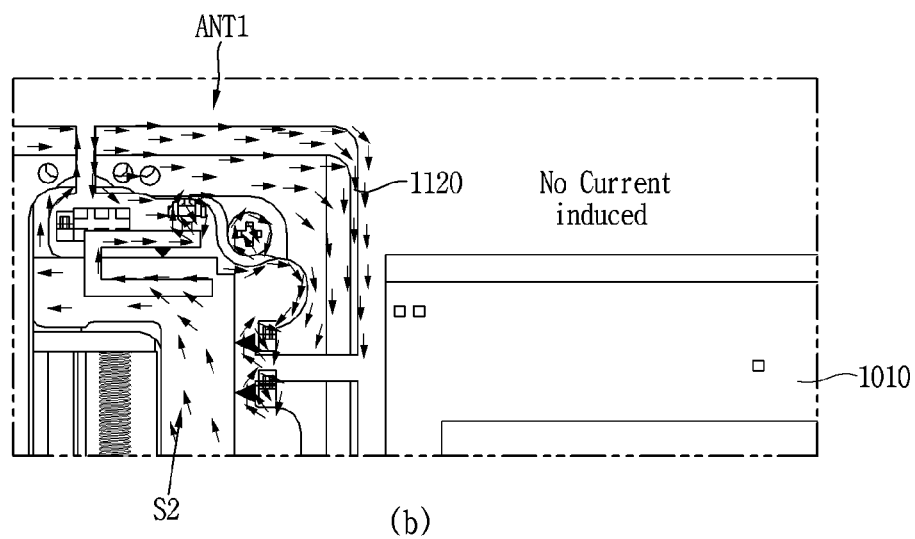
Figure 16C:
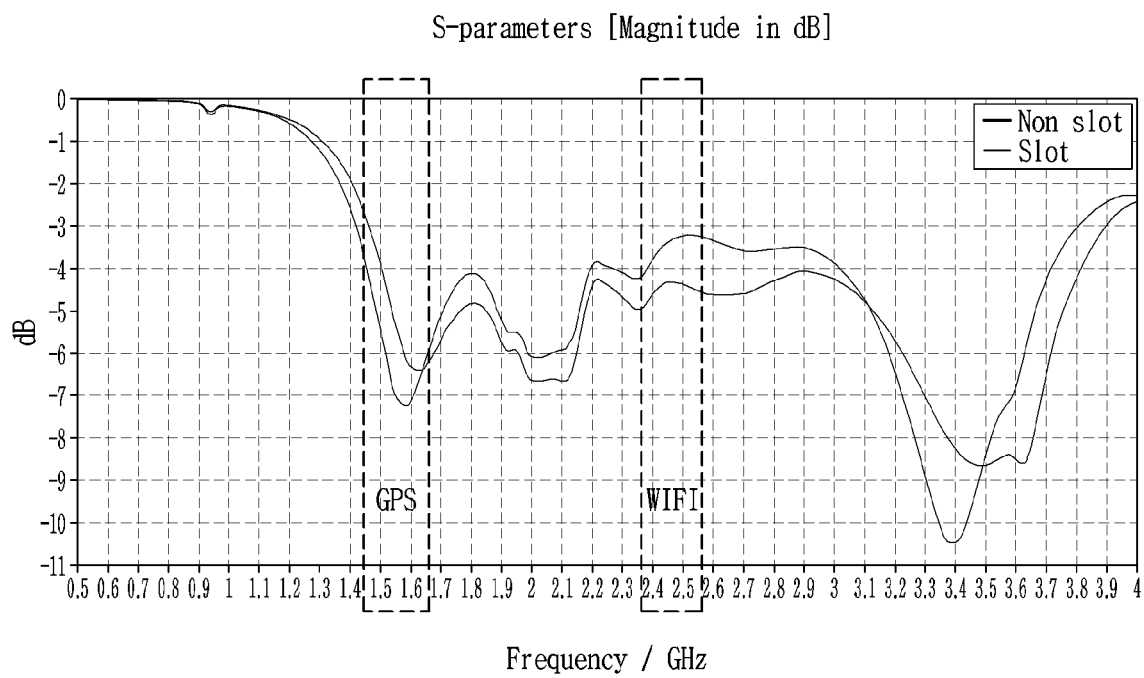
FIG. 16C is a view illustrating a reflection coefficient characteristic and an efficiency characteristic of the first antenna depending on whether a slot is formed.

The second antenna implemented in the shape of the metal rim disclosed herein may also cause a current induction phenomenon in the swivel state due to a coupling portion having a slot. FIG. 16A is a view illustrating a slot formed in a second antenna region and a coupling portion adjacent to the slot. FIG. 16B is a view illustrating a current distribution formed in a region adjacent to the second antenna region depending on whether a slot is formed. FIG. 16C is a view illustrating a reflection coefficient characteristic and an efficiency characteristic of the first antenna depending on whether a slot is formed.

Referring to FIGS. 10B and 16A, in order to prevent degradation of antenna performance in the swivel state, the second coupling portion 1120c may be formed in parallel to the second conductive member 1120. In addition, the second slot S2 may be disposed in a placement region of the second conductive member 1120. In this regard, it is necessary to form the second slot S2 to be disposed in a region where the second antenna ANT2 is disposed even when a gap (spacing) is made due to mechanical error and vibration in the swivel state.

For example, a gap distance between the second conductive member 1120 and the second coupling portion 1120c in the swivel state due to the second slot S2 may be about 1.5 mm, but may not be limited thereto. On the other hand, a length of a metal rim formed by bending the second coupling portion 1120c may be about 18 mm, but may not be limited thereto. In addition, a width of the fifth slot S5 may be about 4 mm, but may not be limited thereto.

Referring to FIG. 10B and (a) of FIG. 16B, the second coupling portion 1120c may be formed on an end portion of the second slot S2. The second coupling portion 1110c may be disposed in parallel to a part of the second conductive member 1120 corresponding to the second antenna ANT2 in the swivel state. Accordingly, currents generated in the second conductive member 1120 may be induced to the second coupling portion 1120c and a metal rim connected thereto. On the other hand, referring to FIG. 10B and (b) of FIG. 16B, any slot may not be formed in the supporting frame 1010 adjacent to the second conductive member 1120 corresponding to the second antenna ANT2. Accordingly, the currents generated in the second conductive member 1120 may not be induced to the metal rim of the supporting frame 1010.

Accordingly, in the structure in which the slot is formed as illustrated in (a) of FIG. 16B, the structure that interferes with signals radiated from the second antenna ANT2 may be removed by the second slot S2, thereby improving antenna radiation efficiency. In addition, the plurality of slits and slots may be realized in the supporting frame 1010 that is the metal region of the front display of the second antenna ANT2, thereby improving the antenna radiation efficiency. In addition, an antenna clearance inside the antenna required upon switching to the swivel state can be basically secured. Accordingly, even when switching to the swivel state by using the plurality of slits and slots, antenna performance of a level similar to that in the normal state or of a more improved level can be secured.

Referring to FIG. 16C, in GPS and WiFi bands, the reflection coefficient characteristic of the second antenna does not change significantly depending on presence or absence of a slot. Rather, when a slot is formed around the second antenna in the swivel state, the reflection coefficient characteristic of the second antenna may be slightly degraded in the WiFi band. However, in the GPS and WiFi bands, the antenna efficiency may be degraded in the non-slot structure compared to the slot structure. Particularly, in the GPS band, the antenna efficiency may be degraded in the non-slot structure compared to the slot structure.

Meanwhile, different antennas may be disposed on the main frame 1050 disclosed herein. For example, referring to FIG. 10B, in the swivel state, at least parts of the third antenna ANT3 and the fourth antenna ANT4 may be configured to be paced in slot regions, respectively. Also, in the swivel state, the fourth slot S4 and the fifth slot S5 may be formed in regions adjacent to the third antenna ANT3 and the fourth antenna ANT4, respectively.

Figure 17A:
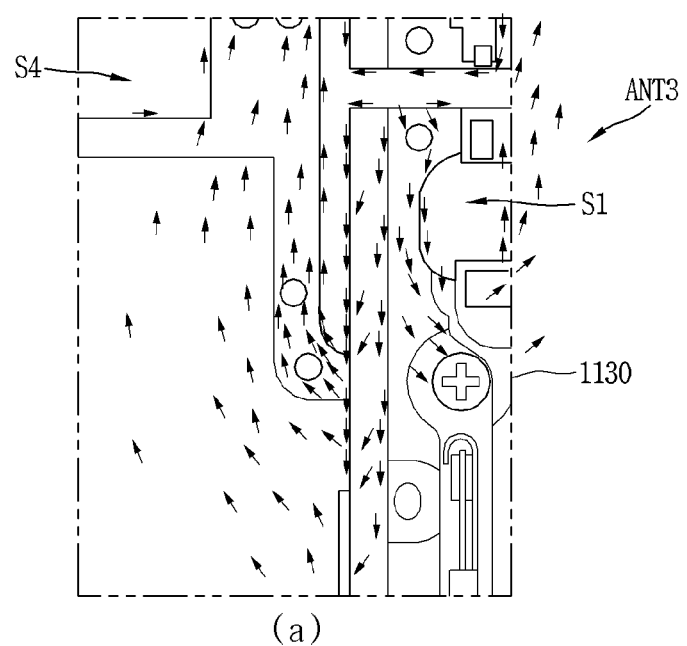
FIG. 17A is a view illustrating comparison results of current distribution on a region adjacent to the third antenna depending on whether a slot is formed.
Figure 17A:
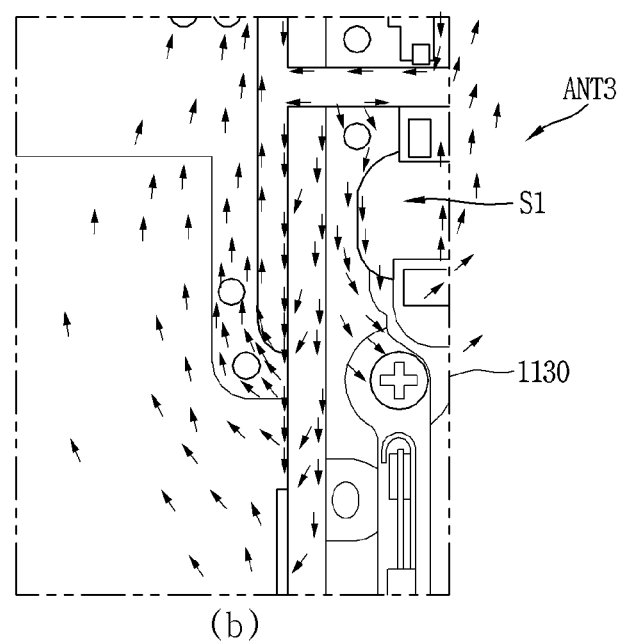
Figure 17B:
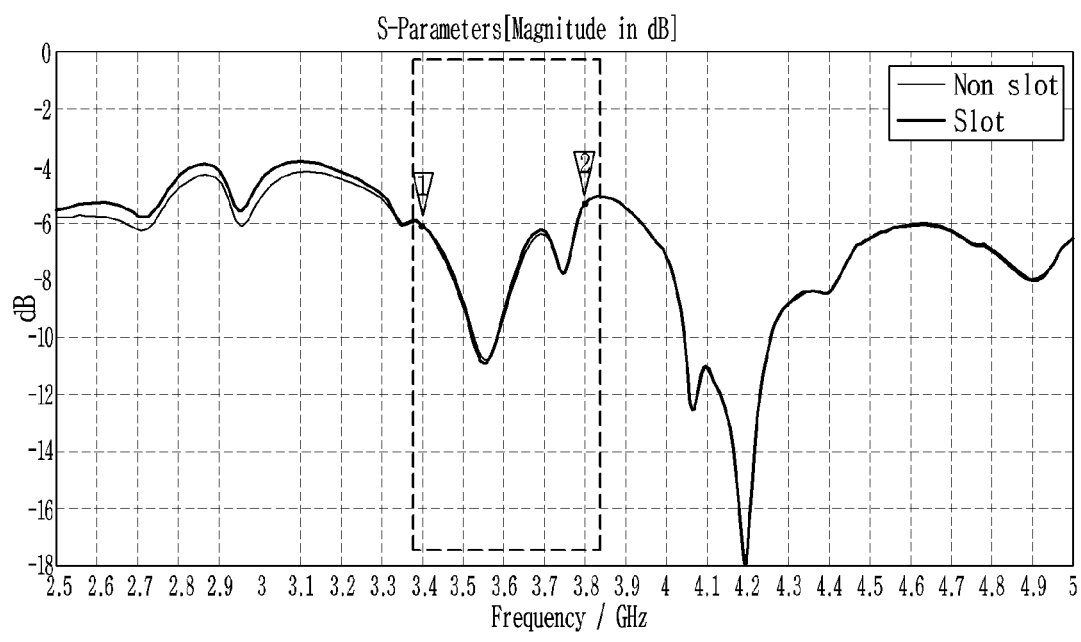
FIG. 17B is a view illustrating a reflection coefficient characteristic and an efficiency characteristic of the third antenna depending on whether a slot is formed.

FIG. 17A is a view illustrating comparison results of current distributions on a region adjacent to the third antenna depending on whether a slot is formed. FIG. 17B is a view illustrating a reflection coefficient characteristic and an efficiency characteristic of the third antenna depending on whether a slot is formed.

Referring to FIG. 10B and (a) of FIG. 17A, the fourth slot S4 may be formed in a region adjacent to the third antenna ANT3. On the other hand, referring to (b) of FIG. 17A, a slot may not be formed in a region adjacent to the third antenna ANT3. In this regard, regardless of whether or not the fourth slot S4 is formed, the current distribution formed in the third conductive member 1130 corresponding to the third antenna ANT3 and the surrounding region thereof may not significantly change. As described above, at least part of the third antenna ANT3 may be disposed in the region of the first slot S1 in the swivel state, so that the current distribution may not change significantly regardless of whether the fourth slot S4 is formed. Referring to FIG. 17B, there may be no significant change in reflection coefficient characteristic and antenna efficiency characteristic regardless of whether the third slot S3 is formed.

Figure 18A:
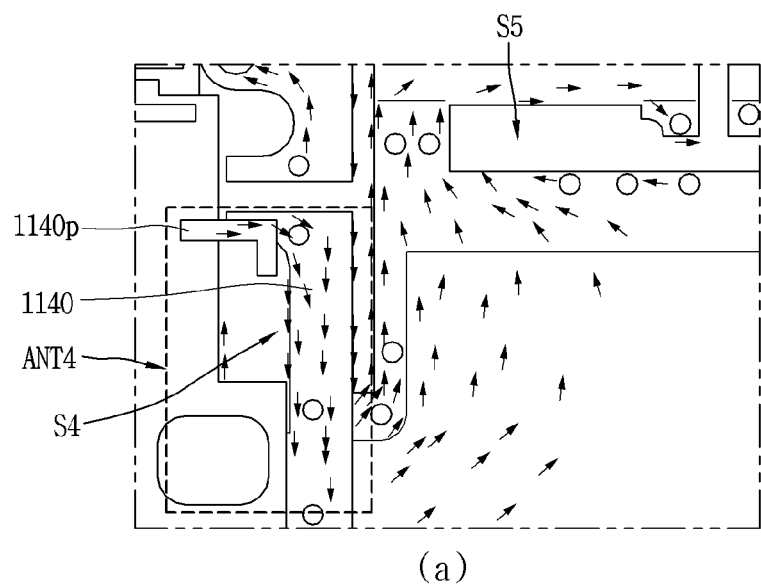
FIG. 18A is a view illustrating comparison results of current distribution on a region adjacent to the fourth antenna depending on whether a slot is formed.
Figure 18A:
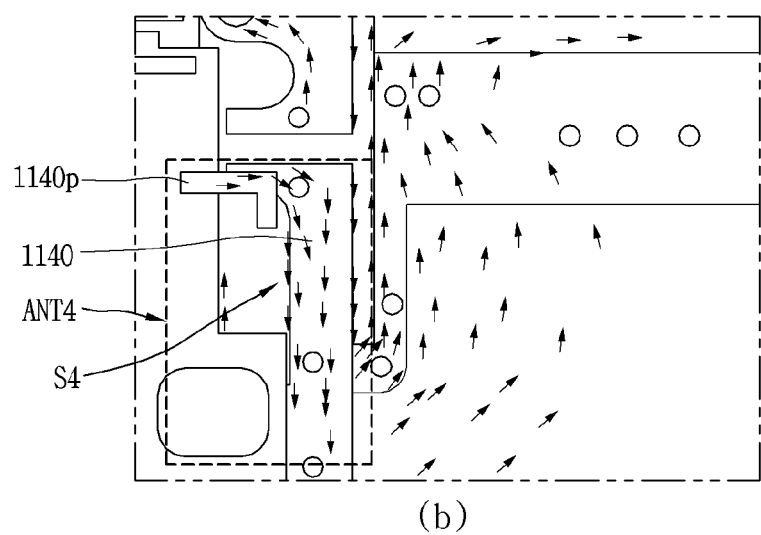
Figure 18B:
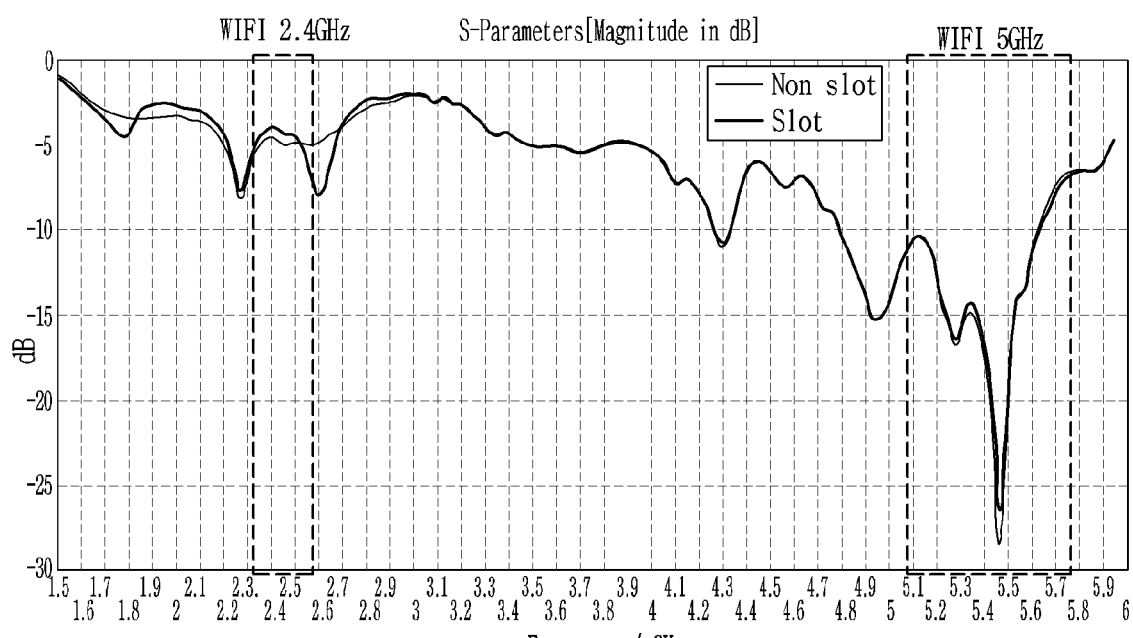
FIG. 18B is a view illustrating a reflection coefficient characteristic and an efficiency characteristic of the fourth antenna depending on whether a slot is formed.

FIG. 18A is a view illustrating comparison results of current distributions on a region adjacent to the fourth antenna depending on whether a slot is formed. FIG. 18B is a view illustrating a reflection coefficient characteristic and an antenna efficiency characteristic of the fourth antenna depending on whether a slot is formed.

Referring to FIG. 10B and (a) of FIG. 18A, the fifth slot S5 may be formed in a region adjacent to the fourth antenna ANT4. On the other hand, referring to (b) of FIG. 18A, a slot may not be formed in a region adjacent to the third antenna ANT4. In this regard, regardless of whether or not the fifth slot S5 is formed, the current distribution formed in the fourth conductive member 1140 corresponding to the fourth antenna ANT4 and the surrounding region thereof may not significantly change. As described above, at least part of the fourth antenna ANT4 may be disposed in the region of the first slot S1 in the swivel state, so that the current distribution may not change significantly regardless of whether the fifth slot S5 is formed. Referring to (a) and (b) of FIG. 18A, the fourth conductive member 1140 and the circuit board 181 may be formed to be connected to each other by a metal pattern 1140p regardless of whether a slot is formed. Referring to FIG. 18B, there is no significant change in reflection coefficient characteristic and antenna efficiency characteristic regardless of whether or not the third slot S3 is formed.

The foregoing description has been given of the detailed configurations of the supporting frame 1010 and the main frame 1050 for securing antenna performance in the normal state and the swivel state according to one implementation of the present disclosure. Hereinafter, a description will be given of a process of performing communication through an appropriate combination of the plurality of antennas in the electronic device having the main frame 1050 including the plurality of antennas according to one implementation.

Referring to FIGS. 10B, 11A, and 11B, the processor 1400 may control the transceiver circuit 1250 to perform carrier aggregation (CA) through the first antenna ANT1 and the third antenna ANT3 in the swivel state of the electronic device. Accordingly, the CA can be performed through adjacent antennas to reduce an electrical length of a signal combiner for combining signals with broadband communication.

In this regard, the antenna performance can be secured even in the swivel state by the first slot S1 formed in the region where the first antenna ANT1 and the third antenna ANT3 are disposed. Accordingly, broadband communication supporting enhanced mobile broadband (eMBB) can be performed by performing the CA through the first antenna ANT1 and the third antenna ANT3 even in the swivel state.

Also, MIMO may be performed in the WiFi band through the second antenna ANT2 and the fourth antenna ANT4 adjacent to each other. Accordingly, by performing MIMO through adjacent antennas, the WiFi module can be disposed adjacent to the antennas while increasing communication capacity.

Meanwhile, the processor 1400 may control the transceiver circuit 1250 to perform communication with a second AP in a second band while performing 2×2 MIMO with a first AP in a first band through the second antenna ANT2 and the fourth antenna ANT4 in the swivel state of the electronic device. In this regard, the first AP may provide a WiFi service in the first band (e.g., 2.4 GHz band), and the second AP may provide a WiFi service in the second band (e.g., 5 GHz band).

Additionally, the processor 1400 may perform CA while performing MIMO in at least one band for 5G NR communication using a plurality of antennas. In this regard, as described above, the main frame 1050 may further include the fifth antenna ANT5 formed on the lower end portion and the one side portion thereof and the sixth antenna ANTE formed on the lower end portion and the another side portion.

The processor 1400 may control the transceiver circuit 1250 to perform CA while performing MIMO in at least one of 5G NR LB, MB, and HB through at least two of the first antenna ANT1, the third antenna ANT3, the fifth antenna ANT5, and the sixth antenna ANT6.

Meanwhile, the electronic device may maintain a dual connectivity state with an eNB and a gNB by using the plurality of antenna modules disclosed herein. Alternatively, MIMO may be performed with a first communication system or a second communication system by using a plurality of antenna modules. In this regard, one of a plurality of antennas performing MIMO with the first communication system or the second communication system may be referred to as a first antenna module, and another one may be referred to as a second antenna module. Referring to FIGS. 10B, 11A, and 11B, the first antenna ANT1 and the fifth antenna ANT5 operating in the 5G Sub-6 LB may be referred to as a first antenna module and a second antenna module, respectively. As another example, the first antenna ANT1 and the sixth antenna ANT6 operating in the 5G Sub-6 MB may be referred to as a first antenna module and a second antenna module, respectively.

Referring to FIGS. 10B, 11A, and 11B, the electronic device may further include the transceiver circuit 1250 and the baseband processor 1400. The transceiver circuit 1250 may be operably coupled to the first antenna module and the second antenna module. The transceiver circuit 1200 may be configured to control the first antenna module and the second antenna module. In this regard, the transceiver circuit 1250 may turn on/off signals applied to the first antenna module and the second antenna module, or control a signal magnitude.

The baseband processor 1400 corresponding to a modem may be operably coupled to the transceiver circuit 1250. The baseband processor 1400 may be configured to perform MIMO through a first antenna module and a second antenna module.

In this regard, the baseband processor 1400 may control the transceiver circuit 1250 to perform UL-MIMO by transmitting a first signal and a second signal. Alternatively, the baseband processor 1400 may control the transceiver circuit 1250 to perform DL-MIMO by transmitting the first signal and the second signal.

When the quality of a signal received through the first antenna module or the second antenna module is lower than or equal to a threshold value, the corresponding antenna module may be switched to another connectivity. For example, when the quality of a signal received through the first antenna module or the second antenna module is lower than or equal to the threshold value, the corresponding antenna module may be switched to another communication system, namely, switching between 4G and 5G communication systems may be performed.

In this regard, when the first signal received through the first antenna module is lower than or equal to the threshold value, the baseband processor 1400 may release a MIMO mode and switch to the dual connectivity state. The baseband processor 1400 may control the transceiver circuit 1250 to switch to the dual connectivity state through the first antenna module and the second antenna module.

In this regard, when 5G MIMO is performed through the first antenna module and the second antenna module, switching to the 4G communication system through the first antenna module may be made. Thus, the electronic device may switch to the EN-DC state. Meanwhile, when 4G MIMO is performed through the first antenna module and the second antenna module, switching to the 5G communication system through the first antenna module may be made. Thus, the electronic device may switch to the EN-DC state.

As another example, the baseband processor 1400 may release the MIMO mode and switch to a dual connectivity state when the second signal received through the second antenna module is lower than or equal to the threshold value. The baseband processor 1400 may control the transceiver circuit 1250 to switch to the dual connectivity state through the first antenna module and the second antenna module.

In this regard, when 5G MIMO is performed through the first antenna module and the second antenna module, switching to the 4G communication system through the second antenna module may be made. Thus, the electronic device may switch to the EN-DC state. Meanwhile, when 4G MIMO is performed through the first antenna module and the second antenna module, switching to the 5G communication system through the second antenna module may be made. Thus, the electronic device may switch to the EN-DC state.

As described above, the electronic device may operate in the EN-DC state in which both the 4G communication system and the 5G communication system are connected. In this regard, the first antenna module and the second antenna module may be configured to operate in the first communication system and the second communication system, respectively. In this case, the first communication system and the second communication system may be a 4G communication system and a 5G communication system, but the present disclosure may not be limited thereto.

Meanwhile, in the EN-DC state, when the quality of a signal received through a corresponding antenna module is lower than or equal to a threshold value, the baseband processor 1400 may control a signal of another communication system to be received through the corresponding antenna module. In this regard, the baseband processor 1400 may determine whether quality of a first signal of the first communication system received through the first antenna module is lower than or equal to the threshold value. When the quality of the first signal is lower than or equal to the threshold value, the baseband processor 1400 may control the transceiver circuit 1250 to receive a second signal of the second communication system through the first antenna module.

In this regard, when the first communication system and the second communication system use the same band, an operating frequency of the transceiver circuit 1250 may be set to be the same, and only magnitude and phase of a signal may be controlled. On the other hand, when the first communication system and the second communication system use different bands, the magnitude and phase of a signal may be controlled while changing an operating frequency of the transceiver circuit 1250.

As another example, the baseband processor 1400 may determine whether the quality of the second signal of the second communication system received through the second antenna module is lower than or equal to the threshold value. When the quality of the second signal is lower than or equal to the threshold value, the baseband processor 1400 may control the transceiver circuit 1250 to receive the first signal of the first communication system through the second antenna module.

In this regard, when the first communication system and the second communication system use the same band, an operating frequency of the transceiver circuit 1250 may be set to be the same, and only magnitude and phase of a signal may be controlled. On the other hand, when the first communication system and the second communication system use different bands, magnitude and phase of a signal may be controlled while changing an operating frequency of the transceiver circuit 1250.

Meanwhile, the electronic device may be assigned with time/frequency resources for MIMO or EN-DC from a base station. In this regard, the baseband processor 1400 may determine whether a resource having a specific time interval and a frequency band has been assigned as a DL-MIMO resource and a corresponding resource region through blind decoding for a PDCCH region. The baseband processor 1400 may control the transceiver circuit 1250 to receive the first signal through the first antenna module and the second signal through the second antenna module in the assigned specific resource.

In this regard, the first signal of the first communication system and the second signal of the second communication system may be received through the first antenna module and the second antenna module, respectively, thereby switching to the EN-DC state or maintaining the state. Alternatively, 4G DL MIMO may be performed by receiving the first signal and the second signal of the 4G communication system through the first antenna module and the second antenna module. Alternatively, 5G DL MIMO may be performed by receiving the first signal and the second signal of the 5G communication system through the first antenna module and the second antenna module.

As another example, the first signal of the first communication system and the second signal of the second communication system may be transmitted through the first antenna module and the second antenna module, respectively, thereby switching to the EN-DC state or maintaining the state. Alternatively, 4G UL MIMO may be performed by transmitting the first signal and the second signal of the 4G communication system through the first antenna module and the second antenna module. Alternatively, 5G UL MIMO may be performed by transmitting the first signal and the second signal of the 5G communication system through the first antenna module and the second antenna module.

The dual connectivity state may be specified to operate in an EN-DC, NGEN-DC, or NR-DC configuration as shown in FIG. 1C. EN-DC or NGEN-DC band combinations may include at least one E-UTRA operating band. Specifically, operating bands for intra-band contiguous EN-DC, intra-band non-contiguous EN-DC, inter-band EN-DC in FR1, inter-band EN-DC including FR2, inter-band EN-DC including FR1 and FR2, and inter-band EN-DC between FR1 and FR2 may be defined.

A UE channel bandwidth for EN-DC may be defined. In this regard, a UE channel bandwidth for intra-band EN-DC in FR1 may be defined. Channel arrangements for DC may be defined. In this regard, channel spacing for intra-band EN-DC carriers may be defined.

The configuration for EN-DC may be defined. Specifically, configurations for intra-band contiguous EN-DC, intra-band non-contiguous EN-DC, inter-band EN-DC in FR1, inter-band EN-DC including FR2, inter-band EN-DC including FR1 and FR2, and inter-band EN-DC between FR1 and FR2 may be defined.

As an example, UL EN-DC configuration may be defined for 2, 3, 4, 5, or 6 bands in FR1. In this regard, the UL EN-DC configuration for 2, 3, 4, 5, or 6 bands in FR1 may be made of a combination of EUTRA and NR configurations. This EN-DC, NGEN-DC, or NR-DC configuration may also be defined for downlink (DL) as well as uplink (UL).

Transmitter power may be defined in relation to EN-DC. UE maximum output power and UE maximum output power reduction may be defined for each configuration of the above-described EN-DCs. UE additional maximum output power reduction may be defined in relation to EN-DC. Configured output power for EN-DC and configured output power for NR-DC may be defined.

The foregoing description has been given of the electronic device which is provided with a plurality of transceivers and antennas to perform MIMO and/or CA operations. In this regard, the electronic device performing the MIMO and/or CA operations may operate as a DC-EN configuration so as to be in the EN-DC state with the eNB and gNB. Hereinafter, description will be given of a wireless communication system including an electronic device and a base station performing such MIMO and/or CA operations. In this regard, FIG. 19 illustrates a block diagram of a wireless communication system that is applicable to methods proposed herein.

Figure 19:
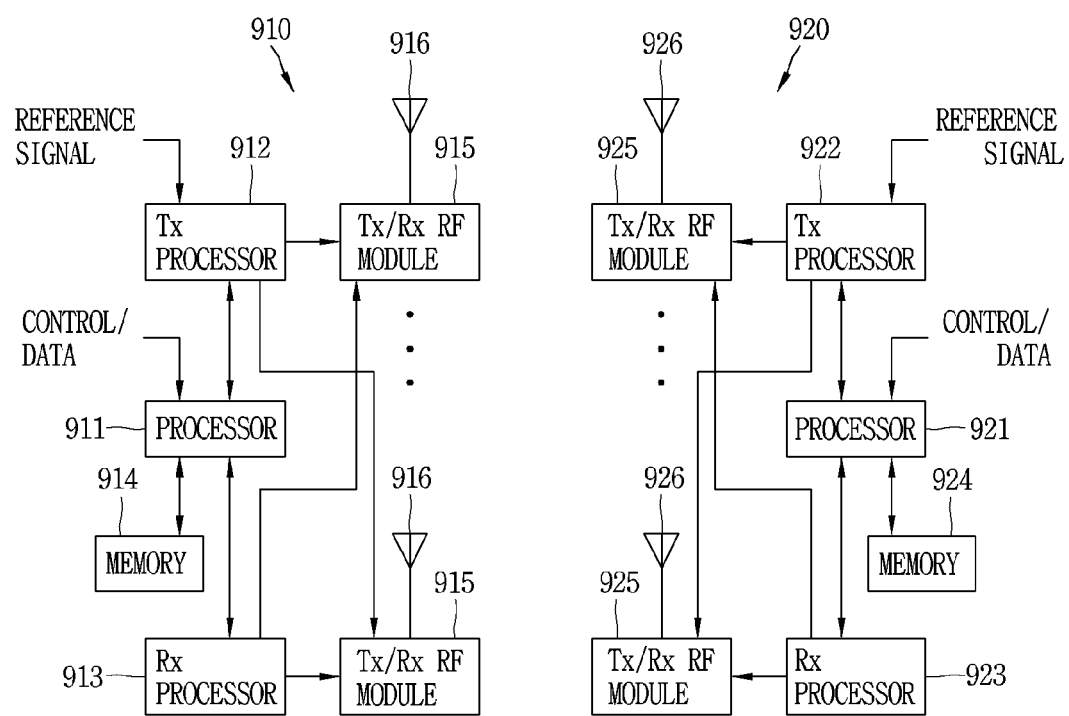
FIG. 19 is an exemplary block diagram of a wireless communication system that is applicable to methods proposed in the present disclosure.

Referring to FIG. 19, the wireless communication system includes a first communication device 910 and/or a second communication device 920. "A and/or B" may be interpreted to denote the same as "comprising at least one of A and B". The first communication device may represent a base station, and the second communication device may represent a terminal (or the first communication device may represent a terminal, and the second communication device may represent a base station).

The base station (BS) may be replaced with a term such as a fixed station, a Node B, an evolved-NodeB (eNB), a Next Generation NodeB (gNB), a base transceiver system (BTS), an access point (AP), or a general NB (gNB), a 5G system, a network, an AI system, a road side unit (RSU), robot or the like. In addition, a terminal may be fixed or mobile, and may include a user equipment (UE), a mobile station (MS), a user terminal (UT), a mobile subscriber station (MSS), a subscriber station (SS), and an advanced mobile (AMS), a wireless terminal (WT), a machine-type communication (MTC) device, an machine-to-machine (M2M) device, a device-to-device (D2D) device, a vehicle, a robot, an AI module or the like.

The first communication device and the second communication device include a processor 911, 921, a memory 914, 924, at least one Tx/Rx RF module 915, 925, a Tx processor 912, 922, an Rx processor 913, 923, and an antenna 916, 926. The processor implements the functions, processes and/or methods described above. More specifically, in a DL communication (communication from the first communication device to the second communication device), upper layer packets from a core network (NGC) are provided to the processor 911. The processor implements the function of an L2 layer. In the DL, the processor provides multiplexing, radio resource allocation between a logical channel and a transport channel to the second communication device 920, and is responsible for signaling to the second communication device. A transmit (TX) processor 912 implements various signal processing functions for a L1 layer (i.e., physical layer). The signal processing functions facilitate forward error correction (FEC) in the second communication device, and include coding and interleaving. The encoded and modulated symbols are divided into parallel streams, and each stream is mapped to an OFDM subcarrier, and multiplexed with a reference signal (RS) in a time and/or frequency domain, and combined together using an Inverse Fast Fourier Transform (IFFT) to create a physical channel carrying a time-domain OFDMA symbol stream. An OFDM stream is spatially precoded to produce multiple spatial streams. Each spatial stream may be provided to different antennas 916 through individual Tx/Rx modules (or transceivers 915). Each Tx/Rx module may modulate an RF carrier with each spatial stream for transmission. In the second communication device, each Tx/Rx module (or transceiver) 925 receives a signal through each antenna 926 of each Tx/Rx module. Each Tx/Rx module recovers information modulated onto an RF carrier, and provides it to the receive (RX) processor 923. The RX processor implements various signal processing functions of layer 1. The RX processor may perform spatial processing on the information to recover any spatial streams destined for the second communication device. If multiple spatial streams are directed to the second communication device, they may be combined into a single OFDMA symbol stream by multiple RX processors. The RX processor converts the OFDMA symbol stream from a time domain to a frequency domain using fast Fourier transform (FFT). The frequency domain signal includes an individual OFDMA symbol stream for each subcarrier of the OFDM signal. The symbols and reference signal on each subcarrier are recovered and demodulated by determining the most likely signal placement points transmitted by the first communication device. Such soft decisions may be based on channel estimate values. The soft decisions are decoded and deinterleaved to recover data and control signals originally transmitted by the first communication device on the physical channel. The corresponding data and control signals are provided to the processor 921.

The UL (communication from the second communication device to the first communication device) is processed at the first communication device 910 in a similar manner to that described in connection with a receiver function at the second communication device 920. Each Tx/Rx module 925 receives a signal via each antenna 926. Each Tx/Rx module provides an RF carrier and information to the RX processor 923. The processor 921 may be associated with the memory 924 that stores program codes and data. The memory may be referred to as a computer readable medium.

Meanwhile, technical effects of an electronic device having a plurality of antennas according to the present disclosure will be described as follows.

According to the present disclosure, in an antenna structure disposed in a side surface of an electronic device, an antenna structure that minimizes changes in antenna characteristics even when the form factor of the electronic device is changed.

According to the present disclosure, by minimizing the changes in antenna characteristics due to frame rotation in a swivel structure, rotation wireless performance can be maintained at a predetermined level even when a display region rotates.

According to the present disclosure, by providing a mechanical structure in which slits and slots are implemented to minimize the changes in antenna characteristics due to the frame rotation in the swivel structure, the rotation wireless performance can be maintained at the predetermined level even when the display region rotates.

According to the present disclosure, antenna characteristics can be secured in the swivel structure while providing a rigid structure capable of supporting a display in the swivel structure.

Further scope of applicability of the present disclosure will become apparent from the detailed description given hereinafter. It should be understood, however, that the detailed description and specific examples, such as the preferred embodiment of the invention, are given by way of illustration only, since various changes and modifications within the spirit and scope of the invention will be apparent to those skilled in the art.

With regard to the present disclosure described above, the design of an antenna including processors 180, 1250, and 1400 and a controller for controlling the same in an electronic device 100, 1000 having a plurality of antennas, and a control method thereof may be implemented as codes readable by a computer on a medium written by a program. The computer-readable media includes all types of recording devices in which data readable by a computer system can be stored. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the processor 180 of the terminal. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

What is claimed is:

1. An electronic device, comprising:
   a display;
   a supporting frame coupled to the display and comprising a first metal rim disposed on at least one side surface of the supporting frame; and
   a main frame rotatably coupled to the supporting frame and comprising a second metal rim disposed on at least one side surface of the main frame,
   wherein the second metal rim of the main frame comprises a first antenna and a second antenna in a first region, wherein the first antenna and the second antenna operate in different bands, and
   wherein the supporting frame further comprises a first slot and a second slot formed in a second region of the supporting frame, wherein the first region and the second region are adjacent to each other when the supporting frame is in a swivel state with respect to the main frame.

2. The electronic device of claim 1, wherein the first slot of the supporting frame accommodates a first part of the second metal rim adjacent to a bottom portion of the first antenna in the swivel state of the supporting frame and the second slot of the supporting frame accommodates a second part of the second metal rim adjacent to a bottom portion of the second antenna in the swivel state of the supporting frame.

3. The electronic device of claim 1, wherein a first coupling portion and a second coupling portion are formed at respective bottom portions of the first and second slots such that the first coupling portion and the second coupling portion are disposed in parallel with parts of a first conductive member and a second conductive member in the swivel state, wherein the first conductive member corresponds to the first antenna and the second conductive member corresponds to the second antenna.

4. The electronic device of claim 1, wherein the main frame further comprises a third antenna disposed below the first antenna and a fourth antenna disposed below the second antenna, and wherein the supporting frame further comprises a third slot corresponding to a placement of the third antenna and a fourth slot corresponding to a placement of the fourth antenna in a non-swivel state where the supporting frame overlaps the main frame.

5. The electronic device of claim 4, wherein the fourth slot of the supporting frame is isolated from the first slot of the supporting frame by a first coupling portion, and wherein the fourth slot has a longer length than a frame slot formed between the second antenna and the fourth antenna.

6. The electronic device of claim 1, wherein a portion of the supporting frame corresponding to the first antenna and the second antenna does not have metal in a non-swivel state where the supporting frame overlaps the main frame.

7. The electronic device of claim 1, wherein a third metal rim and a fourth metal rim are formed on a portion of the supporting frame corresponding to the first antenna and the second antenna, and
wherein a shape and placement of the first antenna and the second antenna corresponds to a shape and displacement of the third metal rim and the fourth metal rim in a non-swivel state where the supporting frame overlaps the main frame.

8. The electronic device of claim 7, wherein a first conductive member corresponding to the first antenna and a second conductive member corresponding to the second antenna are segmented from adjacent conductive members by slits, and
wherein a shape and displacement of slots formed in the supporting frame corresponds to a shape and displacement of slits formed in the main frame in the non-swivel state where the supporting frame overlaps the main frame.

9. The electronic device of claim 1, wherein portions of the supporting frame corresponding to the first antenna and the second antenna comprises a first region and a second region without a metal rim,
wherein the first metal rim supporting the display is formed on a region adjacent to the first region of one side of the supporting frame, and wherein the second region of the supporting frame is isolated from the first slot by a first coupling portion formed on a region adjacent to the second region of the supporting frame.

10. The electronic device of claim 1, further comprising:
a fifth antenna formed on a bottom portion and one side of the main frame; and
a sixth antenna formed on a bottom portion and another side of the main frame,
wherein a portion of the supporting frame corresponding to the fifth antenna and the sixth antenna comprises a third region without a metal rim, and
wherein the third region is defined by a bottom portion and two sides of the supporting frame.

11. The electronic device of claim 10, wherein the third region of the supporting frame is isolated from the second slot of the supporting frame by a second coupling portion formed on a region adjacent to the third region.

12. The electronic device of claim 1, further comprising:
a transceiver circuit coupled to the first antenna and the second antenna and configured to control operating bands of the first antenna and the second antenna; and
a processor operably coupled to the transceiver circuit and configured to control the transceiver circuit.

13. The electronic device of claim 12, wherein the first antenna is configured to operate in a Fifth-Generation New Radio (5G NR) low band (LB), mid band (MB), and high band (HB),
wherein a first conductive member of the first antenna is coupled to a feed line, a ground, and a switch of a circuit board disposed inside the electronic device, and
wherein the switch is controlled to select a different matching circuit according to an assigned low band when the first antenna operates in the LB.

14. The electronic device of claim 13, wherein the processor is further configured to:
determine whether the electronic device is in the swivel state,
control the transceiver circuit so that a configuration of an input matching circuit disposed between the first conductive member and a feeding unit changes based on the electronic device being in the swivel state, and
control the input matching circuit when the electronic device is assigned to the mid band and the high band and is in the swivel state.

15. The electronic device of claim 12, wherein the second antenna is configured to operate in a Global Positioning System (GPS) band and a Wireless Fidelity (WiFi) band, and
wherein a second conductive member of the second antenna is coupled to a feed line, a ground, and a switch of a circuit board disposed inside the electronic device.

16. The electronic device of claim 15, wherein the processor is further configured to:
determine whether the electronic device is in the swivel state, and
control the transceiver circuit so that a configuration of an input matching circuit disposed between the second conductive member and a feeding unit and a configuration of a matching circuit disposed between the second conductive member and the ground change based on the electronic device being in the swivel state.

17. The electronic device of claim 12, wherein the main frame further comprises a third antenna disposed adjacent to the first antenna and a fourth antenna disposed adjacent to the second antenna respectively, and
wherein the third antenna operates in a 5G NR HB and the fourth antenna operates in a WiFi band.

18. The electronic device of claim 17, wherein the processor is further configured to control the transceiver circuit to perform Carrier Aggregation (CA) through the first antenna and the third antenna in the swivel state of the electronic device.

19. The electronic device of claim 17, wherein the processor is further configured to control the transceiver circuit to perform communication with a second Access Point (AP) in a second band while performing 2×2 Multi-input and Multi-output (MIMO) with a first AP in a first band through the second antenna and the fourth antenna, in the swivel state of the electronic device.

20. The electronic device of claim 17, further comprising:
a fifth antenna formed on a bottom portion and one side of the main frame; and
a sixth antenna formed on a bottom portion and another side of the main frame,
wherein the processor controls the transceiver circuit to perform CA while performing MIMO in at least one of 5G NR LB, MB, or HB through at least two of the first antenna, the third antenna, the fifth antenna, or the sixth antenna.

* * * * *